(12) United States Patent
Noh et al.

(10) Patent No.: US 12,323,995 B2
(45) Date of Patent: *Jun. 3, 2025

(54) METHOD FOR TRANSMITTING/RECEIVING CHANNEL BY USING GUARD BAND IN ONE CARRIER IN WIRELESS COMMUNICATION SYSTEM, AND DEVICE THEREFOR

(71) Applicant: WILUS INSTITUTE OF STANDARDS AND TECHNOLOGY INC., Gyeonggi-do (KR)

(72) Inventors: Minseok Noh, Seoul (KR); Kyungjun Choi, Gyeonggi-do (KR); Jinsam Kwak, Gyeonggi-do (KR)

(73) Assignee: WILUS INSTITUTE OF STANDARDS AND TECHNOLOGY INC., Gyeonggi-do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/128,594

(22) Filed: Mar. 30, 2023

(65) Prior Publication Data
US 2023/0239891 A1 Jul. 27, 2023

Related U.S. Application Data

(63) Continuation of application No. 17/738,004, filed on May 6, 2022, now Pat. No. 11,641,656, which is a
(Continued)

(30) Foreign Application Priority Data
Nov. 7, 2019 (KR) .................. 10-2019-0142164

(51) Int. Cl.
H04L 12/28 (2006.01)
H04W 72/0453 (2023.01)
(Continued)

(52) U.S. Cl.
CPC ....... *H04W 72/23* (2023.01); *H04W 72/0453* (2013.01)

(58) Field of Classification Search
CPC ............ H04W 72/232; H04W 72/0453; H04L 5/0094
(Continued)

(56) References Cited

U.S. PATENT DOCUMENTS 10,455,488 B1 * 10/2019 Bendlin ................. H04W 16/14
10,749,644 B2 * 8/2020 Islam .................. H04W 72/121
(Continued)

FOREIGN PATENT DOCUMENTS

| CN | 109565403 | 4/2019 |
| CN | 109906581 | 6/2019 |

(Continued)

OTHER PUBLICATIONS

Office Action dated Oct. 2, 2023 for European Patent Application No. 20 883 995.1.
(Continued)

*Primary Examiner* — John Pezzlo
(74) *Attorney, Agent, or Firm* — WOMBLE BOND DICKINSON (US) LLP

(57) ABSTRACT

A method for receiving a downlink channel by a terminal in a wireless communication system includes: receiving, from a base station, first information related to a guard band in a first resource region located in one carrier; receiving, from the base station, second information related to multiple resource sets, each of which is identified by the guard band in the first resource region on the basis of the first information; and receiving, from the base station, a downlink channel on a resource indicated by the second information to be available for reception of the downlink channel.

18 Claims, 22 Drawing Sheets

Related U.S. Application Data continuation of application No. PCT/KR2020/015630, filed on Nov. 9, 2020.

(51) Int. Cl.
*H04W 72/23* (2023.01)
*H04J 1/16* (2006.01)

(58) Field of Classification Search
USPC ........................................ 370/252, 329, 430
See application file for complete search history.

(56) References Cited

U.S. PATENT DOCUMENTS

| | | | |
|---|---|---|---|
| 11,323,989 B2* | 5/2022 | Zhang | H04L 5/00 |
| 11,751,208 B2* | 9/2023 | Rastegardoost | H04W 74/0808 370/329 |
| 11,871,451 B2* | 1/2024 | Awadin | H04W 74/0841 |
| 2017/0273056 A1 | 9/2017 | Iou | |
| 2018/0359127 A9 | 12/2018 | Hakola et al. | |
| 2019/0059087 A1 | 2/2019 | Werner et al. | |
| 2019/0200345 A1 | 6/2019 | Zhang et al. | |
| 2019/0208482 A1* | 7/2019 | Tooher | H04L 5/0092 |
| 2019/0268883 A1 | 8/2019 | Zhang et al. | |
| 2019/0274162 A1 | 9/2019 | Zhang et al. | |
| 2019/0357224 A1* | 11/2019 | Li | H04L 5/0055 |
| 2020/0029310 A1 | 1/2020 | Lee et al. | |
| 2020/0187207 A1* | 6/2020 | Kang | H04W 72/02 |
| 2020/0280971 A1* | 9/2020 | Moon | H04L 5/0053 |
| 2021/0058970 A1 | 2/2021 | Kwak et al. | |
| 2021/0105812 A1 | 4/2021 | St et al. | |
| 2021/0250928 A1 | 8/2021 | Seo et al. | |
| 2021/0385677 A1 | 12/2021 | Yang et al. | |
| 2022/0039158 A1 | 2/2022 | Awadin et al. | |
| 2022/0061074 A1* | 2/2022 | Babaei | H04L 5/0053 |
| 2022/0086907 A1 | 3/2022 | Kundu et al. | |
| 2022/0173867 A1 | 6/2022 | Nogami et al. | |
| 2022/0272744 A1 | 8/2022 | Noh et al. | |
| 2022/0369372 A1 | 11/2022 | Oh et al. | |

FOREIGN PATENT DOCUMENTS

| | | |
|---|---|---|
| EP | 2 822 339 | 1/2015 |
| EP | 3 518 592 | 7/2019 |
| JP | 7412805 | 1/2024 |
| TW | 201902279 | 1/2019 |
| TW | 201937866 | 8/2019 |
| WO | 2018/028625 | 2/2018 |
| WO | 2018/056337 | 3/2018 |
| WO | 2021/091345 | 5/2021 |

OTHER PUBLICATIONS

Notice of Allowance dated Nov. 20, 2023 for Japanese Patent Application No. 2022-526500 and its English translation provided by the Applicant's foreign counsel.
International Search Report for PCT/KR2020/015630 mailed on Mar. 5, 2021 and its English translation from WIPO (now published as WO 2021/091345).
Written Opinion of the International Searching Authority for PCT/KR2020/015630 mailed on Mar. 5, 2021 and its English translation by Google Translate (now published as WO 2021/091345).
Ericsson: "Feature lead summary 2 for UL Signals and Channels", 3GPP TSG-RAN WG1 Meeting #98b, R1-1911562, Chongqing, China, Aug. 14-20, 2019. See pp. 1-29.
Qualcomm Incorporated: "Summary of NR-U agreements till RAN1 #98", 3GPP TSG RAN WG1 Meeting #99, R1-1911721, Reno, USA, Nov. 18-22, 2019. See pp. 1-26.
Nokia, Nokia Shanghai Bell: "Remaining NR-U enhancements for uplink signals and channels", 3GPP TSG RAN WG1 #98bis, R1-1910594, Chongqing, China, Oct. 14-20, 2019. See pp. 1-13.
LG Electronics: "Summary on wide-band operation for NR-U", 3GPP TSG RAN WG1 #98bis, R1-1910824, Chongqing, China, Oct. 14-20, 2019. See pp. 1-17.
Huawei, HiSilicon: "NRU wideband BWP operation", 3GPP TSG RAN WG1 Meeting #98bis, R1-1910049, Chongqing, China, Oct. 14-20, 2019. See pp. 1-10.
Office Action dated Oct. 21, 2022 for Indian Patent Application No. 202227028654.
Extended European Search Report dated Nov. 25, 2022 for European Patent Application No. 20883995.1.
Panasonic: "Wideband operation in NR unlicensed", 3GPP TSG-RAN WG1 #98bis, R1-1911242, Chongqing, China, Oct. 14-20, 2019.
ETRI: "Further views on wideband operation for NR-U", 3GPP TSG RAN WG1 #98bis, R1-1910997, Chongqing, China, Oct. 14-20, 2019.
Office Action dated Jun. 20, 2022 for Taiwanese Patent Application No. 109139073 and its English Translation provided by Applicant's foreign counsel.
Notice of Allowance dated Dec. 19, 2022 for U.S. Appl. No. 17/738,004 (now published as 2022/0272744).
Office Action dated Aug. 8, 2022 for U.S. Appl. No. 17/738,004 (now published as 2022/0272744).
Notice of Allowance dated May 23, 2023 for Taiwanese Patent Application No. 109139073 and its English machine translation by Google Translate.
Office Action dated May 8, 2023 for Japanese Patent Application No. 2022-526500 and its English translation provided by the Applicant's foreign counsel.
MediaTek Inc.: "Wideband operation for NR-U", 3GPP TSG RAN WG1 Ad-Hoc Meeting 1901, R1-1900190, Taipei, Taiwan, Jan. 21-25, 2019, pp. 1-6.
Office Action dated Aug. 9, 2024 for U.S. Appl. No. 18/128,473.
Hearing Notice dated Sep. 17, 2024 for Indian Patent Application No. 202227028654.
Notice of Allowance dated Sep. 20, 2024 for European Patent Application No. 20 883 995.1.
Notice of Allowance dated Oct. 9, 2024 for Vietnamese Patent Application No. 1-2022-03396 and its English translation provided by Applicant's foreign counsel.
Office Action dated Oct. 28, 2024 for Japanese Patent Application No. 2023-213970 and its English translation provided by Applicant's foreign counsel.
Notice of Allowance dated Oct. 28, 2024 for Japanese Patent Application No. 2023-213971 and its English translation provided by Applicant's foreign counsel.
Extended European Search Report dated Nov. 4, 2024 for European Patent Application No. 24194078.2.
Extended European Search Report dated Nov. 4, 2024 for European Patent Application No. 24194088.1.
Office Action ($1^{st}$) dated Dec. 25, 2024 for Chinese Patent Application No. 202080077246.2 and its English translation provided by Applicant's foreign counsel.
Office Action ($1^{st}$) dated Jan. 20, 2025 for Taiwanese Patent Application No. 112131767 and its English translation provided by Applicant's foreign counsel.
Notice of Allowance dated Dec. 19, 2024 for U.S. Appl. No. 18/128,473.
Office Action ($1^{st}$) dated Feb. 14, 2025 for Taiwanese Patent Application No. 112131771 and its English translation provided by Applicant's foreign counsel.

* cited by examiner

METHOD FOR TRANSMITTING/RECEIVING CHANNEL BY USING GUARD BAND IN ONE CARRIER IN WIRELESS COMMUNICATION SYSTEM, AND DEVICE THEREFOR

CROSS-REFERENCE TO RELATED APPLICATIONS

This application is a continuation of U.S. patent application Ser. No. 17/738,004 filed on May 6, 2022, which is a continuation of International Patent Application No. PCT/KR2020/015630 filed on Nov. 9, 2020, which claims the priority to Korean Patent Application No. 10-2019-0142164 filed in the Korean Intellectual Property Office on Nov. 7, 2019, the entire contents of which are incorporated herein by reference.

TECHNICAL FIELD

The present specification relates to a wireless communication system and, particularly, to a method for transmitting or receiving a channel by using a guard band in one carrier, and an apparatus therefor.

BACKGROUND ART

After commercialization of 4th generation (4G) communication system, in order to meet the increasing demand for wireless data traffic, efforts are being made to develop new 5th generation (5G) communication systems. The 5G communication system is called as a beyond 4G network communication system, a post LTE system, or a new radio (NR) system. In order to achieve a high data transfer rate, 5G communication systems include systems operated using the millimeter wave (mmWave) band of 6 GHz or more, and include a communication system operated using a frequency band of 6 GHz or less in terms of ensuring coverage so that implementations in base stations and terminals are under consideration.

A 3rd generation partnership project (3GPP) NR system enhances spectral efficiency of a network and enables a communication provider to provide more data and voice services over a given bandwidth. Accordingly, the 3GPP NR system is designed to meet the demands for high-speed data and media transmission in addition to supports for large volumes of voice. The advantages of the NR system are to have a higher throughput and a lower latency in an identical platform, support for frequency division duplex (FDD) and time division duplex (TDD), and a low operation cost with an enhanced end-user environment and a simple architecture.

For more efficient data processing, dynamic TDD of the NR system may use a method for varying the number of orthogonal frequency division multiplexing (OFDM) symbols that may be used in an uplink and downlink according to data traffic directions of cell users. For example, when the downlink traffic of the cell is larger than the uplink traffic, the base station may allocate a plurality of downlink OFDM symbols to a slot (or subframe). Information about the slot configuration should be transmitted to the terminals.

In order to alleviate the path loss of radio waves and increase the transmission distance of radio waves in the mmWave band, in 5G communication systems, beamforming, massive multiple input/output (massive MIMO), full dimensional MIMO (FD-MIMO), array antenna, analog beam-forming, hybrid beamforming that combines analog beamforming and digital beamforming, and large scale antenna technologies are discussed. In addition, for network improvement of the system, in the 5G communication system, technology developments related to evolved small cells, advanced small cells, cloud radio access network (cloud RAN), ultra-dense network, device to device communication (D2D), vehicle to everything communication (V2X), wireless backhaul, non-terrestrial network communication (NTN), moving network, cooperative communication, coordinated multi-points (CoMP), interference cancellation, and the like are being made. In addition, in the 5G system, hybrid FSK and QAM modulation (FQAM) and sliding window superposition coding (SWSC), which are advanced coding modulation (ACM) schemes, and filter bank multi-carrier (FBMC), non-orthogonal multiple access (NOMA), and sparse code multiple access (SCMA), which are advanced connectivity technologies, are being developed.

Meanwhile, in a human-centric connection network where humans generate and consume information, the Internet has evolved into the Internet of Things (IoT) network, which exchanges information among distributed components such as objects. Internet of Everything (IoE) technology, which combines IoT technology with big data processing technology through connection with cloud servers, is also emerging. In order to implement IoT, technology elements such as sensing technology, wired/wireless communication and network infrastructure, service interface technology, and security technology are required, so that in recent years, technologies such as sensor network, machine to machine (M2M), and machine type communication (MTC) have been studied for connection between objects. In the IoT environment, an intelligent internet technology (IT) service that collects and analyzes data generated from connected objects to create new value in human life can be provided. Through the fusion and mixture of existing information technology (IT) and various industries, IoT can be applied to fields such as smart home, smart building, smart city, smart car or connected car, smart grid, healthcare, smart home appliance, and advanced medical service.

Accordingly, various attempts have been made to apply the 5G communication system to the IoT network. For example, technologies such as a sensor network, a machine to machine (M2M), and a machine type communication (MTC) are implemented by techniques such as beamforming, MIMO, and array antennas. The application of the cloud RAN as the big data processing technology described above is an example of the fusion of 5G technology and IoT technology. Generally, a mobile communication system has been developed to provide voice service while ensuring the user's activity.

However, the mobile communication system is gradually expanding not only the voice but also the data service, and now it has developed to the extent of providing high-speed data service. However, in a mobile communication system in which services are currently being provided, a more advanced mobile communication system is required due to a shortage phenomenon of resources and a high-speed service demand of users.

In recent years, with the explosion of mobile traffic due to the spread of smart devices, it is becoming difficult to cope with the increasing data usage for providing cellular communication services using only the existing licensed frequency spectrums or licensed frequency bands.

In such a situation, a method of using an unlicensed frequency spectrum or an unlicensed frequency band (e.g., 2.4 GHz band, 5 GHz band, or the like) for providing cellular communication services is being discussed as a solution to the problem of lack of spectrum.

Unlike in licensed bands in which telecommunications carriers secure exclusive use rights through procedures such as auctions, in unlicensed bands, multiple communication devices may be used simultaneously without restrictions on the condition that only a certain level of adjacent band protection regulations are observed. For this reason, when an unlicensed band is used for cellular communication service, it is difficult to guarantee the communication quality to the level provided in the licensed band, and it is likely that interference with existing wireless communication devices (e.g., wireless LAN devices) using the unlicensed band occurs.

In order to use LTE and NR technologies in unlicensed bands, research on coexistence with existing devices for unlicensed bands and efficient sharing of wireless channels with other wireless communication devices is to be conducted in advance. That is, it is required to develop a robust coexistence mechanism (RCM) such that devices using LTE and NR technologies in the unlicensed band do not affect the existing devices for unlicensed bands.

DETAILED DESCRIPTION OF THE INVENTION

Technical Problem

It is an aspect of the present specification to provide a method for transmitting or receiving a channel by using a guard band in one carrier in a wireless communication system, and an apparatus therefor.

Technical Solution

The present specification provides a method for receiving a downlink channel in a wireless communication system.

Specifically, a method performed by a terminal may include the operations of: receiving first information related to a guard band in a first resource region located in one carrier from a base station; receiving second information related to multiple resource sets, each of which is identified by the guard band in the first resource region, based on the first information, from the base station; and receiving, from the base station, a downlink channel on a resource indicated by the second information to be available for reception of the downlink channel. The multiple resource sets may be configured by resources except for a resource allocated for the guard band, based on the first information. The second information may be information indicating whether each of the multiple resource sets is available for reception of the downlink channel.

Furthermore, in connection with the present specification, the method performed by a terminal may further include an operation of receiving, from the base station, a physical downlink control channel (PDCCH) on a part of the multiple resource sets. The second information may be included in downlink control information (DCI) of the PDCCH.

Furthermore, in connection with the present specification, the method performed by a terminal may further include an operation of receiving, from the base station, information relating to a second resource region that the terminal monitors to receive the PDCCH.

A terminal for receiving a downlink channel in a wireless communication system may include: a transceiver; a processor; and a memory configured to store instructions for operations executed by the processor and connected to the processor. The operations may include: receiving first information related to a guard band in a first resource region located in one carrier from a base station; receiving second information related to multiple resource sets, each of which is identified by the guard band in the first resource region, based on the first information, from the base station; and receiving, from the base station, a downlink channel on a resource indicated by the second information to be available for transmission of the downlink channel. The multiple resource sets may be configured by resources except for a resource allocated for the guard band, based on the first information. The second information may be information indicating whether each of the multiple resource sets is available for reception of the downlink channel.

In addition, the operations may further include: receiving, from the base station, a physical downlink control channel (PDCCH) on a part of the multiple resource sets. The second information may be included in downlink control information (DCI) of the PDCCH.

In addition, the operations may further include: receiving, from the base station, information relating to a second resource region that the terminal monitors to receive the PDCCH.

Furthermore, in connection with the present specification, the DCI may be group-common DCI.

Furthermore, in connection with the present specification, the second resource region may correspond to a part of the multiple resource sets, and the second resource region may include a resource on which the PDCCH is received.

Furthermore, in connection with the present specification, the second resource region may be a resource to which a control resource set (CORESET) is allocated.

Furthermore, in connection with the present specification, the second information may indicate whether each of the multiple resource sets is available for transmission of the downlink channel, in a bitmap type.

Furthermore, in connection with the present specification, the downlink channel may be at least one of a physical downlink control channel (PDCCH) and a physical downlink shared channel (PDSCH).

Furthermore, in connection with the present specification, the first information and information relating to a second resource region may be transmitted through higher layer signaling.

Furthermore, in connection with the present specification, a method for transmitting a downlink channel by a base station in a wireless communication system may include the operations of: transmitting first information related to a guard band in a first resource region located in one carrier to a terminal; transmitting second information related to multiple resource sets, each of which is identified by the guard band in the first resource region, based on the first information, to the terminal; and transmitting, to the terminal, a downlink channel on a resource indicated by the second information to be available for transmission of the downlink channel. The multiple resource sets may be configured by resources except for a resource allocated for the guard band, based on the first information. The second information may be information indicating whether each of the multiple resource sets is available for transmission of the downlink channel.

Furthermore, in connection with the present specification, the second information may indicate whether each of the multiple resource sets is available for transmission of the downlink channel, in a bitmap type.

Advantageous Effects

The present specification is advantageous in that efficient channel transmission is made possible by providing a method for configuring resources for uplink channel and downlink channel transmission when a guard band exists inside a single carrier.

Advantageous effects obtainable in the present specification are not limited to the above-mentioned advantageous effects, and other advantageous effects not mentioned herein may be clearly understood by a person skilled in the art to which the present disclosure pertains from the following description.

MODE FOR CARRYING OUT THE INVENTION

Figure 1:
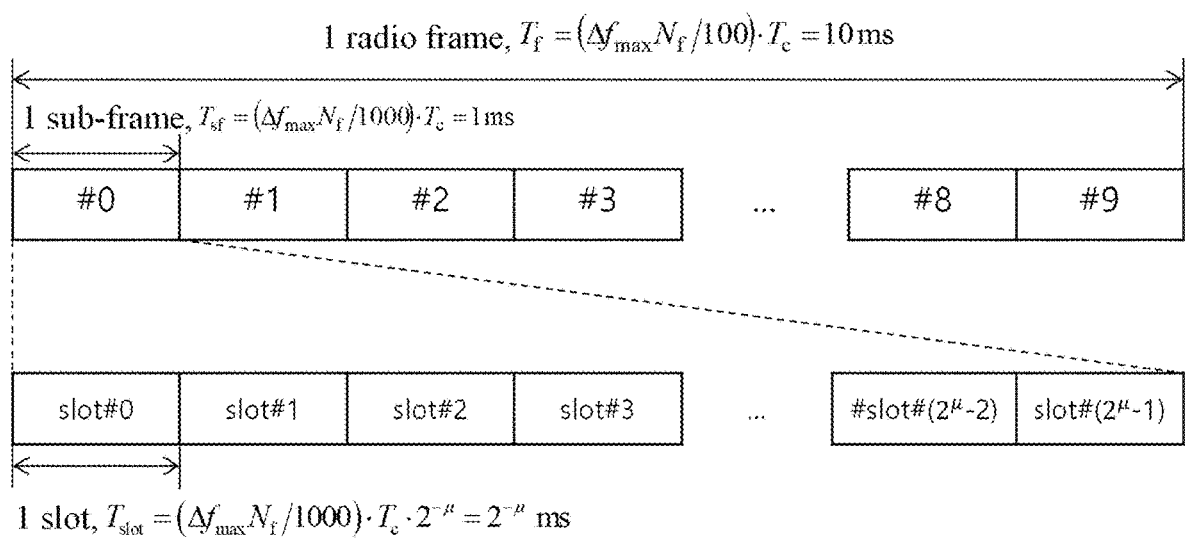
FIG. 1 illustrates an example of a wireless frame structure used in a wireless communication system.

Terms used in the specification adopt general terms which are currently widely used as possible by considering functions in the present invention, but the terms may be changed depending on an intention of those skilled in the art, customs, and emergence of new technology. Further, in a specific case, there is a term arbitrarily selected by an applicant and in this case, a meaning thereof will be described in a corresponding description part of the invention. Accordingly, it intends to be revealed that a term used in the specification should be analyzed based on not just a name of the term but a substantial meaning of the term and contents throughout the specification.

Throughout this specification and the claims that follow, when it is described that an element is "connected" to another element, the element may be "directly connected" to the other element or "electrically connected" to the other element through a third element. Further, unless explicitly described to the contrary, the word "comprise" will be understood to imply the inclusion of stated elements but not the exclusion of any other elements unless otherwise stated. Moreover, limitations such as "more than or equal to" or "less than or equal to" based on a specific threshold may be appropriately substituted with "more than" or "less than", respectively, in some exemplary embodiments.

The following technology may be used in various wireless access systems, such as code division multiple access (CDMA), frequency division multiple access (FDMA), time division multiple access (TDMA), orthogonal frequency division multiple access (OFDMA), single carrier-FDMA (SC-FDMA), and the like. The CDMA may be implemented by a wireless technology such as universal terrestrial radio access (UTRA) or CDMA2000. The TDMA may be implemented by a wireless technology such as global system for mobile communications (GSM)/general packet radio service (GPRS)/enhanced data rates for GSM evolution (EDGE). The OFDMA may be implemented by a wireless technology such as IEEE 802.11(Wi-Fi), IEEE 802.16(WiMAX), IEEE 802-20, evolved UTRA (E-UTRA), and the like. The UTRA is a part of a universal mobile telecommunication system (UMTS). 3rd generation partnership project (3GPP) long term evolution (LTE) is a part of an evolved UMTS (E-UMTS) using evolved-UMTS terrestrial radio access (E-UTRA) and LTE-advanced (A) is an evolved version of the 3GPP LTE. 3GPP new radio (NR) is a system designed separately from LTE/LTE-A, and is a system for supporting enhanced mobile broadband (eMBB), ultra-reliable and low latency communication (URLLC), and massive machine type communication (mMTC) services, which are requirements of IMT-2020. For the clear description, 3GPP NR is mainly described, but the technical idea of the present invention is not limited thereto.

Unless otherwise specified herein, the base station may include a next generation node B (gNB) defined in 3GPP NR. Furthermore, unless otherwise specified, a terminal may include a user equipment (UE). Hereinafter, in order to help the understanding of the description, each content is described separately by the embodiments, but each embodiment may be used in combination with each other. In the present specification, the configuration of the UE may indicate a configuration by the base station. In more detail, the base station may configure a value of a parameter used in an operation of the UE or a wireless communication system by transmitting a channel or a signal to the UE.

FIG. 1 illustrates an example of a wireless frame structure used in a wireless communication system.

Referring to FIG. 1, the wireless frame (or radio frame) used in the 3GPP NR system may have a length of 10 ms ($\Delta f_{max} N_f / 100) * T_c$). In addition, the wireless frame includes 10 subframes (SFs) having equal sizes. Herein, $\Delta f_{max} = 480 * 10^3$ Hz, $N_f = 4096$, $T_c = 1/(\Delta f_{ref} * N_{f,ref})$, $\Delta f_{ref} = 15 * 10^3$ Hz, and $N_{f,ref} = 2048$. Numbers from 0 to 9 may be respectively allocated to 10 subframes within one wireless frame. Each subframe has a length of 1 ms and may include one or more slots according to a subcarrier spacing. More specifically, in the 3GPP NR system, the subcarrier spacing that may be used is $15 * 2^\mu$ kHz, and $\mu$ can have a value of $\mu = 0, 1, 2, 3, 4$ as subcarrier spacing configuration. That is, 15 kHz, 30 kHz, 60 kHz, 120 kHz and 240 kHz may be used for subcarrier spacing. One subframe having a length of 1 ms may include $2^\mu$ slots. In this case, the length of each slot is $2^{-\mu}$ ms. Numbers from 0 to $2^\mu - 1$ may be respectively allocated to $2^\mu$ slots within one wireless frame. In addition, numbers from 0 to $10 * 2^\mu - 1$ may be respectively allocated to slots within one subframe. The time resource may be distinguished by at least one of a wireless frame number (also referred to as a wireless frame index), a subframe number (also referred to as a subframe index), and a slot number (or a slot index).

Figure 2:
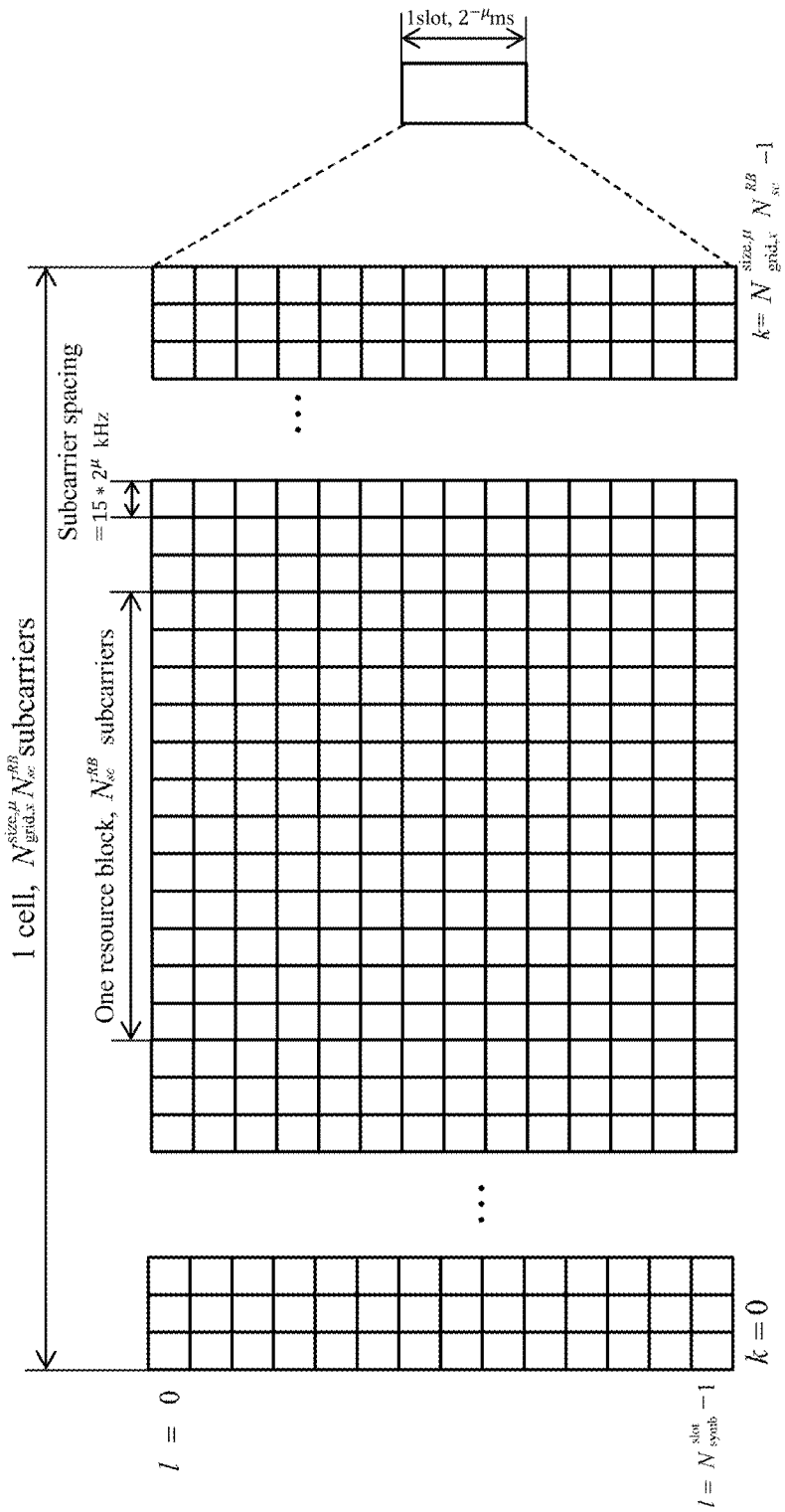
FIG. 2 illustrates an example of a downlink (DL)/uplink (UL) slot structure in a wireless communication system.

FIG. 2 illustrates an example of a downlink (DL)/uplink (UL) slot structure in a wireless communication system. In particular, FIG. 2 shows the structure of the resource grid of the 3GPP NR system.

There is one resource grid per antenna port. Referring to FIG. 2, a slot includes a plurality of orthogonal frequency division multiplexing (OFDM) symbols in a time domain and includes a plurality of resource blocks (RBs) in a frequency domain. An OFDM symbol also means one symbol section. Unless otherwise specified, OFDM symbols may be referred to simply as symbols. One RB includes 12 consecutive subcarriers in the frequency domain. Referring to FIG. 2, a signal transmitted from each slot may be represented by a resource grid including $N^{size,\mu}_{grid,x} * N^{RB}_{sc}$ subcarriers, and $N^{slot}_{symb}$ OFDM symbols. Here, x=DL when the signal is a DL signal, and x=UL when the signal is an UL signal. $N^{size,\mu}_{grid,x}$ represents the number of resource blocks (RBs) according to the subcarrier spacing constituent $\mu$ (x is DL or UL), and $N^{slot}_{symb}$ represents the number of OFDM symbols in a slot. $N^{RB}_{sc}$ is the number of subcarriers constituting one RB and $N^{RB}_{sc} = 12$. An OFDM symbol may be referred to as a cyclic shift OFDM (CP-OFDM) symbol or a discrete Fourier transform spread OFDM (DFT-s-OFDM) symbol according to a multiple access scheme.

The number of OFDM symbols included in one slot may vary according to the length of a cyclic prefix (CP). For example, in the case of a normal CP, one slot includes 14 OFDM symbols, but in the case of an extended CP, one slot may include 12 OFDM symbols. In a specific embodiment, the extended CP can only be used at 60 kHz subcarrier spacing. In FIG. 2, for convenience of description, one slot is configured with 14 OFDM symbols by way of example, but embodiments of the present disclosure may be applied in a similar manner to a slot having a different number of OFDM symbols. Referring to FIG. 2, each OFDM symbol includes $N^{size,\mu}_{grid,x} * N^{RB}_{sc}$ subcarriers in the frequency domain. The type of subcarrier may be divided into a data subcarrier for data transmission, a reference signal subcarrier for transmission of a reference signal, and a guard band. The carrier frequency is also referred to as the center frequency (fc).

One RB may be defined by $N^{RB}_{sc}$ (e. g., 12) consecutive subcarriers in the frequency domain. For reference, a resource configured with one OFDM symbol and one subcarrier may be referred to as a resource element (RE) or a tone. Therefore, one RB can be configured with $N^{slot}_{symb} * N^{RB}_{sc}$ resource elements. Each resource element in the resource grid can be uniquely defined by a pair of indexes (k, 1) in one slot. k may be an index assigned from 0 to $N^{size,\mu}_{grid, x} * N^{RB}_{sc} - 1$ in the frequency domain, and 1 may be an index assigned from 0 to $N^{slot}_{symb} - 1$ in the time domain.

In order for the UE to receive a signal from the base station or to transmit a signal to the base station, the time/frequency of the UE may be synchronized with the time/frequency of the base station. This is because when the base station and the UE are synchronized, the UE can determine the time and frequency parameters necessary for demodulating the DL signal and transmitting the UL signal at the correct time.

Each symbol of a radio frame used in a time division duplex (TDD) or an unpaired spectrum may be configured with at least one of a DL symbol, an UL symbol, and a flexible symbol. A radio frame used as a DL carrier in a frequency division duplex (FDD) or a paired spectrum may be configured with a DL symbol or a flexible symbol, and a radio frame used as a UL carrier may be configured with a UL symbol or a flexible symbol. In the DL symbol, DL transmission is possible, but UL transmission is impossible. In the UL symbol, UL transmission is possible, but DL transmission is impossible. The flexible symbol may be determined to be used as a DL or an UL according to a signal.

Information on the type of each symbol, i.e., information representing any one of DL symbols, UL symbols, and flexible symbols, may be configured with a cell-specific or common radio resource control (RRC) signal. In addition, information on the type of each symbol may additionally be configured with a UE-specific or dedicated RRC signal. The base station informs, by using cell-specific RRC signals, i) the period of cell-specific slot configuration, ii) the number of slots with only DL symbols from the beginning of the period of cell-specific slot configuration, iii) the number of DL symbols from the first symbol of the slot immediately following the slot with only DL symbols, iv) the number of slots with only UL symbols from the end of the period of cell specific slot configuration, and v) the number of UL symbols from the last symbol of the slot immediately before the slot with only the UL symbol. Here, symbols not configured with any one of a UL symbol and a DL symbol are flexible symbols.

When the information on the symbol type is configured with the UE-specific RRC signal, the base station may signal whether the flexible symbol is a DL symbol or an UL symbol in the cell-specific RRC signal. In this case, the UE-specific RRC signal can not change a DL symbol or a UL symbol configured with the cell-specific RRC signal into another symbol type. The UE-specific RRC signal may signal the number of DL symbols among the $N^{slot}_{symb}$ symbols of the corresponding slot for each slot, and the number of UL symbols among the $N^{slot}_{symb}$ symbols of the corresponding slot. In this case, the DL symbol of the slot may be continuously configured with the first symbol to the i-th symbol of the slot. In addition, the UL symbol of the slot may be continuously configured with the j-th symbol to the last symbol of the slot (where i<j). In the slot, symbols not configured with any one of a UL symbol and a DL symbol are flexible symbols.

The type of symbol configured with the above RRC signal may be referred to as a semi-static DL/UL configuration. In the semi-static DL/UL configuration previously configured with RRC signals, the flexible symbol may be indicated as a DL symbol, an UL symbol, or a flexible symbol through dynamic slot format information (SFI) transmitted on a physical DL control channel (PDCCH). In this case, the DL symbol or UL symbol configured with the RRC signal is not changed to another symbol type. Table 1 exemplifies the dynamic SFI that the base station can indicate to the UE.

TABLE 1

| | Symbol number in a slot | | | | | | | | | | | | | |
|---|---|---|---|---|---|---|---|---|---|---|---|---|---|---|
| index | 0 | 1 | 2 | 3 | 4 | 5 | 6 | 7 | 8 | 9 | 10 | 11 | 12 | 13 |
| 0 | D | D | D | D | D | D | D | D | D | D | D | D | D | D |
| 1 | U | U | U | U | U | U | U | U | U | U | U | U | U | U |
| 2 | X | X | X | X | X | X | X | X | X | X | X | X | X | X |
| 3 | D | D | D | D | D | D | D | D | D | D | D | D | D | X |
| 4 | D | D | D | D | D | D | D | D | D | D | D | D | X | X |
| 5 | D | D | D | D | D | D | D | D | D | D | D | X | X | X |
| 6 | D | D | D | D | D | D | D | D | D | D | X | X | X | X |
| 7 | D | D | D | D | D | D | D | D | D | X | X | X | X | X |
| 8 | X | X | X | X | X | X | X | X | X | X | X | X | X | U |
| 9 | X | X | X | X | X | X | X | X | X | X | X | X | U | U |
| 10 | X | U | U | U | U | U | U | U | U | U | U | U | U | U |
| 11 | X | X | U | U | U | U | U | U | U | U | U | U | U | U |
| 12 | X | X | X | U | U | U | U | U | U | U | U | U | U | U |
| 13 | X | X | X | X | U | U | U | U | U | U | U | U | U | U |
| 14 | X | X | X | X | X | U | U | U | U | U | U | U | U | U |
| 15 | X | X | X | X | X | X | U | U | U | U | U | U | U | U |
| 16 | D | X | X | X | X | X | X | X | X | X | X | X | X | X |
| 17 | D | D | X | X | X | X | X | X | X | X | X | X | X | X |
| 18 | D | D | D | X | X | X | X | X | X | X | X | X | X | X |
| 19 | D | X | X | X | X | X | X | X | X | X | X | X | X | U |
| 20 | D | D | X | X | X | X | X | X | X | X | X | X | X | U |
| 21 | D | D | D | X | X | X | X | X | X | X | X | X | X | U |
| 22 | D | X | X | X | X | X | X | X | X | X | X | X | U | U |
| 23 | D | D | X | X | X | X | X | X | X | X | X | X | U | U |
| 24 | D | D | D | X | X | X | X | X | X | X | X | X | U | U |
| 25 | D | X | X | X | X | X | X | X | X | X | X | U | U | U |
| 26 | D | D | X | X | X | X | X | X | X | X | X | U | U | U |
| 27 | D | D | D | X | X | X | X | X | X | X | X | U | U | U |
| 28 | D | D | D | D | D | D | D | D | D | D | D | D | X | U |
| 29 | D | D | D | D | D | D | D | D | D | D | D | X | X | U |
| 30 | D | D | D | D | D | D | D | D | D | D | X | X | X | U |
| 31 | D | D | D | D | D | D | D | D | D | X | X | X | U | U |

TABLE 1-continued

| | Symbol number in a slot | | | | | | | | | | | | | |
|---|---|---|---|---|---|---|---|---|---|---|---|---|---|---|
| index | 0 | 1 | 2 | 3 | 4 | 5 | 6 | 7 | 8 | 9 | 10 | 11 | 12 | 13 |
| 32 | D | D | D | D | D | D | D | D | D | D | X | X | U | U |
| 33 | D | D | D | D | D | D | D | D | X | X | X | X | U | U |
| 34 | D | X | U | U | U | U | U | U | U | U | U | U | U | U |
| 35 | D | D | X | U | U | U | U | U | U | U | U | U | U | U |
| 36 | D | D | D | X | U | U | U | U | U | U | U | U | U | U |
| 37 | D | X | X | U | U | U | U | U | U | U | U | U | U | U |
| 38 | D | D | X | X | U | U | U | U | U | U | U | U | U | U |
| 39 | D | D | D | X | X | U | U | U | U | U | U | U | U | U |
| 40 | D | X | X | X | U | U | U | U | U | U | U | U | U | U |
| 41 | D | D | X | X | X | U | U | U | U | U | U | U | U | U |
| 42 | D | D | D | X | X | X | U | U | U | U | U | U | U | U |
| 43 | D | D | D | D | D | D | D | D | D | X | X | X | X | U |
| 44 | D | D | D | D | D | X | X | X | X | X | X | X | U | U |
| 45 | D | D | D | D | D | X | X | U | U | U | U | U | U | U |
| 46 | D | D | D | D | X | U | D | D | D | D | D | X | U |
| 47 | D | D | X | U | U | U | D | D | X | U | U | U | U |
| 48 | D | X | U | U | U | U | D | X | U | U | U | U | U |
| 49 | D | D | D | X | X | U | D | D | D | X | X | U |
| 50 | D | D | X | X | U | U | D | D | X | X | U | U | U |
| 51 | D | X | X | U | U | U | D | X | X | U | U | U | U |
| 52 | D | X | X | X | X | U | D | X | X | X | X | X | U |
| 53 | D | D | X | X | X | U | D | D | X | X | X | X | U |
| 54 | X | X | X | X | X | X | D | D | D | D | D | D | D |
| 55 | D | D | X | X | X | U | U | U | D | D | D | D | D |
| 56~255 | Reserved | | | | | | | | | | | | | |

In Table 1, D denotes a DL symbol, U denotes a UL symbol, and X denotes a flexible symbol. As shown in Table 1, up to two DL/UL switching in one slot may be allowed.

Figure 3:
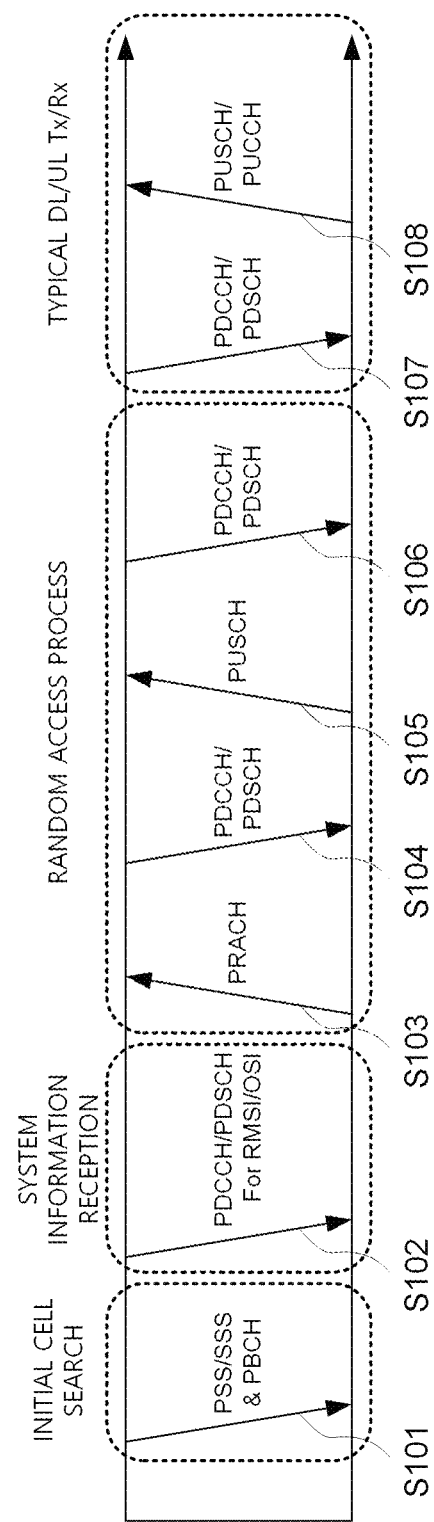
FIG. 3 is a diagram for explaining a physical channel used in a 3GPP system and a typical signal transmission method using the physical channel.

FIG. 3 is a diagram for explaining a physical channel used in a 3GPP system (e.g., NR) and a typical signal transmission method using the physical channel.

If the power of the UE is turned on or the UE camps on a new cell, the UE performs an initial cell search (S101). Specifically, the UE may synchronize with the BS in the initial cell search. For this, the UE may receive a primary synchronization signal (PSS) and a secondary synchronization signal (SSS) from the base station to synchronize with the base station, and obtain information such as a cell index. Thereafter, the UE can receive the physical broadcast channel from the base station and obtain the broadcast information in the cell.

Upon completion of the initial cell search, the UE receives a physical downlink shared channel (PDSCH) according to the physical downlink control channel (PDCCH) and information in the PDCCH, so that the UE can obtain more specific system information than the system information obtained through the initial cell search (S102). Herein, the system information received by the UE is cell-common system information for normal operating of the UE in a physical layer in radio resource control (RRC) and is referred to remaining system information, or system information block (SIB) 1 is called.

When the UE initially accesses the base station or does not have radio resources for signal transmission (i.e. the UE at RRC IDLE mode), the UE may perform a random access procedure on the base station (operations S103 to S106). First, the UE can transmit a preamble through a physical random access channel (PRACH) (S103) and receive a response message for the preamble from the base station through the PDCCH and the corresponding PDSCH (S104). When a valid random access response message is received by the UE, the UE transmits data including the identifier of the UE and the like to the base station through a physical uplink shared channel (PUSCH) indicated by the UL grant transmitted through the PDCCH from the base station (S105). Next, the UE waits for reception of the PDCCH as an indication of the base station for collision resolution. If the UE successfully receives the PDCCH through the identifier of the UE (S106), the random access process is terminated. The UE may obtain UE-specific system information for normal operating of the UE in the physical layer in RRC layer during a random access process. When the UE obtain the UE-specific system information, the UE enter RRC connecting mode (RRC_CONNECTED mode).

The RRC layer is used for generating or managing message for controlling connection between the UE and radio access network (RAN). In more detail, the base station and the UE, in the RRC layer, may perform broadcasting cell system information required by every UE in the cell, managing mobility and handover, measurement report of the UE, storage management including UE capability management and device management. In general, the RRC signal is not changed and maintained quite long interval since a period of an update of a signal delivered in the RRC layer is longer than a transmission time interval (TTI) in physical layer.

After the above-described procedure, the UE receives PDCCH/PDSCH (S107) and transmits a physical uplink shared channel (PUSCH)/physical uplink control channel (PUCCH) (S108) as a general UL/DL signal transmission procedure. In particular, the UE may receive downlink control information (DCI) through the PDCCH. The DCI may include control information such as resource allocation information for the UE. Also, the format of the DCI may vary depending on the intended use. The uplink control information (UCI) that the UE transmits to the base station through UL includes a DL/UL ACK/NACK signal, a channel quality indicator (CQI), a precoding matrix index (PMI), a rank indicator (RI), and the like. Here, the CQI, PMI, and RI may be included in channel state information (CSI). In the 3GPP NR system, the UE may transmit control information such as HARQ-ACK and CSI described above through the PUSCH and/or PUCCH.

Figure 4:
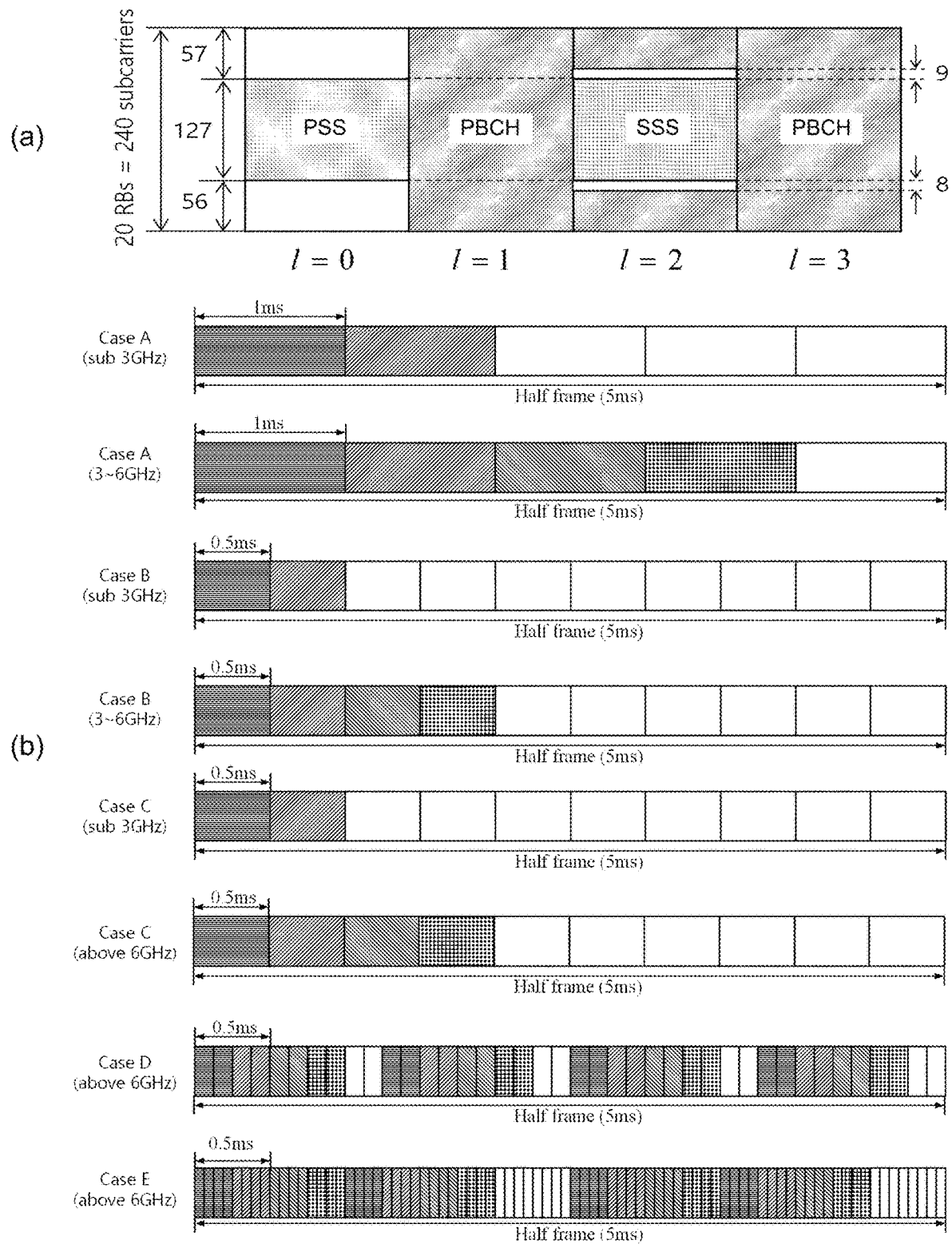
FIG. 4 illustrates an SS/PBCH block for initial cell access in a 3GPP NR system.

FIG. 4 illustrates an SS/PBCH block for initial cell access in a 3GPP NR system.

When the power is turned on or wanting to access a new cell, the UE may obtain time and frequency synchronization with the cell and perform an initial cell search procedure. The UE may detect a physical cell identity $N^{cell}_{ID}$ of the cell during a cell search procedure. For this, the UE may receive a synchronization signal, for example, a primary synchronization signal (PSS) and a secondary synchronization signal (SSS), from a base station, and synchronize with the base station. In this case, the UE can obtain information such as a cell identity (ID).

Referring to FIG. 4(a), a synchronization signal (SS) will be described in more detail. The synchronization signal can be classified into PSS and SSS. The PSS may be used to obtain time domain synchronization and/or frequency domain synchronization, such as OFDM symbol synchronization and slot synchronization. The SSS can be used to obtain frame synchronization and cell group ID. Referring to FIG. 4(a) and Table 2, the SS/PBCH block can be configured with consecutive 20 RBs (=240 subcarriers) in the frequency axis, and can be configured with consecutive 4 OFDM symbols in the time axis. In this case, in the SS/PBCH block, the PSS is transmitted in the first OFDM symbol and the SSS is transmitted in the third OFDM symbol through the 56th to 182th subcarriers. Here, the lowest subcarrier index of the SS/PBCH block is numbered from 0. In the first OFDM symbol in which the PSS is transmitted, the base station does not transmit a signal through the remaining subcarriers, i.e., 0th to 55th and 183th to 239th subcarriers. In addition, in the third OFDM symbol in which the SSS is transmitted, the base station does not transmit a signal through 48th to 55th and 183th to 191th subcarriers. The base station transmits a physical broadcast channel (PBCH) through the remaining RE except for the above signal in the SS/PBCH block.

TABLE 2

| Channel or signal | OFDM symbol number l relative to the start of an SS/PBCH block | Subcarrier number k relative to the start of an SS/PBCH block |
| --- | --- | --- |
| PSS | 0 | 56, 57, . . . , 182 |
| SSS | 2 | 56, 57, . . . , 182 |
| Set to 0 | 0 | 0, 1, . . . , 55, 183, 184, . . . , 239 |
|  | 2 | 48, 49, . . . , 55, 183, 184, . . . , 191 |
| PBCH | 1, 3 | 0, 1, . . . , 239 |
|  | 2 | 0, 1, . . . , 47, 192, 193, . . . , 239 |
| DM-RS for PBCH | 1, 3 | 0 + v, 4 + v, 8 + v, . . . , 236 + v |
|  | 2 | 0 + v, 4 + v, 8 + v, . . . , 44 + v 192 + v, 196 + v, . . . , 236 + v |

The SS allows a total of 1008 unique physical layer cell IDs to be grouped into 336 physical-layer cell-identifier groups, each group including three unique identifiers, through a combination of three PSSs and SSSs, specifically, such that each physical layer cell ID is to be only a part of one physical-layer cell-identifier group. Therefore, the physical layer cell ID $N^{cell}_{ID}=3N^{(1)}_{ID}+N^{(2)}_{ID}$ can be uniquely defined by the index $N^{(1)}_{ID}$ ranging from 0 to 335 indicating a physical-layer cell-identifier group and the index $N^{(2)}_{ID}$ ranging from 0 to 2 indicating a physical-layer identifier in the physical-layer cell-identifier group. The UE may detect the PSS and identify one of the three unique physical-layer identifiers. In addition, the UE can detect the SSS and identify one of the 336 physical layer cell IDs associated with the physical-layer identifier. In this case, the sequence $d_{PSS}(n)$ of the PSS is as follows.

$$d_{PSS}(n)=1-2x(m)$$

$$m=(n+43N^{(2)}_{ID})\bmod 127$$

$$0\le n<127$$

Here, x(i+7)=(x(i+4)+x(i))mod 2 and is given as,

[x(6)x(5)x(4)x(3)x(2)x(1)x(0)]=[1 1 1 0 1 1 0]

Further, the sequence $d_{SSS}(n)$ of the SSS is as follows.

$$d_{SSS}(n) = [1 - 2x_0((n + m_0)\bmod 127)][1 - 2x_1((n + m_1)\bmod 127)]$$

$$m_0 = 15\left\lfloor\frac{N^{(1)}_{ID}}{112}\right\rfloor + 5N^{(2)}_{ID}$$

$$m_1 = N^{(1)}_{ID}\bmod 112$$

$$0 \le n < 127$$

$$x_0(i + 7) = (x_0(i + 4) + x_0(i))\bmod 2$$

Here, $x_1(i+7)=(x_1(i+1)+x_1(i))\bmod 2$ and is given as,

[x₀(6)x₀(5)x₀(4)x₀(3)x₀(2)x₀(1)x₀(0)]=[0 0 0 0 0 0 1]

[x₁(6)x₁(5)x₁(4)x₁(3)x₁(2)x₁(1)x₁(0)]=[0 0 0 0 0 0 1]

A radio frame with a 10 ms length may be divided into two half frames with a 5 ms length. Referring to FIG. 4B, a description will be made of a slot in which SS/PBCH blocks are transmitted in each half frame. A slot in which the SS/PBCH block is transmitted may be any one of the cases A, B, C, D, and E. In the case A, the subcarrier spacing is 15 kHz and the starting time point of the SS/PBCH block is the ({2, 8}+14*n)-th symbol. In this case, n=0 or 1 at a carrier frequency of 3 GHz or less. In addition, it may be n=0, 1, 2, 3 at carrier frequencies above 3 GHz and below 6 GHz. In the case B, the subcarrier spacing is 30 kHz and the starting time point of the SS/PBCH block is {4, 8, 16, 20}+28*n. In this case, n=0 at a carrier frequency of 3 GHz or less. In addition, it may be n=0, 1 at carrier frequencies above 3 GHz and below 6 GHz. In the case C, the subcarrier spacing is 30 kHz and the starting time point of the SS/PBCH block is the ({2, 8}+14*n)-th symbol. In this case, n=0 or 1 at a carrier frequency of 3 GHz or less. In addition, it may be n=0, 1, 2, 3 at carrier frequencies above 3 GHz and below 6 GHz. In the case D, the subcarrier spacing is 120 kHz and the starting time point of the SS/PBCH block is the ({4, 8, 16, 20}+28*n)-th symbol. In this case, at a carrier frequency of 6 GHz or more, n=0, 1, 2, 3, 5, 6, 7, 8, 10, 11, 12, 13, 15, 16, 17, 18. In the case E, the subcarrier spacing is 240 kHz and the starting time point of the SS/PBCH block is the ({8, 12, 16, 20, 32, 36, 40, 44}+56*n)-th symbol. In this case, at a carrier frequency of 6 GHz or more, n=0, 1, 2, 3, 5, 6, 7, 8.

Figure 5:
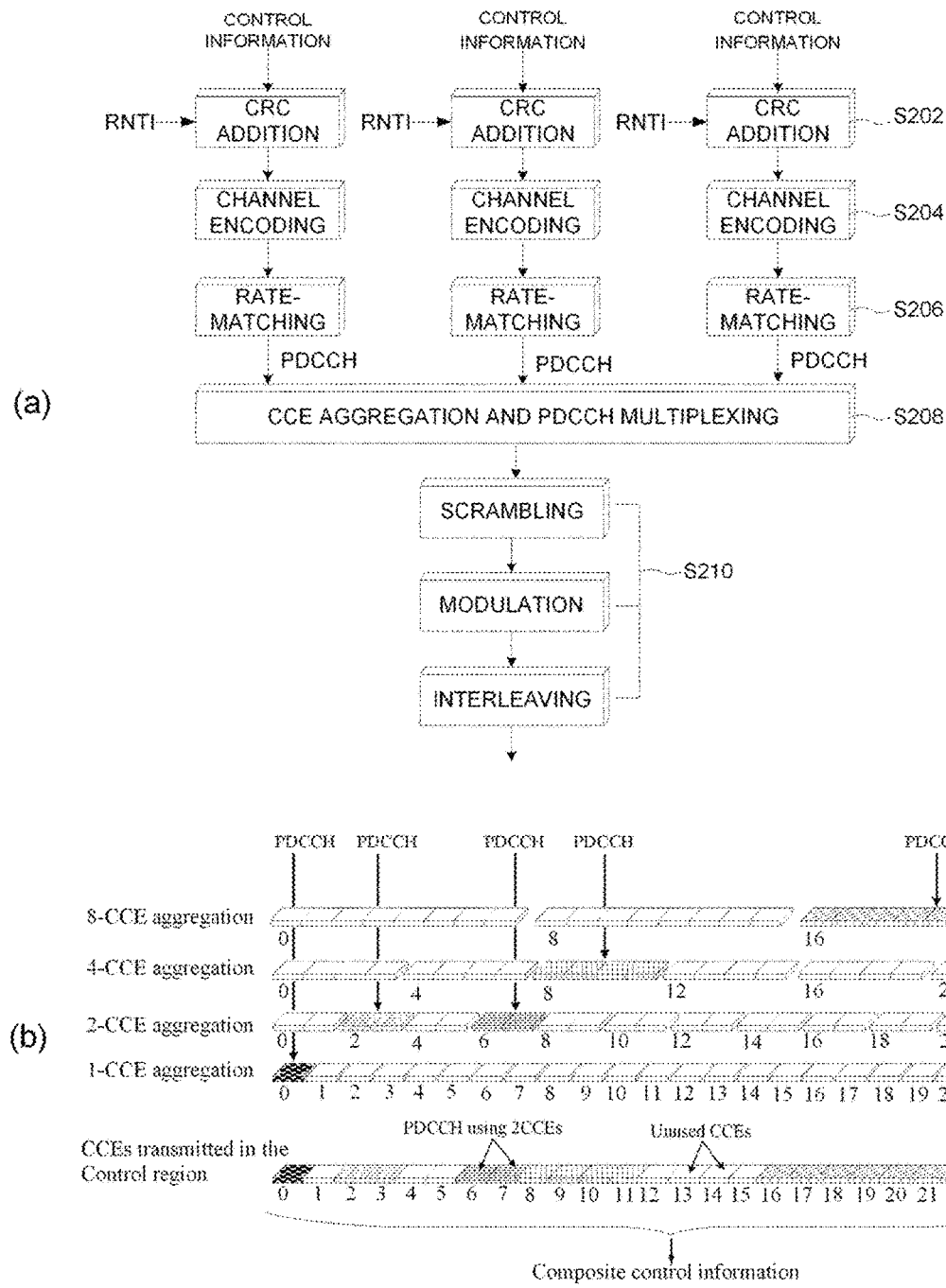
FIG. 5 illustrates a procedure for transmitting control information and a control channel in a 3GPP NR system.

FIG. 5 illustrates a procedure for transmitting control information and a control channel in a 3GPP NR system. Referring to FIG. 5(a), the base station may add a cyclic redundancy check (CRC) masked (e.g., an XOR operation) with a radio network temporary identifier (RNTI) to control information (e.g., downlink control information (DCI)) (S202). The base station may scramble the CRC with an RNTI value determined according to the purpose/target of each control information. The common RNTI used by one or more UEs can include at least one of a system information RNTI (SI-RNTI), a paging RNTI (P-RNTI), a random access RNTI (RA-RNTI), and a transmit power control RNTI (TPC-RNTI). In addition, the UE-specific RNTI may include at least one of a cell temporary RNTI (C-RNTI), and the CS-RNTI. Thereafter, the base station may perform rate-matching (S206) according to the amount of resource(s) used for PDCCH transmission after performing channel encoding (e.g., polar coding) (S204). Thereafter, the base station may multiplex the DCI(s) based on the control channel element (CCE) based PDCCH structure (S208). In addition, the base station may apply an additional process (S210) such as scrambling, modulation (e.g., QPSK), interleaving, and the like to the multiplexed DCI(s), and then map the DCI(s) to the resource to be transmitted. The CCE is a basic resource unit for the PDCCH, and one CCE may include a plurality (e.g., six) of resource element groups (REGs). One REG may be configured with a plurality (e.g., 12) of REs. The number of CCEs used for one PDCCH may be defined as an aggregation level. In the 3GPP NR system, an aggregation level of 1, 2, 4, 8, or 16 may be used. FIG. 5(b) is a diagram related to a CCE aggregation level and the multiplexing of a PDCCH and illustrates the type of a CCE aggregation level used for one PDCCH and CCE(s) transmitted in the control area according thereto.

Figure 6:
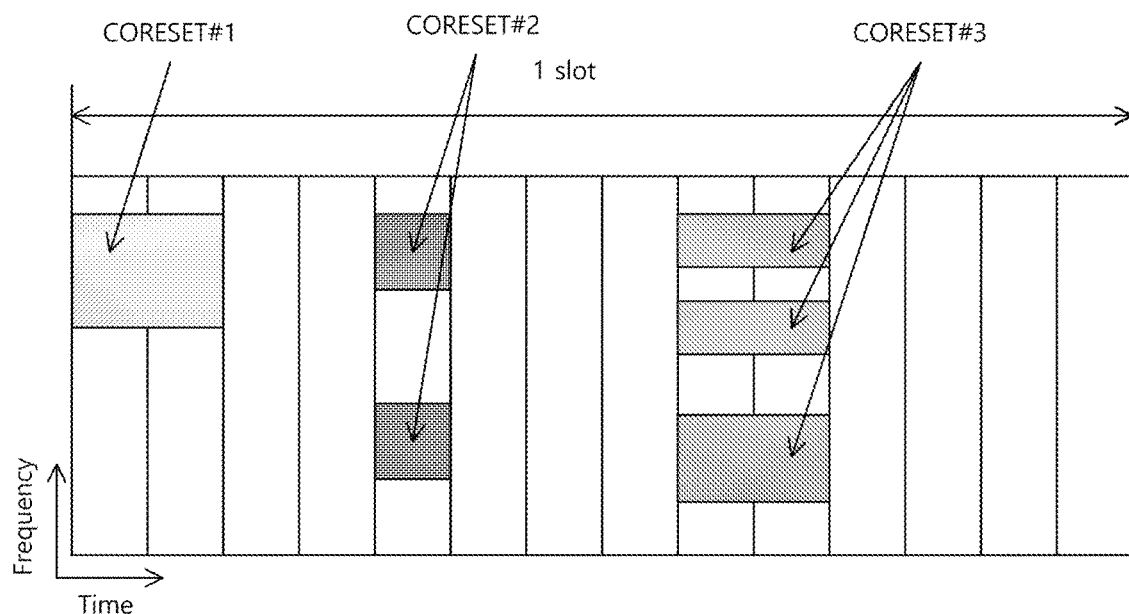
FIG. 6 illustrates a control resource set (CORESET) in which a physical downlink control channel (PUCCH) may be transmitted in a 3GPP NR system.

FIG. 6 illustrates a control resource set (CORESET) in which a physical downlink control channel (PUCCH) may be transmitted in a 3GPP NR system.

The CORESET is a time-frequency resource in which PDCCH, that is, a control signal for the UE, is transmitted. In addition, a search space to be described later may be mapped to one CORESET. Therefore, the UE may monitor the time-frequency domain designated as CORESET instead of monitoring all frequency bands for PDCCH reception, and decode the PDCCH mapped to CORESET. The base station may configure one or more CORESETs for each cell to the UE. The CORESET may be configured with up to three consecutive symbols on the time axis. In addition, the CORESET may be configured in units of six consecutive PRBs on the frequency axis. In the embodiment of FIG. 5, CORESET #1 is configured with consecutive PRBs, and CORESET #2 and CORESET #3 are configured with discontinuous PRBs. The CORESET can be located in any symbol in the slot. For example, in the embodiment of FIG. 5, CORESET #1 starts at the first symbol of the slot, CORESET #2 starts at the fifth symbol of the slot, and CORESET #9 starts at the ninth symbol of the slot.

Figure 7:
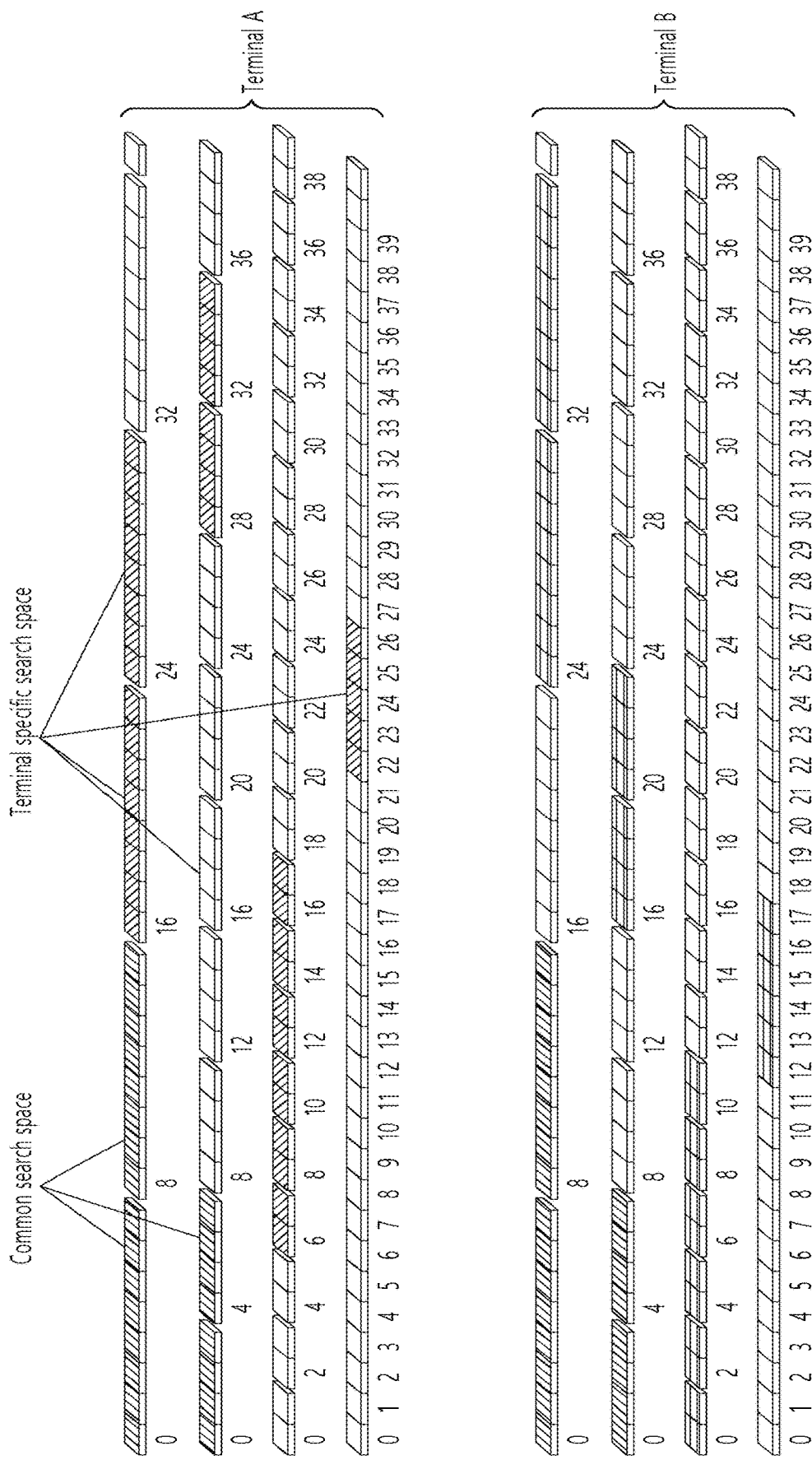
FIG. 7 illustrates a method for configuring a PDCCH search space in a 3GPP NR system.

FIG. 7 illustrates a method for setting a PUCCH search space in a 3GPP NR system.

In order to transmit the PDCCH to the UE, each CORESET may have at least one search space. In the embodiment of the present disclosure, the search space is a set of all time-frequency resources (hereinafter, PDCCH candidates) through which the PDCCH of the UE is capable of being transmitted. The search space may include a common search space that the UE of the 3GPP NR is required to commonly search and a UE-specific or a UE-specific search space that a specific UE is required to search. In the common search space, UE may monitor the PDCCH that is set so that all UEs in the cell belonging to the same base station commonly search. In addition, the UE-specific search space may be set for each UE so that UEs monitor the PDCCH allocated to each UE at different search space position according to the UE. In the case of the UE-specific search space, the search space between the UEs may be partially overlapped and allocated due to the limited control area in which the PDCCH may be allocated. Monitoring the PDCCH includes blind decoding for PDCCH candidates in the search space. When the blind decoding is successful, it may be expressed that the PDCCH is (successfully) detected/received and when the blind decoding fails, it may be expressed that the PDCCH is not detected/not received, or is not successfully detected/received.

For convenience of explanation, a PDCCH scrambled with a group common (GC) RNTI previously known to one or more UEs so as to transmit DL control information to the one or more UEs is referred to as a group common (GC) PDCCH or a common PDCCH. In addition, a PDCCH scrambled with a specific-terminal RNTI that a specific UE already knows so as to transmit UL scheduling information or DL scheduling information to the specific UE is referred to as a specific-UE PDCCH. The common PDCCH may be included in a common search space, and the UE-specific PDCCH may be included in a common search space or a UE-specific PDCCH.

The base station may signal each UE or UE group through a PDCCH about information (i.e., DL Grant) related to resource allocation of a paging channel (PCH) and a downlink-shared channel (DL-SCH) that are a transmission channel or information (i.e., UL grant) related to resource allocation of a uplink-shared channel (UL-SCH) and a hybrid automatic repeat request (HARD). The base station may transmit the PCH transport block and the DL-SCH transport block through the PDSCH. The base station may transmit data excluding specific control information or specific service data through the PDSCH. In addition, the UE may receive data excluding specific control information or specific service data through the PDSCH.

The base station may include, in the PDCCH, information on to which UE (one or a plurality of UEs) PDSCH data is transmitted and how the PDSCH data is to be received and decoded by the corresponding UE, and transmit the PDCCH. For example, it is assumed that the DCI transmitted on a specific PDCCH is CRC masked with an RNTI of "A", and the DCI indicates that PDSCH is allocated to a radio resource (e.g., frequency location) of "B" and indicates transmission format information (e.g., transport block size, modulation scheme, coding information, etc.) of "C". The UE monitors the PDCCH using the RNTI information that the UE has. In this case, if there is a UE which performs blind decoding the PDCCH using the "A" RNTI, the UE receives the PDCCH, and receives the PDSCH indicated by "B" and "C" through the received PDCCH information.

Table 3 shows an embodiment of a physical uplink control channel (PUCCH) used in a wireless communication system.

TABLE 3

| PUCCH format | Length in OFDM symbols | Number of bits |
|---|---|---|
| 0 | 1-2 | ≤2 |
| 1 | 4-14 | ≤2 |
| 2 | 1-2 | >2 |
| 3 | 4-14 | >2 |
| 4 | 4-14 | >2 |

The PUCCH may be used to transmit the following UL control information (UCI).

Scheduling Request (SR): Information used for requesting a UL UL-SCH resource.

HARQ-ACK: A Response to PDCCH (indicating DL SPS release) and/or a response to DL transport block (TB) on PDSCH. HARQ-ACK indicates whether information successfully transmitted on the PDCCH or PDSCH is received. The HARQ-ACK response includes positive ACK (simply ACK), negative ACK (hereinafter NACK), Discontinuous Transmission (DTX), or NACK/DTX. Here, the term HARQ-ACK is used mixed with HARQ-ACK/NACK and ACK/NACK. In general, ACK may be represented by bit value 1 and NACK may be represented by bit value 0.

Channel State Information (CSI): Feedback information on the DL channel. The UE generates it based on the CSI-Reference Signal (RS) transmitted by the base station. Multiple Input Multiple Output (MIMO)-related feedback information includes a Rank Indicator (RI) and a Precoding Matrix Indicator (PMI). CSI can be divided into CSI part 1 and CSI part 2 according to the information indicated by CSI.

In the 3GPP NR system, five PUCCH formats may be used to support various service scenarios, various channel environments, and frame structures.

PUCCH format 0 is a format capable of delivering 1-bit or 2-bit HARQ-ACK information or SR. PUCCH format 0 can be transmitted through one or two OFDM symbols on the time axis and one PRB on the frequency axis. When PUCCH format 0 is transmitted in two OFDM symbols, the same sequence on the two symbols may be transmitted through different RBs. In this case, the sequence may be a sequence cyclic shifted (CS) from a base sequence used in PUCCH format 0. Through this, the UE may obtain a frequency diversity gain. In more detail, the UE may determine a cyclic shift (CS) value $m_{cs}$ according to $M_{bit}$ bit UCI ($M_{bit}$=1 or 2). In addition, the base sequence having the length of 12 may be transmitted by mapping a cyclic shifted sequence based on a predetermined CS value $m_{cs}$ to one OFDM symbol and 12 REs of one RB. When the number of cyclic shifts available to the UE is 12 and $M_{bit}$=1, 1 bit UCI 0 and 1 may be mapped to two cyclic shifted sequences having a difference of 6 in the cyclic shift value, respectively. In addition, when $M_{bit}$=2, 2 bit UCI 00, 01, 11, and 10 may be mapped to four cyclic shifted sequences having a difference of 3 in cyclic shift values, respectively.

PUCCH format 1 may deliver 1-bit or 2-bit HARQ-ACK information or SR. PUCCH format 1 may be transmitted through consecutive OFDM symbols on the time axis and one PRB on the frequency axis. Here, the number of OFDM symbols occupied by PUCCH format 1 may be one of 4 to 14. More specifically, UCI, which is $M_{bit}$=1, may be BPSK-modulated. The UE may modulate UCI, which is $M_{bit}$=2, with quadrature phase shift keying (QPSK). A signal is obtained by multiplying a modulated complex valued symbol d(0) by a sequence of length 12. In this case, the sequence may be a base sequence used for PUCCH format 0. The UE spreads the even-numbered OFDM symbols to which PUCCH format 1 is allocated through the time axis orthogonal cover code (OCC) to transmit the obtained signal. PUCCH format 1 determines the maximum number of different UEs multiplexed in the one RB according to the length of the OCC to be used. A demodulation reference signal (DMRS) may be spread with OCC and mapped to the odd-numbered OFDM symbols of PUCCH format 1.

PUCCH format 2 may deliver UCI exceeding 2 bits. PUCCH format 2 may be transmitted through one or two OFDM symbols on the time axis and one or a plurality of RBs on the frequency axis. When PUCCH format 2 is transmitted in two 0 OFDM symbols, the sequences which are transmitted in different RBs through the two OFDM symbols may be same each other. Here, the sequence may be a plurality of modulated complex valued symbols d(0), . . . , d($M_{symbol}$−1). Here, $M_{symbol}$ may be $M_{bit}$/2. Through this, the UE may obtain a frequency diversity gain. More specifically, $M_{bit}$ bit UCI ($M_{bit}$>2) is bit-level scrambled, QPSK modulated, and mapped to RB(s) of one or two OFDM symbol(s). Here, the number of RBs may be one of 1 to 16.

PUCCH format 3 or PUCCH format 4 may deliver UCI exceeding 2 bits. PUCCH format 3 or PUCCH format 4 may be transmitted through consecutive OFDM symbols on the time axis and one PRB on the frequency axis. The number of OFDM symbols occupied by PUCCH format 3 or PUCCH format 4 may be one of 4 to 14. Specifically, the UE modulates $M_{bit}$ bits UCI (Mbit>2) with π/2-Binary Phase Shift Keying (BPSK) or QPSK to generate a complex valued symbol d(0) to d($M_{symb}$−1). Here, when using π/2-BPSK, $M_{symb}$=$M_{bit}$, and when using QPSK, $M_{symb}$=$M_{bit}$/2. The UE may not apply block-unit spreading to the PUCCH format 3. However, the UE may apply block-unit spreading to one RB (i.e., 12 subcarriers) using PreDFT-OCC of a length of 12 such that PUCCH format 4 may have two or four multiplexing capacities. The UE performs transmit precoding (or DFT-precoding) on the spread signal and maps it to each RE to transmit the spread signal.

In this case, the number of RBs occupied by PUCCH format 2, PUCCH format 3, or PUCCH format 4 may be determined according to the length and maximum code rate of the UCI transmitted by the UE. When the UE uses PUCCH format 2, the UE may transmit HARQ-ACK information and CSI information together through the PUCCH. When the number of RBs that the UE may transmit is greater than the maximum number of RBs that PUCCH format 2, or PUCCH format 3, or PUCCH format 4 may use, the UE may transmit only the remaining UCI information without transmitting some UCI information according to the priority of the UCI information.

PUCCH format 1, PUCCH format 3, or PUCCH format 4 may be configured through the RRC signal to indicate frequency hopping in a slot. When frequency hopping is configured, the index of the RB to be frequency hopped may be configured with an RRC signal. When PUCCH format 1, PUCCH format 3, or PUCCH format 4 is transmitted through N OFDM symbols on the time axis, the first hop may have floor (N/2) OFDM symbols and the second hop may have ceiling(N/2) OFDM symbols.

PUCCH format 1, PUCCH format 3, or PUCCH format 4 may be configured to be repeatedly transmitted in a plurality of slots. In this case, the number K of slots in which the PUCCH is repeatedly transmitted may be configured by the RRC signal. The repeatedly transmitted PUCCHs must start at an OFDM symbol of the constant position in each slot, and have the constant length. When one OFDM symbol among OFDM symbols of a slot in which a UE should transmit a PUCCH is indicated as a DL symbol by an RRC signal, the UE may not transmit the PUCCH in a corresponding slot and delay the transmission of the PUCCH to the next slot to transmit the PUCCH.

Meanwhile, in the 3GPP NR system, a UE may perform transmission/reception using a bandwidth equal to or less than the bandwidth of a carrier (or cell). For this, the UE may receive the Bandwidth part (BWP) configured with a continuous bandwidth of some of the carrier's bandwidth. A UE operating according to TDD or operating in an unpaired spectrum can receive up to four DL/UL BWP pairs in one carrier (or cell). In addition, the UE may activate one DL/UL BWP pair. A UE operating according to FDD or operating in paired spectrum can receive up to four DL BWPs on a DL carrier (or cell) and up to four UL BWPs on a UL carrier (or cell). The UE may activate one DL BWP and one UL BWP for each carrier (or cell). The UE may not perform reception or transmission in a time-frequency resource other than the activated BWP. The activated BWP may be referred to as an active BWP.

The base station may indicate the activated BWP among the BWPs configured by the UE through downlink control information (DCI). The BWP indicated through the DCI is activated and the other configured BWP(s) are deactivated. In a carrier (or cell) operating in TDD, the base station may include, in the DCI for scheduling PDSCH or PUSCH, a bandwidth part indicator (BPI) indicating the BWP to be activated to change the DL/UL BWP pair of the UE. The UE may receive the DCI for scheduling the PDSCH or PUSCH and may identify the DL/UL BWP pair activated based on the BPI. For a DL carrier (or cell) operating in an FDD, the base station may include a BPI indicating the BWP to be activated in the DCI for scheduling PDSCH so as to change the DL BWP of the UE. For a UL carrier (or cell) operating in an FDD, the base station may include a BPI indicating the BWP to be activated in the DCI for scheduling PUSCH so as to change the UL BWP of the UE.

Figure 8:
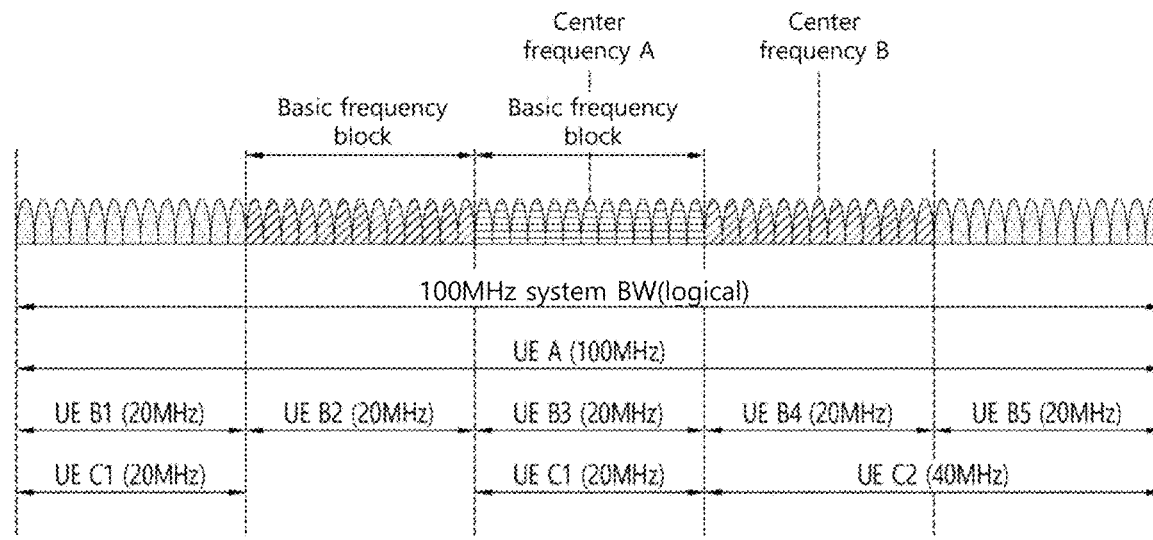
FIG. 8 is a conceptual diagram illustrating carrier aggregation.

FIG. 8 is a conceptual diagram illustrating carrier aggregation.

The carrier aggregation is a method in which the UE uses a plurality of frequency blocks or cells (in the logical sense) configured with UL resources (or component carriers) and/or DL resources (or component carriers) as one large logical frequency band in order for a wireless communication system to use a wider frequency band. One component carrier may also be referred to as a term called a Primary cell (PCell) or a Secondary cell (SCell), or a Primary SCell (PScell). However, hereinafter, for convenience of description, the term "component carrier" is used.

Referring to FIG. 8, as an example of a 3GPP NR system, the entire system band may include up to 16 component carriers, and each component carrier may have a bandwidth of up to 400 MHz. The component carrier may include one or more physically consecutive subcarriers. Although it is shown in FIG. 8 that each of the component carriers has the same bandwidth, this is merely an example, and each component carrier may have a different bandwidth. Also, although each component carrier is shown as being adjacent to each other in the frequency axis, the drawings are shown in a logical concept, and each component carrier may be physically adjacent to one another, or may be spaced apart.

Different center frequencies may be used for each component carrier. Also, one common center frequency may be used in physically adjacent component carriers. Assuming that all the component carriers are physically adjacent in the embodiment of FIG. 8, center frequency A may be used in all the component carriers. Further, assuming that the respective component carriers are not physically adjacent to each other, center frequency A and the center frequency B can be used in each of the component carriers.

When the total system band is extended by carrier aggregation, the frequency band used for communication with each UE can be defined in units of a component carrier. UE A may use 100 MHz, which is the total system band, and performs communication using all five component carriers. UEs $B_1$~$B_5$ can use only a 20 MHz bandwidth and perform communication using one component carrier. UEs $C_1$ and $C_2$ may use a 40 MHz bandwidth and perform communication using two component carriers, respectively. The two component carriers may be logically/physically adjacent or non-adjacent. UE $C_1$ represents the case of using two non-adjacent component carriers, and UE $C_2$ represents the case of using two adjacent component carriers.

Figure 9:
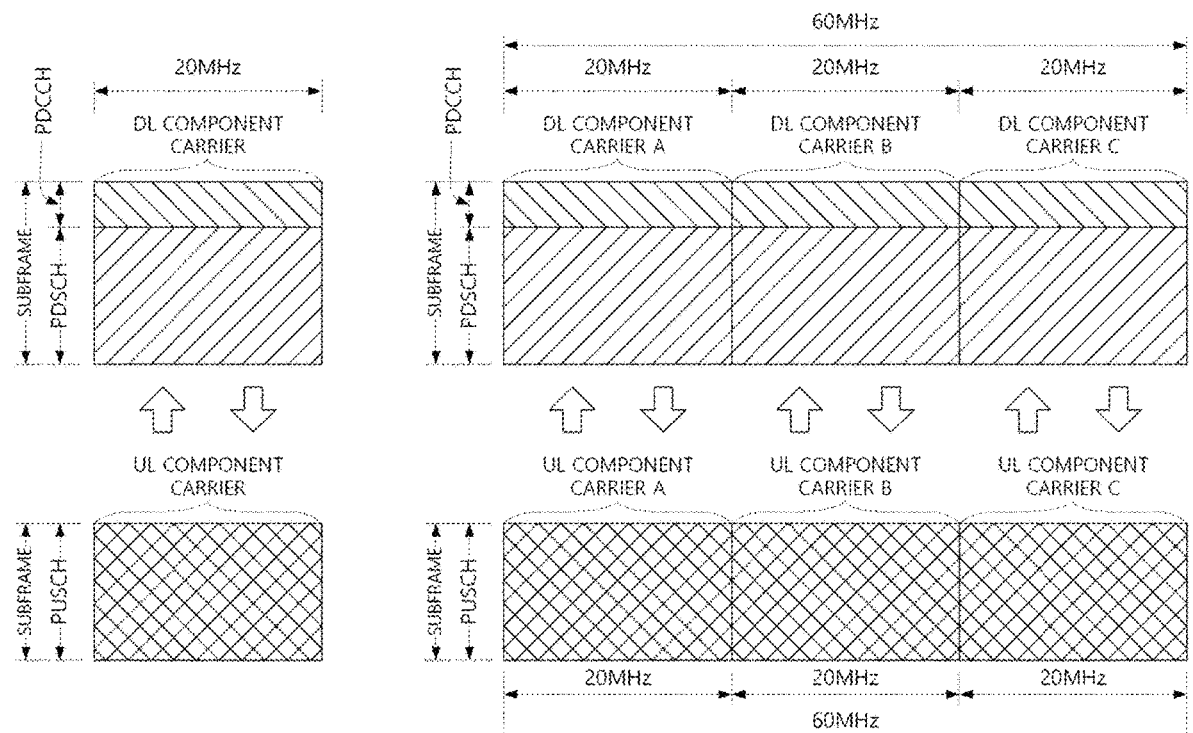
FIG. 9 is a diagram for explaining signal carrier communication and multiple carrier communication.

FIG. 9 is a drawing for explaining signal carrier communication and multiple carrier communication. Particularly, FIG. 9(a) shows a single carrier subframe structure and FIG. 9(b) shows a multi-carrier subframe structure.

Referring to FIG. 9(a), in an FDD mode, a general wireless communication system may perform data transmission or reception through one DL band and one UL band corresponding thereto. In another specific embodiment, in a TDD mode, the wireless communication system may divide a radio frame into a UL time unit and a DL time unit in a time domain, and perform data transmission or reception through a UL/DL time unit. Referring to FIG. 9(b), three 20 MHz component carriers (CCs) can be aggregated into each of UL and DL, so that a bandwidth of 60 MHz can be supported. Each CC may be adjacent or non-adjacent to one another in the frequency domain. FIG. 9(b) shows a case where the bandwidth of the UL CC and the bandwidth of the DL CC are the same and symmetric, but the bandwidth of each CC can be determined independently. In addition, asymmetric carrier aggregation with different number of UL CCs and DL CCs is possible. A DL/UL CC allocated/configured to a specific UE through RRC may be called as a serving DL/UL CC of the specific UE.

The base station may perform communication with the UE by activating some or all of the serving CCs of the UE or deactivating some CCs. The base station can change the CC to be activated/deactivated, and change the number of CCs to be activated/deactivated. If the base station allocates a CC available for the UE as to be cell-specific or UE-specific, at least one of the allocated CCs can be deactivated, unless the CC allocation for the UE is completely reconfigured or the UE is handed over. One CC that is not deactivated by the UE is called as a Primary CC (PCC) or a primary cell (PCell), and a CC that the base station can freely activate/deactivate is called as a Secondary CC (SCC) or a secondary cell (SCell).

Meanwhile, 3GPP NR uses the concept of a cell to manage radio resources. A cell is defined as a combination of DL resources and UL resources, that is, a combination of DL CC and UL CC. A cell may be configured with DL resources alone, or a combination of DL resources and UL resources. When the carrier aggregation is supported, the linkage between the carrier frequency of the DL resource (or DL CC) and the carrier frequency of the UL resource (or UL CC) may be indicated by system information. The carrier frequency refers to the center frequency of each cell or CC. A cell corresponding to the PCC is referred to as a PCell, and a cell corresponding to the SCC is referred to as an SCell. The carrier corresponding to the PCell in the DL is the DL PCC, and the carrier corresponding to the PCell in the UL is the UL PCC. Similarly, the carrier corresponding to the SCell in the DL is the DL SCC and the carrier corresponding to the SCell in the UL is the UL SCC. According to UE capability, the serving cell(s) may be configured with one PCell and zero or more SCells. In the case of UEs that are in the RRC_CONNECTED state but not configured for carrier aggregation or that do not support carrier aggregation, there is only one serving cell configured only with PCell.

As mentioned above, the term "cell" used in carrier aggregation is distinguished from the term "cell" which refers to a certain geographical area in which a communication service is provided by one base station or one antenna group. That is, one component carrier may also be referred to as a scheduling cell, a scheduled cell, a primary cell (PCell), a secondary cell (SCell), or a primary SCell (PS-cell). However, in order to distinguish between a cell referring to a certain geographical area and a cell of carrier aggregation, in the present disclosure, a cell of a carrier aggregation is referred to as a CC, and a cell of a geographical area is referred to as a cell.

Figure 10:
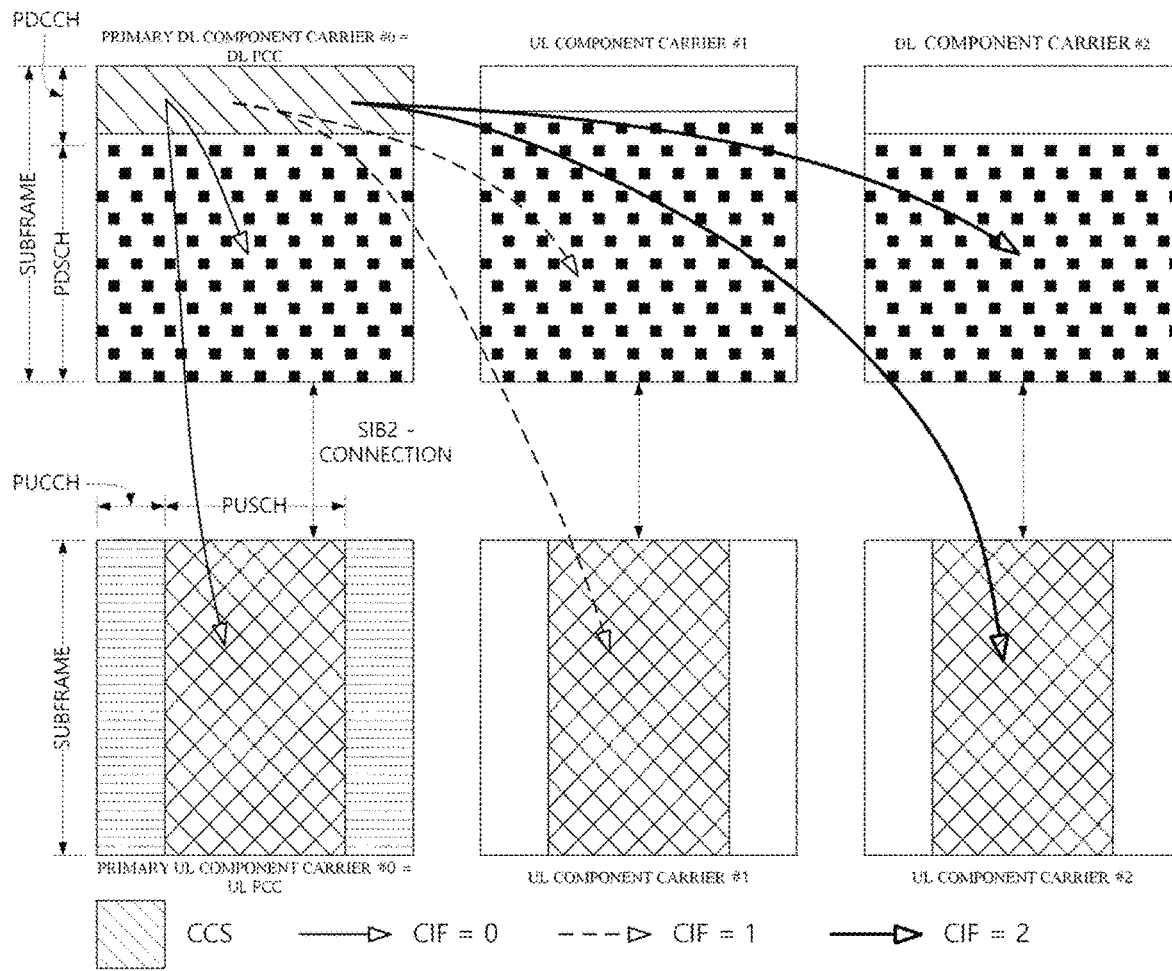
FIG. 10 is a diagram showing an example in which a cross carrier scheduling technique is applied.

FIG. 10 is a diagram showing an example in which a cross carrier scheduling technique is applied. When cross carrier scheduling is set, the control channel transmitted through the first CC may schedule a data channel transmitted through the first CC or the second CC using a carrier indicator field (CIF). The CIF is included in the DCI. In other words, a scheduling cell is set, and the DL grant/UL grant transmitted in the PDCCH area of the scheduling cell schedules the PDSCH/PUSCH of the scheduled cell. That is, a search area for the plurality of component carriers exists in the PDCCH area of the scheduling cell. A PCell may be basically a scheduling cell, and a specific SCell may be designated as a scheduling cell by an upper layer.

In the embodiment of FIG. 10, it is assumed that three DL CCs are merged. Here, it is assumed that DL component carrier #0 is DL PCC (or PCell), and DL component carrier #1 and DL component carrier #2 are DL SCCs (or SCell). In addition, it is assumed that the DL PCC is set to the PDCCH monitoring CC. When cross-carrier scheduling is not configured by UE-specific (or UE-group-specific or cell-specific) higher layer signaling, a CIF is disabled, and each DL CC can transmit only a PDCCH for scheduling its PDSCH without the CIF according to an NR PDCCH rule (non-cross-carrier scheduling, self-carrier scheduling). Meanwhile, if cross-carrier scheduling is configured by UE-specific (or UE-group-specific or cell-specific) higher layer signaling, a CIF is enabled, and a specific CC (e.g., DL PCC) may transmit not only the PDCCH for scheduling the PDSCH of the DL CC A using the CIF but also the PDCCH for scheduling the PDSCH of another CC (cross-carrier scheduling). On the other hand, a PDCCH is not transmitted in another DL CC. Accordingly, the UE monitors the PDCCH not including the CIF to receive a self-carrier scheduled PDSCH depending on whether the cross-carrier scheduling is configured for the UE, or monitors the PDCCH including the CIF to receive the cross-carrier scheduled PDSCH.

On the other hand, FIGS. 9 and 10 illustrate the subframe structure of the 3GPP LTE-A system, and the same or similar configuration may be applied to the 3GPP NR system. However, in the 3GPP NR system, the subframes of FIGS. 9 and 10 may be replaced with slots.

In addition, an NR system employs code block group (CBG)-based transmission unlike 3GPP LTE(-A). The following description is related thereto.

In 3GPP LTE(-A), a TB-cyclic redundancy code (TB-CRC) for detecting error of a transport block (TB), which is a unit of data transmitted in a PDSCH, is attached to a TB, and the TB is divided into several code blocks (CBs) for the efficiency of channel encoding. A CB-cyclic redundancy code (CB-CRC) for detecting error of a CB is attached to each of the CBs. In a case where a PDSCH is received, a terminal transmits an ACK if an error is not detected in a TB-CRC, and transmits an NACK if an error is detected in a TB-CRC. That is, one HARQ-ACK per TB is transmitted. When an NACK is received, a base station determines that an error has occurred in the prior TB, and performs HARQ retransmission of all the CBs in the TB. Therefore, in an LTE system, if only one CB is wrongly received, all the CBs included in a TB are retransmitted. Therefore, there is a high possibility that inefficient retransmission may occur. In order to solve the problem, an NR system employs a scheme of: binding CBs configuring a TB, to form code block groups (CBGs) so as to allow HARQ-ACK transmission to be possible in units of CBGs; in a case of downlink transmission, notifying a base station of whether each of the CBGs is successfully received, as a CBG level HARQ-ACK feedback; and performing, by the base station, HARQ retransmission of only CBGs that failed to be received. Also in case of uplink transmission, the NR system may configure a scheme of: in addition to configuring HARQ-ACK transmission in units of TBs for the uplink transmission, binding CBs configuring a TB for uplink transmission, to form code block groups (CBGs) so as to allow HARQ-ACK transmission to be possible in units of CBGs; notifying a terminal of whether each of the CBGs is successfully received, as a CBG level HARQ-ACK feedback; and performing, by the terminal, HARQ retransmission of only CBGs that failed to be received.

Figure 11:
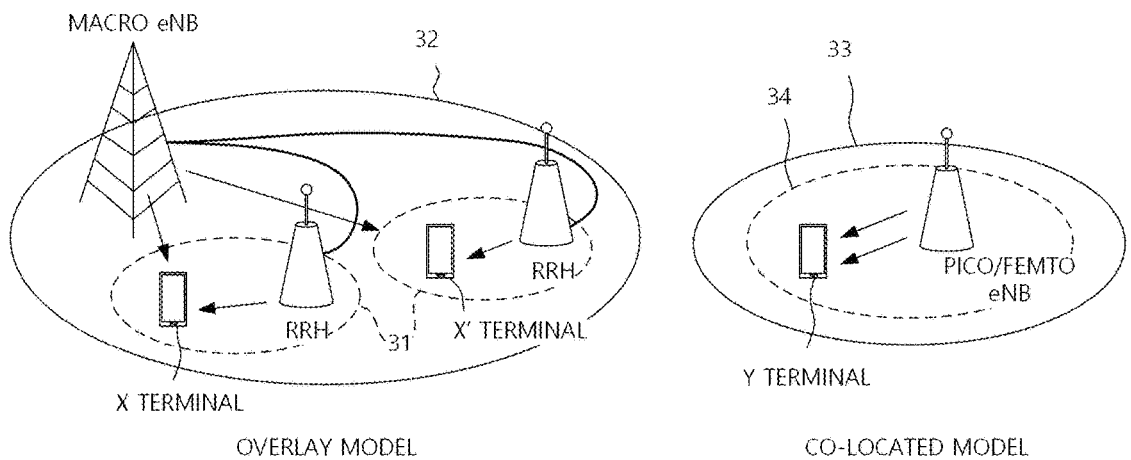
FIG. 11 illustrates an example of a scenario of placing a terminal and a base station in an LAA service environment.

FIG. 11 illustrates an example of a scenario of placing a terminal and a base station in an LAA service environment. A frequency band targeted by a license-assisted access (LAA) service environment does not have a long wireless communication arrival distance due to the high-frequency characteristics. Considering this, the placement scenario for a terminal and a base station in an environment in which a conventional LTE-L service and an LAA service coexist may be an overlay model or a co-located model.

In the overlay model, a macro base station may perform wireless communication with terminal X and terminal X' in a macro region 32 by using a licensed band carrier, and may be connected to multiple ratio remote heads (RRHs) through an X2 interface. Each of the RRHs may perform wireless communication with terminal X or terminal X' in a predetermined region 31 by using an unlicensed band carrier. The macro base station and the RRHs have different frequency bands, and thus there is no interference therebetween, however, the macro base station and the RRHs are required to perform fast data exchange therebetween through the X2 interface so as to use an LAA service through carrier aggregation as an auxiliary downlink channel of an LTE-L service.

In the co-located model, a pico/femto base station may perform wireless communication with terminal Y by simultaneously using a licensed band carrier and an unlicensed band carrier. However, the pico/femto base station may use an LTE-L service and an LAA service together only when downlink transmission is performed. The coverage 33 of the LTE-L service and the coverage 34 of the LAA service may be different according to a frequency band, transmission power, and the like.

When LTE communication is performed in an unlicensed band, existing apparatuses (e.g. wireless LAN (Wi-Fi) apparatus) that communicate in the unlicensed band are unable to demodulate an LAA message or data. Therefore, the existing apparatuses may determine an LAA message or data to be a kind of energy, and then perform an interference avoidance operation by an energy detection technique. That is, if an energy corresponding to an LAA message or data is smaller than −62 dBm or a particular energy detection (ED) threshold, wireless LAN apparatuses may communicate while neglecting the message or data. Accordingly, a terminal that performs LTE communication in an unlicensed band may be frequently disturbed by the wireless LAN apparatuses.

Therefore, in order to effectively implement an LAA technology/service, it is required to allocate or reserve a particular frequency band during a particular time interval. However, peripheral apparatuses that communicate through an unlicensed band make an attempt to access on the basis of an energy detection technique, and thus it is difficult to efficiently provide an LAA service. Therefore, in order to install an LAA technology, a study on a method for coexisting with an existing unlicensed band apparatus, and a method for efficiently sharing a wireless channel is required to precede. That is, a strong coexistence mechanism by which an LAA apparatus does not affect an existing unlicensed band apparatus is required to be developed.

Figure 12:
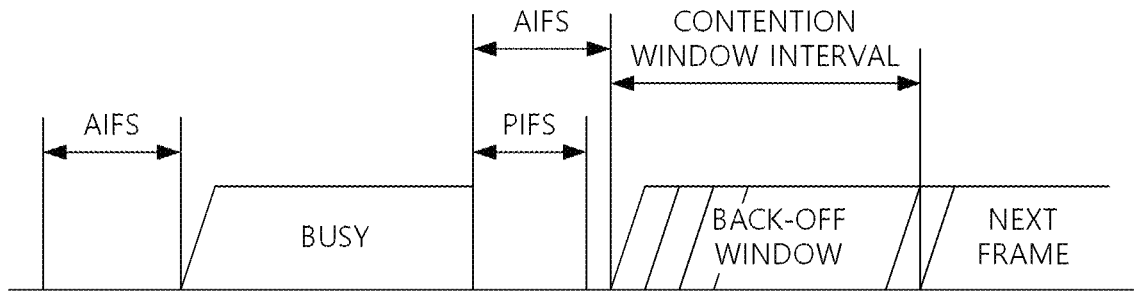
FIG. 12 illustrates an example of a conventional communication scheme operated in an unlicensed band.

FIG. 12 illustrates an example of a conventional communication scheme (e.g. wireless LAN) operated in an unlicensed band. An apparatus that operates in an unlicensed band is operated on the basis of listen-before talk (LBT) most of the time, and thus performs a clear channel assessment (CCA) of sensing a channel before transmitting data.

Referring to FIG. 12, before transmitting data, a wireless LAN apparatus (e.g. an AP or an STA) performs carrier sensing to check whether a channel is being used (is busy). When a wireless signal having a predetermined strength or higher is sensed in a channel in which the data is to be transmitted, the wireless LAN apparatus determines that the channel is busy, and delays an access to the channel. This process is called a clear channel assessment, and a signal level for determining whether a signal is sensed is called a CCA threshold. Meanwhile, when a wireless signal is not sensed in the channel, or a wireless signal having a strength smaller than the CCA threshold is sensed, the apparatus determines that the channel is in an idle state.

When the channel is determined to be in an idle state, a terminal having data to transmit performs a backoff procedure after a defer period (e.g. an arbitration interframe space (AIFS), a PCF IFS (PCIFS), etc.). The defer period implies a minimum time interval during which a terminal is required to wait after the channel has entered the idle state. The backoff procedure allows the terminal to wait more during a predetermined time interval after the defer period. For example, while the channel is in the idle state, the terminal may wait while reducing a slot time interval by a random number assigned to the terminal in a contention window (CW), and after all the slot time is exhausted, the terminal may attempt to access the channel.

When the channel is successfully accessed, the terminal may transmit data through the channel. When data transmission is successful, the CW size (CWS) is reset to an initial value (CWmin). Meanwhile, when data transmission fails, the CWS is doubled. Accordingly, the terminal receives a new random number assigned within the range of two times of the previous random number range, and then performs a backoff procedure in the next CW. In a wireless LAN, only an ACK is defined as reception response information for data transmission. Therefore, when an ACK is received for data transmission, the CWS is reset to the initial value, and when feedback information for data transmission is not received, the CWS is doubled.

As described above, conventional communication in an unlicensed band is operated on the basis of LBT most of the time, and thus LTE also considers LBT in LAA for coexistence with an existing apparatus. Specifically, a method for access to a channel in an unlicensed band in LTE may be divided into the following four categories according to the presence or absence of LBT, or LBT application scheme.

Category 1: no LBT
  a Tx entity does not perform an LBT procedure for transmission.

Category 2: LBT lacking random backoff
  a TX entity senses whether the channel is in an idle state during a first interval, without random backoff, to perform transmission. That is, the Tx entity may perform transmission through a channel immediately after the channel is sensed to be in an idle state during the first interval. The first interval is an interval having a pre-configured length immediately before the Tx entity performs transmission. According to an embodiment, the first interval may have a 25 μs length, but the present disclosure is not limited thereto.

Category 3: LBT performing random backoff by using fixed size of CW
  a Tx entity obtains a random number of N in a CW having a fixed size and configures N as a backoff counter (or a backoff timer), and performs backoff by using a configured backoff counter of N. That is, in a backoff procedure, the Tx entity reduces the backoff counter by one every time a channel is sensed to be in an idle state during a pre-configured slot interval. The pre-configured slot interval may be 9 μs, but the present disclosure is not limited thereto. The backoff counter is reduced from the initial value of N, and the value of the backoff counter reaches 0, the Tx entity may perform transmission. Meanwhile, in order to perform backoff, the Tx entity senses whether the channel is in an idle state during a second interval, first. The second interval may be configured on the basis of a channel access priority class of the Tx entity, and includes a 16 μs time interval and m number of consecutive slot intervals. m is a value configured according to the channel access priority class. When the channel is determined to be in an idle state during the second interval, the Tx entity performs channel sensing to reduce the backoff counter. Meanwhile, when the channel is sensed to be in an occupied state in the backoff procedure, the backoff procedure is stopped. After the backoff procedure is stopped, when the channel is sensed to be in an idle state during the second interval, the Tx entity may restart backoff. As described above, if the channel is idle during the slot interval of the backoff counter of N in addition to the second interval, the Tx entity may perform transmission. The backoff counter of N is obtained in the fixed size of CW.

Category 4: LBT performing random backoff by using changeable size of CW a Tx entity obtains a random number of N in a CW having a changeable size and configures N as a backoff counter (or a backoff timer), and performs backoff by using a configured backoff counter of N. More specifically, the Tx entity may adjust the size of a CW on the basis of HARQ-ACK information for previous transmission, and obtains the backoff counter of N in the CW having the adjusted size. A detailed process for performing backoff by the Tx entity is the same as that described in category 3. When a channel is idle during the slot interval of the backoff counter N in addition to the second interval, the Tx entity may perform transmission. The backoff counter of N is obtained in the changeable size of CW.

The Tx entity described in categories 1 to 4 may be a base station or a terminal. According to an embodiment of the present disclosure, a first type of channel access may indicate a channel access of category 4, and a second type of channel access may indicate a channel access of category 2.

Figure 13:
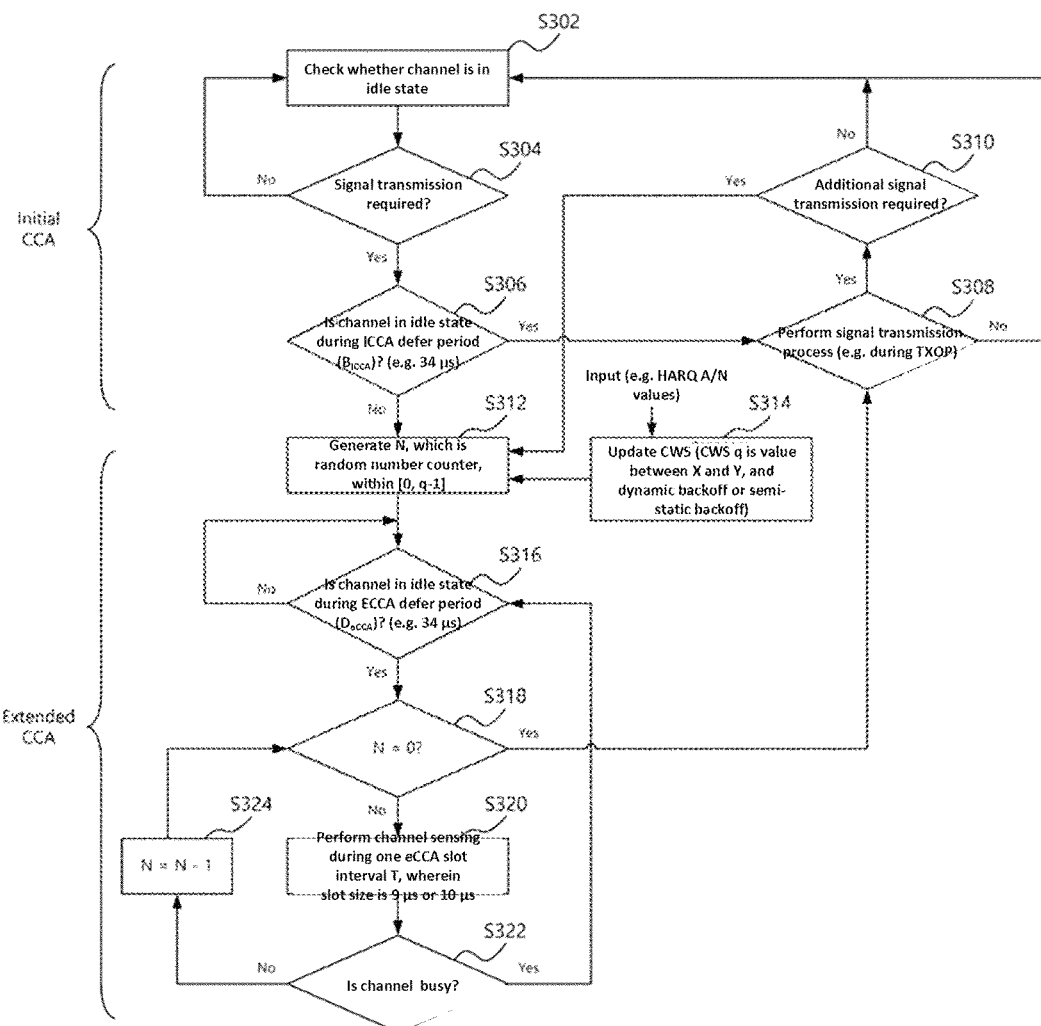
FIGS. 13 and 14 illustrate an example of a listen-before-talk (LBT) process for DL transmission.
Figure 14:
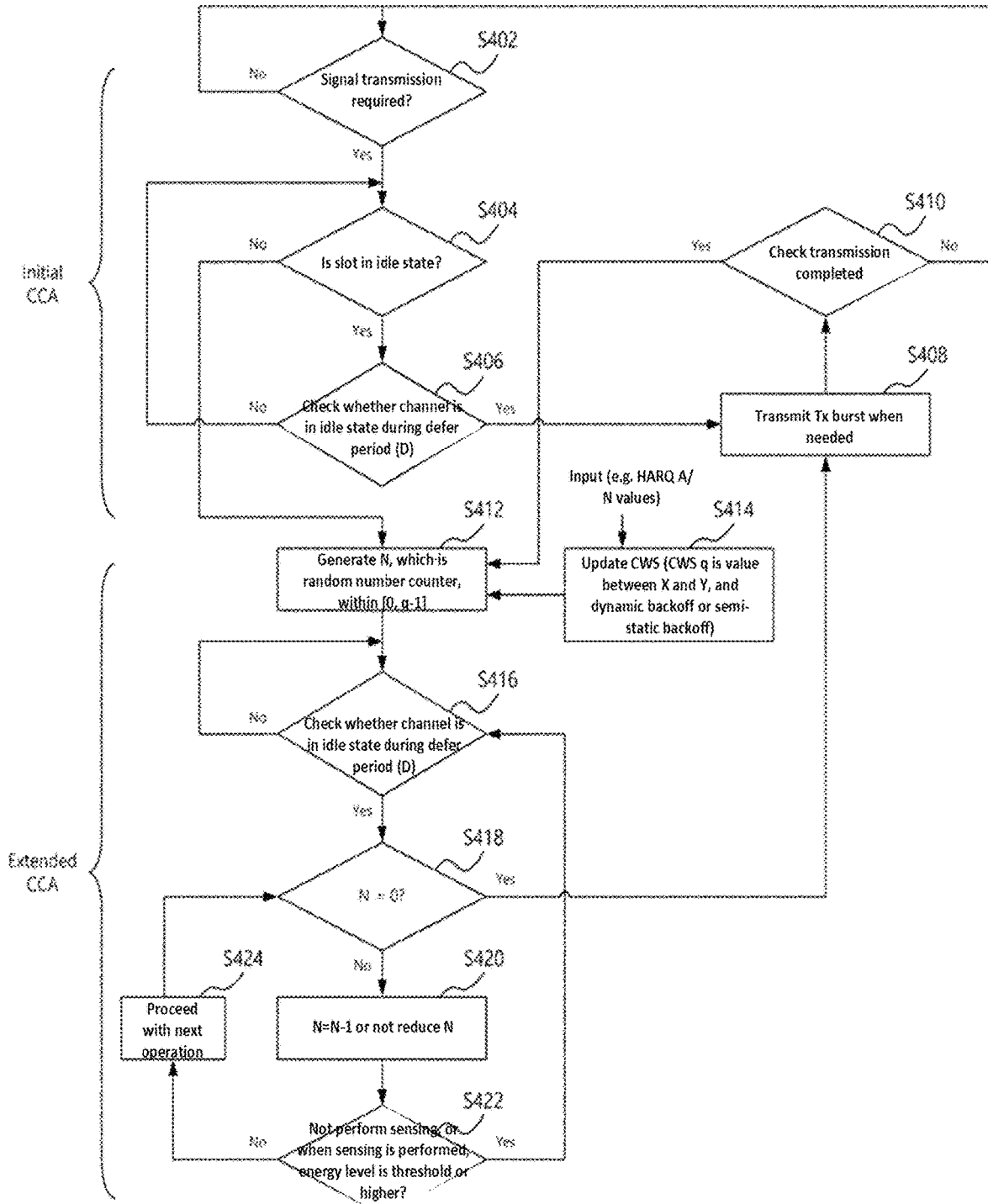

FIGS. 13 and 14 illustrate an example of a DL transmission process based on category 4 LBT. Category 4 LBT may be used to ensure a fair channel access in comparison with Wi-Fi. Referring to FIGS. 13 and 14, an LBT process includes an initial CCA (ICCA) and an extended CCA (ECCA). In the ICCA, a random backoff is not performed, and in the ECCA, a random backoff is performed using a CW having a changeable size. The ICCA is applied to a case where a channel is in an idle state at a time point at which signal transmission is required, and the ECCA is applied to a case where a channel is busy at a time point when signal transmission is required, or there is a DL transmission immediately before the time point. That is, whether a channel is in an idle state is determined through the ICCA, and data transmission is performed after an ICCA period. If an interference signal is recognized, and thus it is impossible to perform data transmission, a random backoff counter may be configured and then a data transmission time point may be obtained through a defer period and the backoff counter.

Referring to FIG. 13, a signal transmission process may be performed as follows.

Initial CCA

S302: a base station identifies that a channel is in an idle state.

S304: the base station checks whether signal transmission is required. When signal transmission is not required, the base station returns to operation S302, and when signal transmission is required, operation S306 is proceeded.

S306: the base station checks whether the channel is in an idle state during an ICCA defer period (BCCA). The ICCA defer period is configurable. In an embodiment, the ICCA defer period may be configured by a 16 µs interval and n number of consecutive CCA slots. Here, n may be a positive integer, and one CCA slot interval may be 9 µs. The number of CCA slots may be differently configured according to a QoS class. The ICCA defer period may be configured to be a proper value by considering a defer period (e.g. DIFS or AIFS) of Wi-Fi. For example, the ICCA defer period may be 34 µs. If the channel is in an idle state during the ICCA defer period, the base station may perform a signal transmission process (S308). If it is determined that the channel is busy in the ICCA defer period, operation S312 is proceeded (ECCA).

S308: the base station may perform a signal transmission process. If there is no signal transmission, operation S302 is proceeded (ICCA), and if there is a signal transmission, operation S310 is proceeded. Even in a case where a backoff counter of N reaches 0 in operation S318, and thus operation S308 is performed, if there is no signal transmission, operation S302 is proceeded (ICCA), and if there is a signal transmission, operation S310 is proceeded.

S310: when there is no required additional signal transmission, operation S302 is proceeded (ICCA), and when an additional signal transmission is required, operation S312 is proceeded (ECCA).

Extended CCA

S312: the base station generates a random number N in a CW. N is used as a counter in a backoff process, and is generated from [0, q−1]. The CW is configured by q number of ECCA slots, and the size of each of the ECCA slots may be 9 µs or 10 µs. The CW size (CWS) is defined as q, and may be changeable in operation S314. Thereafter, the base station proceeds with operation S316.

S314: the base station may update the CWS. The CWS q may be updated to a value between X and Y. The X and Y values are configurable parameters. The CWS update or adjustment may be performed every time when N is generated (dynamic backoff), or may be semi-statically performed at predetermined time intervals (semi-static backoff). The CWS may be updated or adjusted on the basis of exponential backoff or binary backoff. That is, the CWS may be updated or adjusted to be a square of 2 or a multiple of 2. In relation to PDSCH transmission, the CWS may be updated or adjusted on the basis of a feedback/report (e.g. an HARQ-ACK/NACK) of a terminal, or may be updated or adjusted on the basis of sensing by the base station.

S316: the base station checks whether the channel is in an idle state during an ECCA defer period (DeCCA). The ECCA defer period is configurable. In an embodiment, the ECCA defer period may be configured by a 16 µs interval and n number of consecutive CCA slots. n may be a positive integer, and one CCA slot interval may be 9 µs. The number of CCA slots may be differently configured according to a QoS class. The ECCA defer period may be configured to be a proper value by considering a defer period (e.g. DIFS or AIFS) of Wi-Fi. For example, the ECCA defer period may be 34 µs. If the channel is in an idle state during the ECCA defer period, the base station proceeds with operation S318. If it is determined that the channel is busy in the ECCA defer period, the base station repeats operation S316.

S318: the base station checks whether N is 0. When N is 0, the base station may perform a signal transmission process (S308). In this case (i.e. N=0), the base station does not perform transmission immediately, and performs a CCA check during at least one slot to continue the ECCA process. When N is not equal to 0 (i.e. N=0), operation S320 is proceeded.

S320: the base station senses a channel during one ECCA slot interval (T). The ECCA slot size is 9 μs or 10 μs, and an actual sensing time interval may be at least 4 μs.

S322: when it is determined that the channel is in an idle state, operation S324 is proceeded. When it is determined that the channel is busy, the base station returns to operation S316. That is, one ECCA defer period is applied again after a channel is in an idle state, and during the ECCA defer period, N is not counted down.

S324: the base station reduces N by 1 (ECCA countdown).

The transmission process illustrated in FIG. 14 is substantially identical or similar to that of FIG. 13, and there is a difference therebetween according to an implementation type. Therefore, for details, the description given with reference to FIG. 13 may be referred to.

Initial CCA

S402: a base station checks whether signal transmission is required. When signal transmission is not required, operation S402 is repeated, and when signal transmission is required, operation S404 is proceeded.

S404: the base station identifies that a slot is in an idle state. When the slot is in an idle state, operation S406 is proceeded, and when the slot is busy, operation S412 is proceeded (ECCA). The slot may correspond to a CCA slot illustrated in FIG. 13.

S406: the base station checks whether a channel is in an idle state during a defer period (D). D may correspond to the ICCA defer period illustrated in FIG. 13. If the channel is in an idle state during the defer period, the base station may perform a signal transmission process (S408). If it is determined that the channel is busy in the defer period, operation S404 is proceeded.

S408: the base station may perform a signal transmission process if the process is required.

S410: If there is no signal transmission, operation S402 is proceeded (ICCA), and if there is a signal transmission, operation S412 is proceeded (ECCA). Even in a case where a backoff counter of N reaches 0 in operation S418, and thus operation S408 is performed, if there is no signal transmission, operation S402 is proceeded (ICCA), and if there is a signal transmission, operation S412 is proceeded (ECCA).

Extended CCA

S412: the base station generates a random number N in a CW. N is used as a counter in a backoff process, and is generated from [0, q−1]. The CW size (CWS) is defined as q, and may be changeable in operation S414. Thereafter, the base station proceeds with operation S416.

S414: the base station may update the CWS. The CWS q may be updated to a value between X and Y. The X and Y values are configurable parameters. The CWS update or adjustment may be performed every time when N is generated (dynamic backoff), or may be semi-statically performed at predetermined time intervals (semi-static backoff). The CWS may be updated or adjusted on the basis of exponential backoff or binary backoff. That is, the CWS may be updated or adjusted to be a square of 2 or a multiple of 2. In relation to PDSCH transmission, the CWS may be updated or adjusted on the basis of a feedback/report (e.g. an HARQ-ACK/NACK) of a terminal, or may be updated or adjusted on the basis of base station sensing.

S416: the base station checks whether the channel is in an idle state during the defer period (D). D may correspond to the ECCA defer period illustrated in FIG. 13. In operations S406 and S416, the values of D may be the same. If the channel is in an idle state during the defer period, the base station proceeds with operation S418. If it is determined that the channel is busy in the defer period, the base station repeats operation S416.

S418: the base station checks whether N is 0. when N is 0, the base station may perform a signal transmission process (S408). In this case (N=0), the base station does not perform transmission immediately, and performs a CCA check during at least one slot to continue the ECCA process. When N is not equal to 0 (i.e. N>0), operation S420 is proceeded.

S420: the base station may select one of an operation of reducing N by 1 (ECCA countdown) or an operation of not reducing N (self-deferral). A self-deferral operation may be performed according to an implementation or selection by the base station. At the time of a self-deferral, the base station performs neither sensing for energy detection nor ECCA countdown.

S422: the base station may select one of an operation of not performing sensing for energy detection or an energy detection operation. If the base station does not perform sensing for energy detection, operation S424 is proceeded. In a case where the energy detection operation is performed, when an energy level is equal to or lower than an energy detection threshold (i.e. idle), operation S424 is proceeded. When the energy level exceeds the energy detection threshold (i.e. busy), the base station returns to operation S416. That is, one defer period is applied again after a channel is in an idle state, and during the defer period, N is not counted down.

S424: operation S418 is proceeded.

Figure 15:
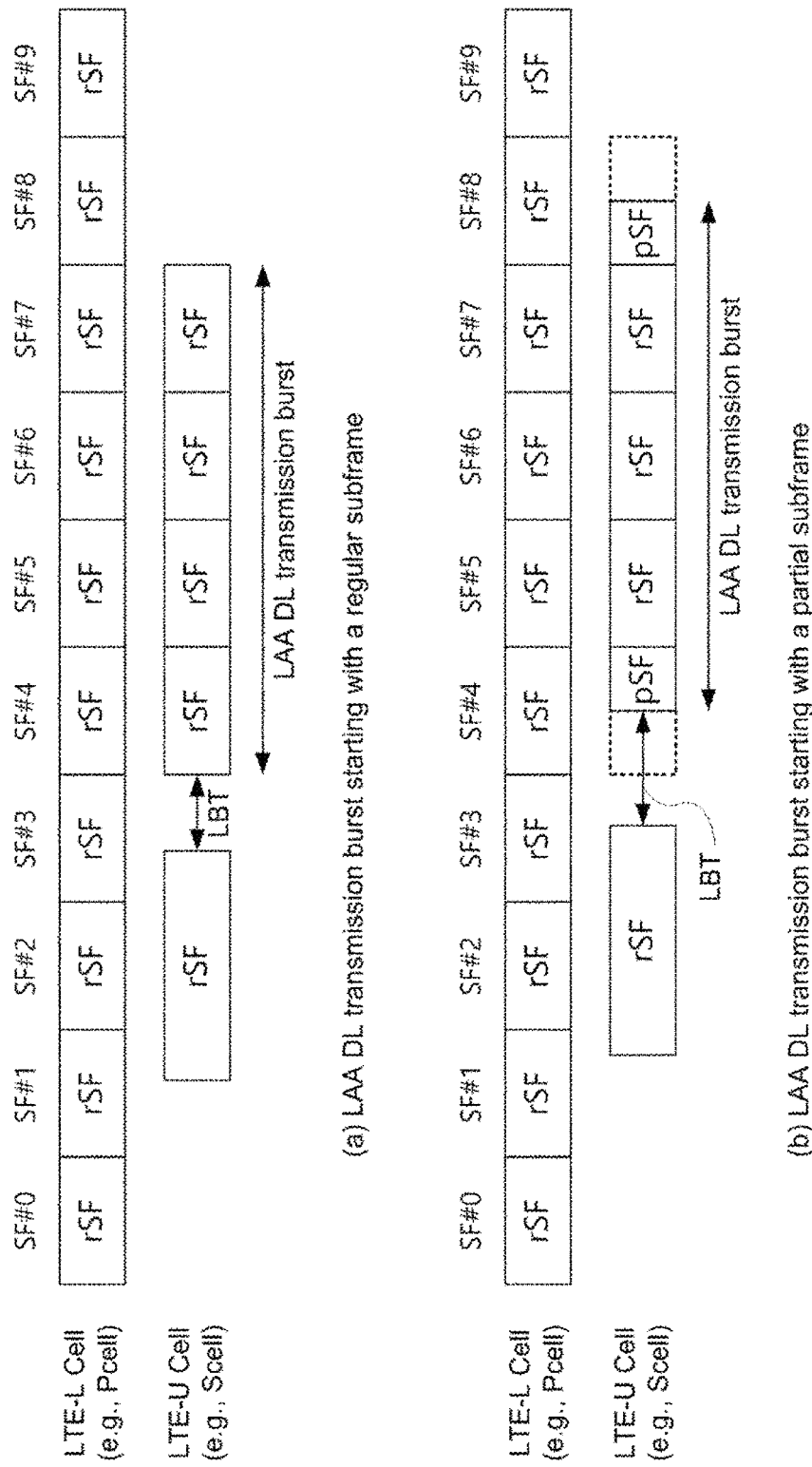
FIG. 15 illustrates an example of a DL transmission in an unlicensed band.

FIG. 15 illustrates an example in which a base station performs a DL transmission in an unlicensed band. A base station may aggregate one or more licensed band cells (for convenience, may be referred to as an LTE-L cell or an NR-licensed cell), and one or more unlicensed band cells (for convenience, an LTE-U cell, an NR-unlicensed cell, or an NR-U cell). In FIG. 15, it is assumed that one LTE-L cell and one LTE-U cell are aggregated for communication with a terminal. The LTE-L cell may be a PCell, and the LTE-U cell may be an SCell. In the LTE-L cell, the base station may exclusively use frequency resources, and perform a conventional operation according to LTE. Therefore, a radio frame may be configured by regular subframes (rSFs) each having a length of 1 ms (see FIG. 2), and a DL transmission (e.g. a PDCCH or a PDSCH) may be performed for each subframe (see FIG. 1). In the LTE-U cell, DL transmission is performed on the basis of LBT for the coexistence with an existing apparatus (e.g. a Wi-Fi apparatus). Moreover, in order to effectively implement an LTE-U technology/service, it is required to allocate or reserve a particular frequency band during a particular time interval. Therefore, in the LTE-U cell, DL transmission may be performed through a set of one or more consecutive subframes after LBT (DL transmission burst). A DL transmission burst may start with a regular subframe (rSF) as illustrated in FIG. 15(a), or may start with a partial subframe (pSF) as illustrated in FIG. 15(b) according to an LBT situation. A pSF is a part of a subframe, and may include the second slot of the subframe. In addition, the DL transmission burst may end with an rSF or a pSF.

Hereinafter, a method for adaptively adjusting a CWS in an unlicensed band at the time of a channel access is proposed. A CWS may be adjusted on the basis of a user equipment (UE) feedback, and a UE feedback used for CWS adjustment may include an HARQ-ACK response, and a CQI/PMI/RI. In the present disclosure, a method for adaptively adjusting a CWS on the basis of an HARQ-ACK response is proposed. An HARQ-ACK response includes an ACK, an NACK, and a DTX.

As illustrated with reference to FIG. 12, a CWS is adjusted on the basis of an ACK also in Wi-Fi. If an ACK feedback is received, a CWS is reset to a minimum value (CWmin), and if an ACK feedback is not received, the CWS is increased. However, in a cellular system (e.g. LTE), a CWS adjusting method considering multiple accesses is required.

First, terms are defined as follows for description of the present disclosure.

a set of HARQ-ACK feedback values (an HARQ-ACK feedback set): meaning an HARQ-ACK feedback value(s) used for CWS update/adjustment. The HARQ-ACK feedback set correspond to HARQ-ACK feedback values which have already been decoded and are available at a time point at which a CWS is determined. The HARQ-ACK feedback set includes an HARQ-ACK feedback value(s) for one or more DL (channel) transmissions (e.g. a PDSCH) on an unlicensed band (e.g. an LTE-U cell). The HARQ-ACK feedback set may include an HARQ-ACK feedback value(s) for a DL (channel) transmission (e.g. a PDSDH), for example, multiple HARQ-ACK feedback values fed back from multiple terminals. An HARQ-ACK feedback value indicates reception response information for a transport block or a PDSCH, and may indicate an ACK, a NACK, a DTX, and an NACK/DTX. According to context, the HARQ-ACK feedback value may be used together with an HARQ-ACK value/bit/response/information.

reference window: meaning a time interval in which a DL transmission (e.g. a PDSCH) corresponding to an HARQ-ACK feedback set is performed in an unlicensed band (e.g. an LTE-U cell). The reference window may be defined in units of SFs. The reference window will be described and proposed in more detail later.

In LTE, an HARQ-ACK feedback value may indicate only an ACK or an NACK, or further indicate a DTX according to an HARQ-ACK feedback scheme, a PUCCH format, or the like. For example, if PUCCH format 3 is configured by an HARQ-ACK feedback method, an HARQ-ACK value may only indicate an ACK and an NACK. Meanwhile, a channel selection scheme using PUCCH format 1b is configured by an HARQ-ACK feedback method, an HARQ-ACK value may indicates an ACK, an NACK, a DTX, and an NACK/DTX.

Figure 16:
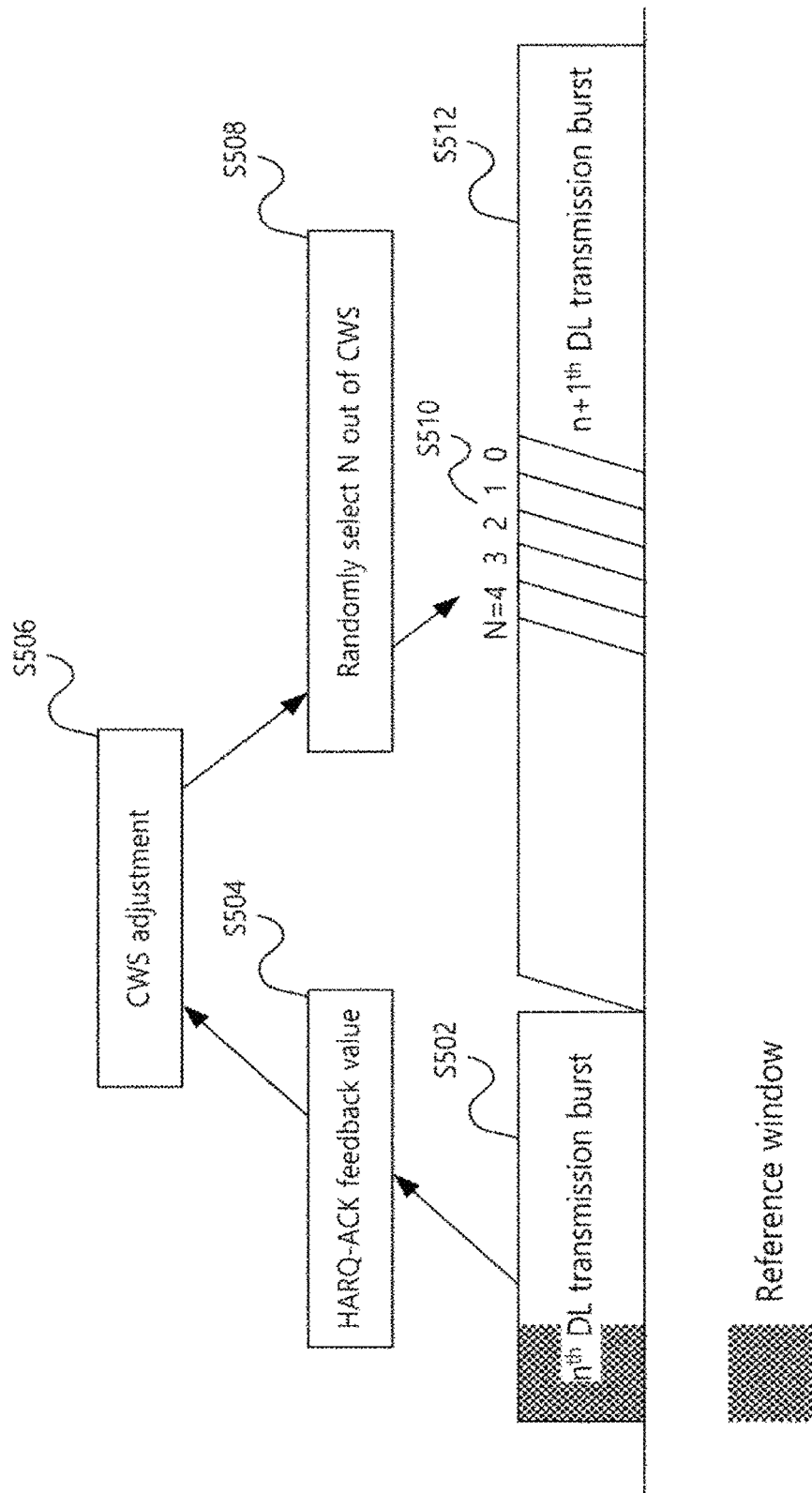
FIG. 16 illustrates an example of a method for adjusting a contention window size (CWS) at the time of channel access in an unlicensed band.

Referring to FIG. 16, after a base station transmits a n-th DL transmission burst in an unlicensed band (e.g. an LTE-U cell) (S502), if an additional DL transmission is needed, the base station may transmit an (n+1)th DL transmission burst on the basis of an ECCA (S512). Specifically, when a channel in an unlicensed band is empty during an ECCA defer period, the base station additionally performs backoff in a CW (S510). The base station may generate a random number N in a CW (e.g. [0, q−1]) (S508), and perform backoff as many slots as the random number N (S510). In the present disclosure, the CWS may be adjusted on the basis of HARQ-ACK feedback values from terminals (S506). The HARQ-ACK feedback values used for CWS adjustment includes HARQ-ACK feedback values related to the latest DL transmission burst (the n-th DL transmission burst). The HARQ-ACK feedback values used for CWS adjustment include HARQ-ACK feedback values related to a DL transmission on a reference window in the DL transmission burst (S504).

In the above description of the present disclosure so far, an LAA cell based on LTE is defined as an LTE-U cell, however, also identically for NR, an NR licensed cell may be replaced with an LTE-L cell, and an NR unlicensed cell may also be replaced with an LTE-U cell, for application to the present disclosure. However, with respect to a point which may be different with using an NR unlicensed cell, if there is a reference related thereto in a detailed matter of the present disclosure, the reference is applied to the NR-unlicensed cell.

<BWP Operation for Wideband Operation in NR System>

Figure 17:
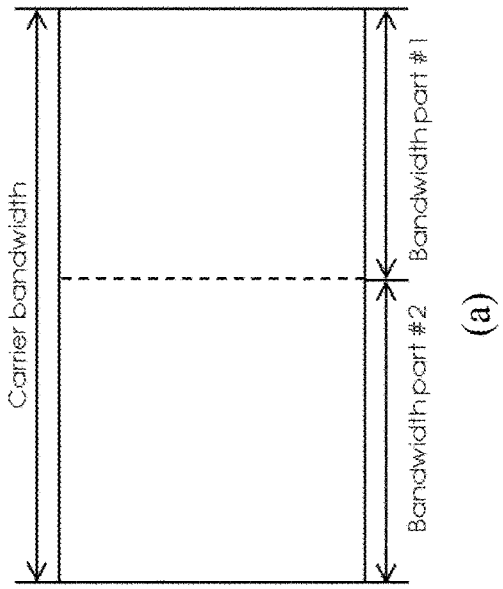
FIG. 17 illustrates an example of a method for configuring, for terminals, a bandwidth part (BWP) having a bandwidth equal to or smaller than the bandwidth of a carrier (or a cell) in a 3GPP NR system.
Figure 17:
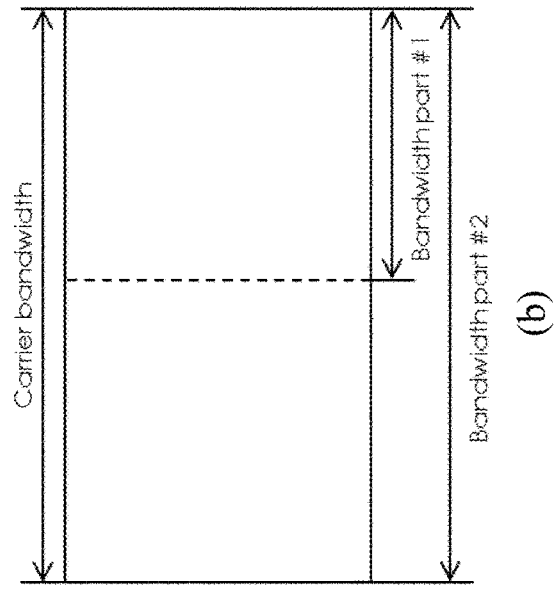

FIG. 17 illustrates an example of a method for configuring, for terminals, a BWP having a bandwidth equal to or smaller than the bandwidth of a carrier (or a cell) in a 3GPP NR system.

Referring to FIG. 17, in a 3GPP NR system, terminals may perform transmission or reception using a bandwidth equal to or smaller than the bandwidth of a carrier (or a cell). To this end, a terminal may receive a configuration of multiple BWPs from a base station. Each of the BWPs is configured by consecutive PRBs. Referring to FIG. 17-(a), the BWPs may be separated to be not overlapped with each other. One or multiple BWPs among the BWPs separated to be not overlapped may be allocated and configured for terminals. The terminals may perform transmission or reception with the base station by using the allocated and configured BWPs. Referring to FIG. 17-(b), BWPs may be separated while being overlapped in a carrier bandwidth. One BWP may be configured to be included in another BWP. One or multiple BWPs among the BWPs separated while being overlapped may be allocated and configured for terminals. The terminals may perform transmission or reception with the base station by using one BWP among the allocated and configured BWPs.

Figure 18:
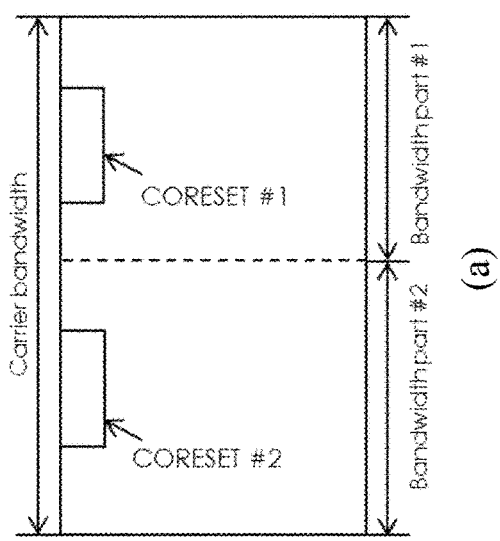
FIG. 18 illustrates an example in which, when multiple BWPs are assigned to a terminal, at least one CORESET in each of the BWPs is configured or assigned to the terminal.
Figure 18:
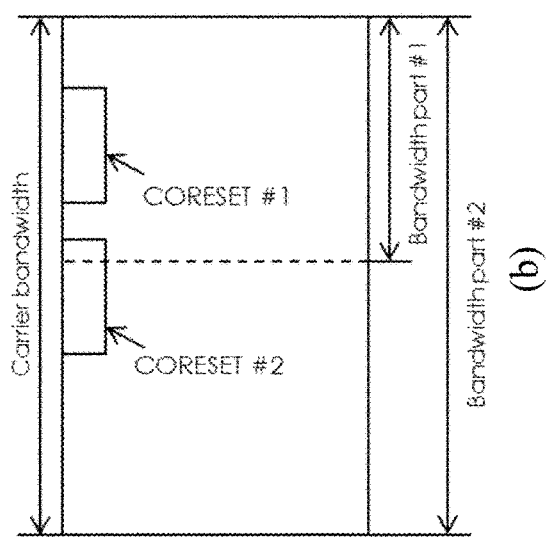

FIG. 18 illustrates an example of a method for configuring or allocating a CORESET in a BWP assigned to a terminal.

Referring to FIG. 18, when multiple BWPs are assigned to a terminal, at least one CORESET may be configured or assigned for each of the BWPs. Referring to FIGS. 18-(a) and 18-(b), in both a case when BWPs are configured to be not overlapped with each other, and a case when BWPs are configured to be overlapped, a CORESET for each of the BWPs may be positioned in the time/frequency resource region occupied by each BWP. In other words, CORESET #1 for bandwidth part #1 may exist within the PRBs of the time/frequency resource region occupied by bandwidth part #1, and CORESET #2 for bandwidth part #2 may exist within the PRBs of the time/frequency resource region occupied by bandwidth part #2. Referring to FIG. 18-(b), when bandwidth parts are configured to be overlapped with each other, PRBs occupied by a CORESET may be positioned in another bandwidth part even though the PRBs are still in the time/frequency resource region of the bandwidth part of the CORESET. In other words, CORESET #2 for bandwidth part #2 may overlap with the PRBs of the time/frequency resource region occupied by bandwidth part #1.

In a time division duplex (TDD) cell, a maximum of four downlink BWPs (DL BWPs) and a maximum of four uplink BWPs (UL BWPs) per cell may be configured. For a terminal, one DL BWP and one UL BWP may be simultaneously activated in one cell. In a frequency division duplex (FDD) cell, a maximum of four DL/UL BWP pairs per cell may be configured. For a terminal, one DL/UL BWP may be simultaneously activated in one cell. A terminal does not expect to receive any signal in a PRB other than an activated DL BWP, and does not expect to transmit any signal in a PRB other than an activated UL BWP. A terminal moves from one BWP to another BWP, that is, the base station instructs the terminal to deactivate a currently used BWP and activate a new BWP by using downlink control information (DCI). More specifically, DCI scheduling a PDSCH includes a bandwidth part indicator (BPI) indicating a BWP to be activated, so as to change a DL BWP of a terminal in a TDD cell. That is, if DCI scheduling a PDSCH is received, a terminal may identify a BWP through which the PDSCH is to be transmitted, through a BPI. Furthermore, the terminal may identify PRBs of the BWP, through which the PDSCH is to be transmitted, through resource allocation (RA) information of the DCI. Similarly, DCI scheduling a PUSCH includes a bandwidth part indicator (BPI) indicating a BWP to be activated, so as to change a UL BWP of a terminal in a TDD cell. That is, if DCI scheduling a PUSCH is received, a terminal may identify a BWP through which the PUSCH is to be transmitted, through a BPI. Furthermore, the terminal may identify PRBs of the indicated BWP, through which the PUSCH is to be transmitted, through RA information of the DCI. In an FDD cell, a BWP value of DCI scheduling a PDSCH and a PUSCH may indicate one of DL/UL BWP pairs.

A wireless communication apparatus operated in a wireless communication system according to an embodiment of the present disclosure may perform an LBT procedure in a unit of predesignated bandwidths in order to perform the LBT procedure in an unlicensed band. The predesignated bandwidth may be called an LBT bandwidth, an LBT subband, or an LBT basic bandwidth. For convenience of explanation, in the following description, the predesignated bandwidth is called a basic bandwidth. Specifically, when accessing a channel, a wireless communication apparatus may determine whether the channel is idle in a unit of basic bandwidths. In a detailed embodiment, a wireless communication apparatus may determine whether a channel is idle in a unit of predesignated basic bandwidths, and determine whether to perform transmission in the channel, on the basis of the determination on whether the channel is idle. In addition, the basic bandwidth may be 20 MHz. The 20 MHz size may be determined in consideration of the coexistence with another wireless communication apparatus (e.g., a wireless LAN apparatus) using an unlicensed band. In the present specification, a wireless communication apparatus may be called a terminal or a base station. In addition, the wireless communication apparatus may be called both a terminal and a base station. Therefore, both channel access for UL transmission and channel access for DL transmission may be performed in a unit of basic bandwidths. As described above, when a wireless communication apparatus performs channel access in a unit of basic bandwidths in an unlicensed band, a method for performing channel access by using a bandwidth larger than the basic bandwidth, or performing channel access in a BWP having a bandwidth larger than the basic bandwidth may be a problem. The BWP corresponds to consecutive PRB sets selected from among consecutive multiple RB subsets for given carriers and given numerology, as described above. A base station may configure one or more DL BWPs for the downlink for a terminal, and may perform transmission to the terminal through one downlink active DL BWP among the one or more configured DL BWPs. Furthermore, the base station may configure one or more UL BWPs for the uplink for the terminal, and may schedule a resource for uplink transmission of the terminal through one uplink active UL BWP among the one or more configured UL BWPs. Specifically, in a case where a frequency resource corresponding to one basic bandwidth is idle, but another resource corresponding to the basic bandwidth is being used (busy), a method for accessing a channel by a wireless communication apparatus may be a problem. This is because, in a BWP, in a case where a frequency resource corresponding to one basic bandwidth is idle, but another resource corresponding to the basic bandwidth is busy, if a wireless communication apparatus fails to transmit data in the BWP, frequency efficiency (spectral efficiency) may be reduced.

In a detailed embodiment, a base station may assign the bandwidth of a BWP to be the basic bandwidth. In this case, the base station may perform downlink transmission in multiple BWPs at the same time. A terminal may perform uplink transmission in multiple BWPs at the same time. In these embodiments, the specific operation of the base station and the terminal may be the same as a channel access operation in multi-carriers, defined in 3GPP TS 36.213 v14.8.0. In another detailed embodiment, a base station may configure the bandwidth of a BWP to be an integer multiple of the basic bandwidth. A detailed method for accessing, by a wireless communication apparatus, a channel by using a BWP in a wireless communication system operated in an unlicensed band will be described.

A base station may configure multiple BWPs for a terminal in an unlicensed band. Specifically, the base station may configure multiple downlink BWPs for the terminal in an unlicensed band. The base station may activate multiple BWPs for the terminal in the unlicensed band. In this embodiment, an operation method of the base station and the terminal will be described first. The base station may indicate information on an activated BWP to the terminal by transmitting bandwidth part (BWP)-related signaling. The terminal may receive the BWP-related signaling from the base station, and may determine a BWP activated for the terminal. Specifically, the base station may configure one or more activated downlink BWPs for the terminal among multiple downlink BWPs through dedicated RRC signaling. Alternatively, as described above, the base station may indicate an activated BWP among BWPs configured for the terminal, through DCI. The terminal may receive DCI, and determine an activated BWP on the basis of the DCI.

When a channel is successfully accessed by the base station in one or more BWPs, the base station may transmit a PDSCH in the one or more BWPs in which the channel access has been successful. That is, if there are multiple BWPs in which a channel is successfully accessed by the base station, the base station may transmit a PDSCH in the multiple BWPs. The base station may transmit PDCCHs scheduling PDSCHs in BWPs in which the PDSCHs are to be transmitted, and each of the PDCCHs may include scheduling information of a PDSCH transmitted in a BWP in which a corresponding PDCCH is transmitted. The scheduling information of a PDSCH indicates information on time and frequency resources for the transmission of the PDSCH. When multiple BWPs are activated among BWPs configured for the terminal, the terminal may not determine, among the multiple activated BWPs, a BWP in which a channel will be successfully accessed by the base station. Therefore, the terminal may monitor a PDCCH in a CORESET configured in each of the multiple activated BWPs, so as to attempt to receive the PDCCH. The terminal may receive a PDSCH in each BWP by using PDSCH scheduling information included in a received PDCCH. The terminal may monitor a PDCCH in all BWPs configured for the terminal. Specifically, the terminal may monitor a PDCCH in a CORESET of all BWPs configured for the terminal. In addition, the terminal may receive a PDSCH in a corresponding BWP on the basis of PDSCH scheduling information included in a received PDCCH. In this embodiment, the terminal is required to monitor a PDCCH in all BWPs configured for the terminal, and thus complexity for blind decoding of the PDCCH may be increased. Furthermore, the power consumed by the terminal to receive the PDCCH may be also increased. In the present specification, the success of channel access may indicate a case where transmission is allowed in a corresponding channel according to a channel access procedure. The channel access procedure may indicate an LBT procedure described above.

The base station may configure different BWPs to have different frequency resources. In addition, the base station may configure different BWPs to have an overlapped frequency resource. For example, if it is configured that different BWPs are overlapped with each other, a part of a first BWP frequency resource and a part of a second BWP frequency resource may be same. Moreover, the second BWP frequency resource may be included in the first BWP frequency resource. For convenience of explanation, if the frequency resources of different BWPs are overlapped with each other, the BWPs are called overlapped BWPs. The base station configures a CORESET for each of BWPs, and the terminal monitors a PDCCH in a CORESET resource of each of the BWPs. If there are overlapped BWPs, the terminal may sequentially monitor a PDCCH in the overlapped BWPs according to the priorities of the BWPs. In this embodiment, when the terminal receives a PDCCH in one BWP, the terminal may not monitor a PDCCH in a BWP having a priority lower than that of the BWP in which the PDCCH is received. The priority may be configured on the basis of the bandwidth size of the BWP. In a detailed embodiment, a BWP having a wider bandwidth may have a higher priority. When the bandwidth of a first BWP is larger than that of a second BWP, the terminal may monitor a PDCCH in the first BWP and then monitor a PDCCH in the second BWP. In another detailed embodiment, a BWP having a narrower bandwidth may have a higher priority. When the bandwidth of a first BWP is smaller than that of a second BWP, the terminal may monitor a PDCCH in the first BWP and then monitor a PDCCH in the second BWP. This operation may be efficient in a case where a base station may perform transmission in a BWP only when a channel is successfully accessed in all basic bandwidths included in the BWP. This is because, in a case where a base station may perform transmission in a BWP only when a channel is successfully accessed in all basic bandwidths included in the BWP, it is highly probable that the terminal transmits a PDCCH in a BWP having a narrow bandwidth.

In another embodiment, even when a channel is successfully accessed by the base station in multiple BWPs, the base station may transmit a PDSCH in one BWP among the multiple BWPs in which the channel is successfully accessed. The base station may determine a BWP in which a PDSCH is to be transmitted, among the multiple BWPs in which the channel is successfully accessed, according to the priorities. The base station may transmit a PDCCH scheduling a PDSCH in a BWP in which the PDSCH is to be transmitted. The terminal may determine the sequence of multiple BWPs in which a PDCCH is to be monitored, on the basis of the priorities of the BWPs. If multiple BWPs are activated for the terminal, the terminal may sequentially monitor a PDCCH in the multiple BWPs according to the priorities of the multiple BWPs. When the terminal receives a PDCCH in one BWP, PDCCH monitoring may be omitted in BWPs other than the BWP in which the PDCCH is received. Specifically, when the terminal receives a PDCCH scheduling a PDCSH in one BWP, monitoring of a PDCCH scheduling a PDSCH may be omitted in BWPs other than the BWP in which the PDCCH is received.

The priority may be determined on the basis of the index of the BWP. In a detailed embodiment, a BWP having a greater index may have a higher priority. For example, if the base station has successfully accessed a channel in a first BWP and a second BWP, and the index of the first BWP is greater than the index of the second BWP, the base station may determine the first BWP, as a BWP in which a PDSCH is to be transmitted, among the first BWP and the second BWP. The terminal may monitor a PDCCH in the first BWP and then monitor a PDCCH in the second BWP. In another detailed embodiment, a BWP having a smaller index may have a higher priority. For example, if the base station has successfully accessed a channel in a first BWP and a second BWP, and the index of the first BWP is smaller than the index of the second BWP, the base station may determine the first BWP, as a BWP in which a PDSCH is to be transmitted, among the first BWP and the second BWP. The terminal may monitor a PDCCH in the first BWP and then monitor a PDCCH in the second BWP. When the terminal receives a PDCCH in a BWP having a high priority related to monitoring the PDCCH, the terminal may omit PDCCH monitoring in BWPs other than the BWP in which the PDCCH is received. Specifically, when the terminal receives a PDCCH scheduling a PDCSH in a BWP having a high priority related to monitoring the PDCCH, monitoring of a PDCCH scheduling a PDSCH may be omitted in BWPs other than the BWP in which the PDCCH is received.

In another detailed embodiment, the priority may be determined on the basis of the bandwidth of the BWP. Specifically, a BWP having a narrower bandwidth may have a higher priority. For example, if the base station has successfully accessed a channel in a first BWP and a second BWP, and the bandwidth of the first BWP is smaller than the bandwidth of the second BWP, the base station may determine the first BWP, as a BWP in which a PDSCH is to be transmitted, among the first BWP and the second BWP. The terminal may monitor a PDCCH in the first BWP and then monitor a PDCCH in the second BWP. In another detailed embodiment, a BWP having a wider bandwidth may have a higher priority. For example, if the base station has successfully accessed a channel in a first BWP and a second BWP, and the bandwidth of the first BWP is larger than the bandwidth of the second BWP, the base station may determine the first BWP, as a BWP in which a PDSCH is to be transmitted, among the first BWP and the second BWP. The terminal may monitor a PDCCH in the first BWP and then monitor a PDCCH in the second BWP. In addition, in the above embodiments, if multiple BWPs have the same bandwidths, the priorities may be determined on the basis of the indexes of the BWPs.

In another detailed embodiment, the base station may configure one or more BWPs for the terminal in an unlicensed band, and may be limited to activate only one BWP among the one or more configured BWPs. Accordingly, even if multiple BWPs are configured for the terminal in an unlicensed band, the base station may activate only one BWP for the terminal in the unlicensed band. In this embodiment, an operation method of the base station and the terminal will be described first.

The base station may transmit a PDSCH to the terminal in a BWP only when a channel is successfully accessed in all basic bandwidths included in the BWP. If a channel is successfully accessed by the base station in all basic bandwidths included in a BWP, the base station may transmit a PDCCH scheduling a PDSCH to the terminal in the BWP. The terminal may monitor a PDCCH in an active BWP among BWPs configured for the terminal. Specifically, the terminal may monitor a PDCCH in a CORESET of an active BWP among BWPs configured for the terminal. The terminal monitors a PDCCH in only one BWP, and thus it may be prevented that the complexity of the terminal is increased for the operation in an unlicensed band. Moreover, it may be prevented that the power consumption efficiency of the terminal is decreased in an unlicensed band. However, in a case where a base station performs transmission in a BWP only when a channel is successfully accessed in all basic bandwidths included in the BWP, the spectral efficiency of downlink transmission from the base station to the terminal may be decreased.

In a case where a channel is successfully accessed by the base station in even one of basic bandwidths included in a BWP, the base station may transmit a PDSCH to the terminal in the BWP by using one or more bandwidths in which the channel access has been successful. In a case where a channel is successfully accessed by the base station in even one of basic bandwidths included in a BWP, the base station may transmit a PDCCH scheduling a PDSCH to the terminal in the BWP by using one or more bandwidths in which the channel access has been successful. Through this embodiment, the base station may increase a spectral efficiency for the transmission of a PDCCH. However, the terminal is unable to identify a basic bandwidth, among one or more basic bandwidths included in a BWP, in which a channel has been successfully accessed by the base station. Therefore, the terminal may monitor a PDCCH in a CORESET configured in a BWP. However, in a case where a CORESET is configured in a unit of BWPs, and the base station fails to access a channel in one bandwidth among basic bandwidths included in a BWP, the base station is unable to use a partial bandwidth of the CORESET, and thus may fail to transmit a PDCCH in the CORESET. Accordingly, the terminal may fail to receive a PDCCH in the CORESET. Therefore, the base station may configure a CORESET within a basic bandwidth in a BWP. Specifically, if the base station configures a CORESET in a BWP, the base station may configure the CORESET within a basic band. The terminal may assume that the base station may transmit a PDCCH in a CORESET in a basic bandwidth, and then may monitor the PDCCH. In a case where the size of the bandwidth of a BWP configured for the terminal, that is, the number of basic bandwidths is increased, the terminal monitors a PDCCH in an increased number of CORESETs because each CORESET is allowed to be configured within a basic bandwidth. Therefore, there are shortcomings in that the complexity and power consumption of the terminal may be increased by PDCCH blind decoding. Therefore, a method by which a terminal may efficiently monitor a PDCCH is required. Specifically, a method by which a terminal efficiently monitors a PDCCH when a CORESET is configured in a basic bandwidth, that is, a CORESET has a bandwidth equal to or smaller than that of the basic bandwidth, is required. The method will be explained with reference to FIGS. 19 to 21.

Figure 19:
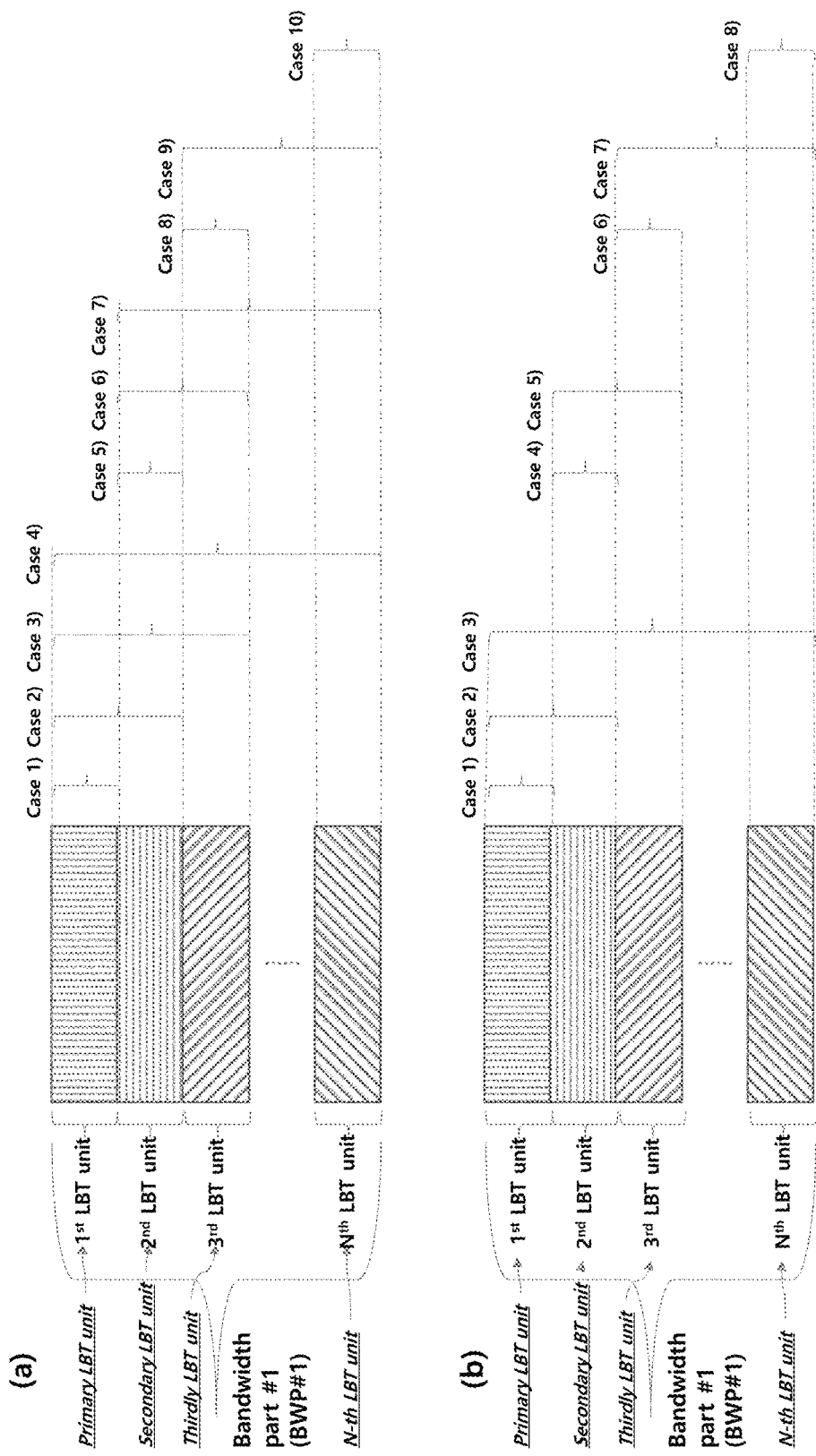
FIG. 19 shows an operation of, when a base station according to an embodiment of the present disclosure configures a BWP including one or more basic bandwidths, transmitting a PDCCH in a CORESET configured in each of the basic bandwidths, on the basis of the priorities of the basic bandwidths, and transmitting a PDSCH in the BWP.

FIG. 19 shows an operation of, when a base station according to an embodiment of the present disclosure configures a BWP including one or more basic bandwidths, transmitting a PDCCH in a CORESET configured in each of the basic bandwidths, on the basis of the priorities of the basic bandwidths, and transmitting a PDSCH in the BWP.

In a case where a channel is successfully accessed by the base station in multiple basic bandwidths each including a CORESET in a BWP, the base station may transmit a PDCCH scheduling a PDSCH to the terminal in one basic bandwidth among the multiple basic bandwidths in which the channel access has been successful. The base station may divide a BWP into multiple basic bandwidths each including a CORESET, and may designate a priority of each of the multiple basic bandwidths. Each of the multiple basic bandwidths may have a unique priority. In a case where a channel is successfully accessed by the base station in multiple basic bandwidths each including a CORESET in a BWP, the base station may determine, as a bandwidth in which a PDCCH is to be transmitted, a basic bandwidth having the highest priority among the basic bandwidths in which the base station has succeeded in the channel access. That is, in a case where a channel is successfully accessed by the base station in multiple basic bandwidths each including a CORESET in a BWP, the base station may transmit a PDCCH to the terminal in a basic bandwidth having the highest priority among the basic bandwidths in which the base station has succeeded in the channel access. For convenience of explanation, a basic bandwidth having the highest priority among basic bandwidths in which the base station may transmit a PDCCH and has successfully accessed a channel, is called a top-priority basic bandwidth. The terminal may monitor a PDCCH on the basis of the priorities of basic bandwidths. Specifically, the terminal may determine the sequence of basic bandwidths in which a PDCCH is to be monitored, on the basis of the priorities of the basic bandwidths. In a case where CORESETs are configured in basic bandwidths, the terminal may sequentially monitor a PDCCH in CORESETs of multiple basic bandwidths according to the priorities of the multiple basic bandwidths. For example, when the terminal has failed to receive a PDCCH in a CORESET configured in a bandwidth having the highest priority among basic bandwidths, the terminal monitors a PDCCH in a CORESET configured in a basic bandwidth having the second highest priority. When the terminal receives a PDCCH in one basic bandwidth, monitoring a PDCCH in the remaining basic bandwidths may be omitted. Specifically, when the terminal receives a PDCCH scheduling a PDCSH in one basic bandwidth, monitoring of a PDCCH scheduling a PDSCH may be omitted in basic bandwidths other than the basic bandwidth in which the PDCCH is received.

In addition, a PDCCH may schedule a PDCSH transmitted in a basic bandwidth in which the base station has succeeded in channel access. A PDCCH may schedule a PDCSH transmitted in basic bandwidths other than a top-priority basic bandwidth, as well as a PDSCH transmitted in the top-priority basic bandwidth. The base station may determine one or more basic bandwidths in which a PDSCH is to be transmitted, on the basis of a top-priority basic bandwidth. The terminal may receive a PDSCH on the basis of PDSCH scheduling information included in a received PDCCH.

In addition, the base station may determine a basic bandwidth in which a PDSCH is to be transmitted, by combining a result of channel access in the top-priority basic bandwidth, and a result of channel access in other basic bandwidths in a corresponding BWP. In a detailed embodiment, when the base station has also successfully accessed a channel in a basic bandwidth adjacent to the top-priority basic bandwidth, the base station may transmit a PDSCH on the basis of the top-priority basic bandwidth and the basic bandwidth, in which the base station has succeeded in channel access and which is adjacent to the top-priority basic bandwidth. The base station may transmit a PDSCH through a bandwidth having the size of an integer multiple of the basic bandwidth (e.g., 20 MHz*M, wherein M={1, 2, 3, 4, . . . , N}, and N is a natural number). In another detailed embodiment, the base station may transmit a PDSCH through a bandwidth having a size obtained by multiplying the basic bandwidth by a power of 2 (e.g., 20 MHz*2^L, wherein L={0, 1, 2, 3, . . . , X} and X is a natural number). Each of the LBT units shown in FIG. 19 indicates a basic bandwidth.

FIG. 19-(a) shows a case where a base station transmits a PDSCH through a bandwidth having the size of an integer multiple of a basic bandwidth. Case 1 shows an instance where the base station has successfully accessed a channel in a basic bandwidth (primary LBT unit) having the highest priority, and has failed to access a channel in a basic bandwidth (secondary LBT unit) having the second highest priority. In case 1, the base station is allowed to transmit a PDSCH through one basic bandwidth (1st LBT unit). Case 2 shows an instance where the base station has successfully accessed a channel in a basic bandwidth (primary LBT unit) having the highest priority and a basic bandwidth (secondary LBT unit) having the second highest priority, and has failed to access a channel in a basic bandwidth (thirdly LBT unit) having the third highest priority. In case 2, the base station is allowed to transmit a PDSCH through two basic bandwidths (1st LBT unit and 2nd LBT unit). Case 3 shows an instance where the base station has successfully accessed a channel in a basic bandwidth (primary LBT unit) having the highest priority, a basic bandwidth (secondary LBT unit) having the second highest priority, and a basic bandwidth (thirdly LBT unit) having the third highest priority, and has failed to access a channel in a basic bandwidth (fourthly LBT unit) having the fourth highest priority. In case 3, the base station is allowed to transmit a PDSCH through three basic bandwidths (1st LBT unit, 2nd LBT unit, and 3rd LBT unit). Case 4 shows an instance where the base station has successfully accessed a channel in all (N number of) basic bandwidths. In case 4, the base station is allowed to transmit a PDSCH through N number of basic bandwidths (1st LBT unit, 2nd LBT unit, 3rd LBT unit, . . . , and Nth LBT unit). Case 5 shows an instance where the base station has successfully accessed a channel in a basic bandwidth (secondary LBT unit) having the second highest priority, and has failed to access a channel in a basic bandwidth (primary LBT unit) having the highest priority and a basic bandwidth (thirdly LBT unit) having the third highest priority. In case 5, the base station is allowed to transmit a PDSCH through one basic bandwidth (2nd LBT unit). Case 6 shows an instance where the base station has successfully accessed a channel in a basic bandwidth (secondary LBT unit) having the second highest priority and a basic bandwidth (thirdly LBT unit) having the third highest priority, and has failed to access a channel in a basic bandwidth (primary LBT unit) having the highest priority and a basic bandwidth (fourthly LBT unit) having the fourth highest priority. In case 6, the base station is allowed to transmit a PDSCH through two basic bandwidths (2nd LBT unit and 3rd LBT unit). Case 7 shows an instance where the base station has successfully accessed a channel in all basic bandwidths except for a basic bandwidth (primary LBT unit) having the highest priority. In this case, PDSCH transmission through (N−1) number of basic bandwidths (2nd LBT unit, 3rd LBT unit, . . . Nth LBT unit) is allowed. Case 8 shows an instance where the base station has successfully accessed a channel in a basic bandwidth (thirdly LBT unit) having the third highest priority, and has failed to access a channel in a basic bandwidth (primary LBT unit) having the highest priority, a basic bandwidth (secondary LBT unit) having the second highest priority, and a basic bandwidth (fourthly LBT unit) having the fourth highest priority. In case 8, the base station is allowed to transmit a PDSCH through one basic bandwidth (thirdly LBT unit). Case 9 shows an instance where the base station has successfully accessed a channel in all basic bandwidths except for a basic bandwidth (primary LBT unit) having the highest priority and a basic bandwidth (secondary LBT unit) having the second highest priority. In case 9, the base station is allowed to transmit a PDSCH through (N−2) number of basic bandwidths (3rd LBT unit, . . . , Nth LBT unit). Case 10 shows an instance where the base station has successfully accessed a channel only in a basic bandwidth (Nth LBT unit) having the lowest priority. In case 10, the base station is allowed to transmit a PDSCH through one basic bandwidth (Nth LBT unit).

FIG. 19(b) shows a case where a base station transmits a PDSCH through a bandwidth having a size obtained by multiplying a basic bandwidth by a power of 2. Case 1 shows an instance where the base station has successfully accessed a channel in a basic bandwidth (a primary LBT unit) having the highest priority, and has failed to access a channel in a basic bandwidth (a secondary LBT unit) having the second highest priority. In case 1, the base station is allowed to transmit a PDSCH through one basic bandwidth (1st LBT unit). Case 2 shows an instance where the base station has successfully accessed a channel in a basic bandwidth (primary LBT unit) having the highest priority and a basic bandwidth (secondary LBT unit) having the second highest priority, and has failed to access a channel in at least one of a basic bandwidth (thirdly LBT unit) having the third highest priority and a basic bandwidth (fourthly LBT unit) having the fourth highest priority. In case 2, the base station is allowed to transmit a PDSCH through two basic bandwidths (1st LBT unit and 2nd LBT unit). Case 3 shows an instance where the base station has successfully accessed a channel in all (N number of) basic bandwidths. In case 3, the base station is allowed to transmit a PDSCH through N number of basic bandwidths. Case 4 shows an instance where the base station has successfully accessed a channel in a basic bandwidth (secondary LBT unit) having the second highest priority, and has failed to access a channel in a basic bandwidth (primary LBT unit) having the highest priority and a basic bandwidth (thirdly LBT unit) having the third highest priority. In case 4, the base station is allowed to transmit a PDSCH through one basic bandwidth (2nd LBT unit). Case 5 shows an instance where the base station has successfully accessed a channel in a basic bandwidth (secondary LBT unit) having the second highest priority and a basic bandwidth (thirdly LBT unit) having the third highest priority, has failed to access a channel in a basic bandwidth (primary LBT unit) having the highest priority, and has failed to access a channel in at least one of the basic bandwidth (thirdly LBT unit) having the third highest priority and a basic bandwidth (fourthly LBT unit) having the fourth highest priority. In case 5, the base station is allowed to transmit a PDSCH through two basic bandwidths (2nd LBT unit and 3rd LBT unit). Case 6 shows an instance where the base station has successfully accessed a channel in a basic bandwidth (thirdly LBT unit) having the third highest priority, and has failed to access a channel in a basic bandwidth (primary LBT unit) having the highest priority, a basic bandwidth (secondary LBT unit) having the second highest priority, and a basic bandwidth (fourthly LBT unit) having the fourth highest priority. In case 6, the base station is allowed to transmit a PDSCH through one basic bandwidth (3rd LBT unit). Case 7 shows an instance where the base station has failed to access a channel in a channel in a basic bandwidth (primary LBT unit) having the highest priority and a basic bandwidth (secondary LBT unit) having the second highest priority, and has successfully accessed a channel in the (N−2) number of remaining basic bandwidths (3rd LBT unit, . . . , Nth LBT unit). Number (N−2) is equal to a power of 2. In case 7, the base station is allowed to transmit a PDSCH through (N−2) number of basic bandwidths (3rd LBT unit, . . . , Nth LBT unit). Case 8 shows an instance where the base station has successfully accessed a channel only in a basic bandwidth (Nth LBT unit) having the lowest priority. In case 8, the base station is allowed to transmit a PDSCH through one basic bandwidth (Nth LBT unit).

Figure 20:
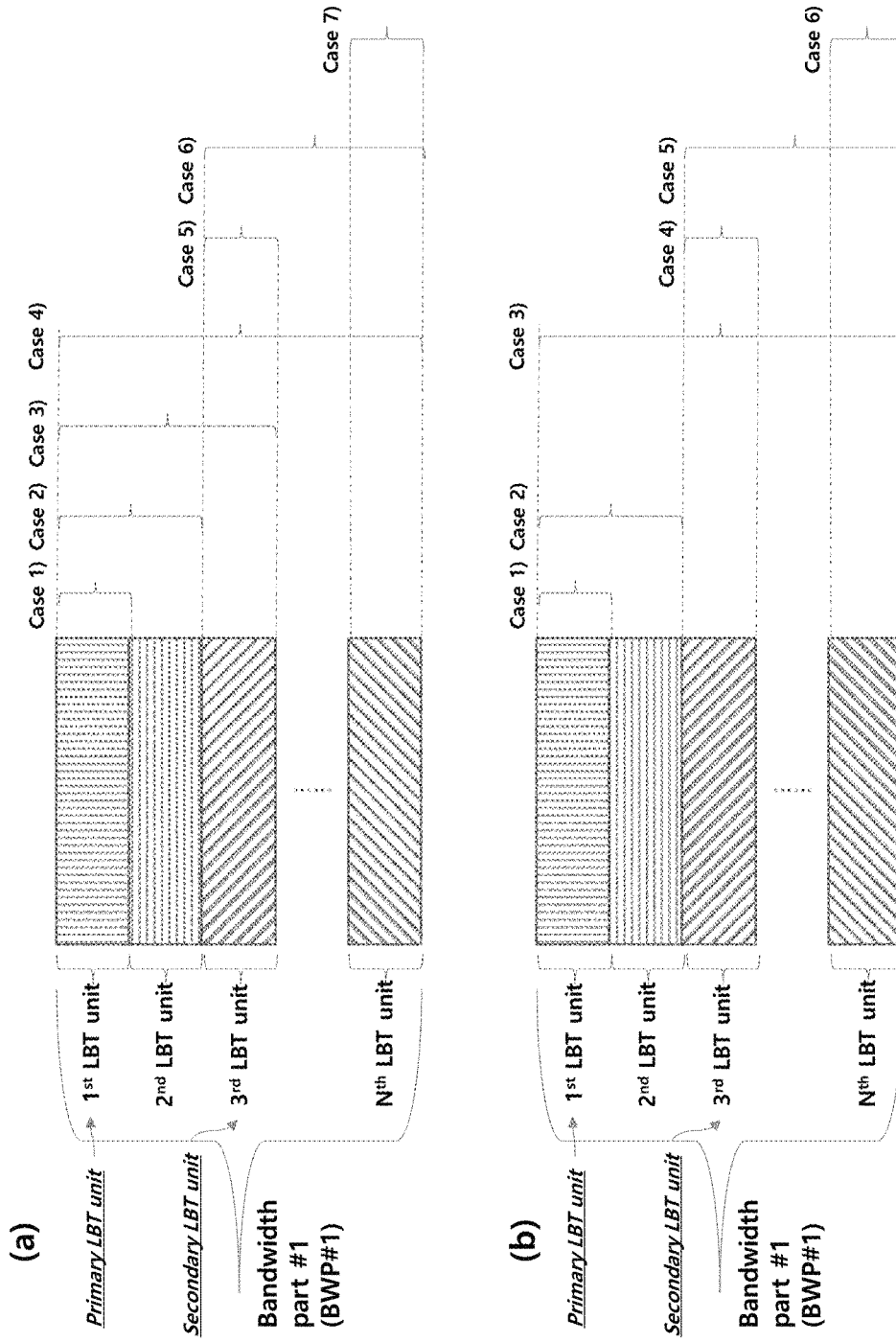
FIG. 20 shows an operation in which, when a BWP is configured to include one or more basic bandwidths according to an embodiment of the present disclosure, a base station transmits a PDCCH in a CORESET configured in each of designated basic bandwidths, according to the priorities thereof, and transmits a PDSCH in the BWP.

FIG. 20 shows an operation in which, when a BWP is configured to include one or more basic bandwidths according to an embodiment of the present disclosure, a base station transmits a PDCCH in a CORESET configured in each of designated basic bandwidths, according to the priorities thereof, and transmits a PDSCH in the BWP.

The base station may divide a BWP into multiple basic bandwidth units, may designate multiple priority basic bandwidths in which a terminal monitors a PDCCH, and may transmit a PDCCH only in the designated priority basic bandwidths. The base station may configure a CORESET in each of designated basic bandwidths. In another detailed embodiment, the base station may designate multiple priority basic bandwidths among basic bandwidths in which CORESET is configured. In addition, as described above, the bandwidths of CORESET may be configured within basic bandwidths, respectively. The terminal may monitor a PDCCH only in designated priority basic bandwidths.

One or more basic bandwidths in which the base station may transmit a PDCCH may be designated within a BWP. The base station may transmit a PDCCH to the terminal on the basis of a result of channel access in the designated basic bandwidths. Specifically, the base station may transmit a PDCCH according to the priorities of the designated basic bandwidths on the basis of a result of channel access in the designated basic bandwidths. The base station may transmit a PDCCH in a basic bandwidth having the highest priority among basic bandwidths which are designated basic bandwidths and in which channel access has been successful. In the embodiments shown in FIG. 20, the first basic bandwidth (1st LBT unit) and the third basic bandwidth (3rd LBT unit) are designated as basic bandwidths in which a PDCCH may be transmitted. In the embodiments shown in FIG. 20, when the base station has successfully accessed a channel in the first basic bandwidth (1st LBT unit) and the third basic bandwidth (3rd LBT unit), the base station may transmit a PDCCH in the first basic bandwidth (1st LBT unit).

The terminal may monitor a PDCCH in designated basic bandwidths. The terminal may monitor a PDCCH on the basis of the priorities of the designated basic bandwidths. Specifically, the terminal may determine the sequence of the designated basic bandwidths in which a PDCCH is to be monitored, on the basis of the priorities of the designated basic bandwidths. For example, when the terminal has failed to receive a PDCCH in a CORESET configured in a bandwidth having the highest priority among the designated basic bandwidths, the terminal monitors a PDCCH in a designated basic bandwidth having the second highest priority. When the terminal receives a PDCCH in one designated basic bandwidth, monitoring a PDCCH in the remaining designated basic bandwidths may be omitted. Specifically, when the terminal receives a PDCCH scheduling a PDCSH in one basic bandwidth, monitoring of a PDCCH scheduling a PDSCH may be omitted in the remaining designated basic bandwidths.

In addition, a PDCCH may schedule a PDCSH transmitted in a basic bandwidth in which the base station has succeeded in channel access. A PDCCH may schedule a PDCSH transmitted in basic bandwidths other than a top-priority basic bandwidth, as well as a PDSCH transmitted in the top-priority basic bandwidth. The base station may transmit a PDCCH in a top-priority basic bandwidth, and the top-priority basic bandwidth is a basic bandwidth having the highest priority among basic bandwidths in which the base station has succeeded in channel access therefore, the top-priority basic bandwidth corresponds to a basic bandwidth having the highest priority among basic bandwidths, which are designated basic bandwidths and in which the base station has succeeded in channel access. The base station may determine a basic bandwidth in which a PDSCH is to be transmitted, on the basis of the top-priority basic bandwidth. The terminal may receive a PDSCH on the basis of PDSCH scheduling information included in a received PDCCH.

In addition, the base station may determine a basic bandwidth in which a PDSCH is to be transmitted, by combining a result of channel access in the top-priority basic bandwidth, and a result of channel access in other basic bandwidths of a corresponding BWP. In a detailed embodiment, when the base station has also successfully accessed a channel in a basic bandwidth adjacent to the top-priority basic bandwidth, the base station may transmit a PDSCH on the basis of the top-priority basic bandwidth and the basic bandwidth, in which the base station has succeeded in channel access and which is adjacent to the top-priority basic bandwidth. The base station may transmit a PDSCH through a bandwidth having the size of an integer multiple of a basic bandwidth (e.g., 20 MHz*M, wherein M={1, 2, 3, 4, . . . , N}, and N is a natural number). In another detailed embodiment, the base station may transmit a PDSCH through a bandwidth having a size obtained by multiplying a basic bandwidth by a power of 2 (e.g., 20 MHz*2^L, wherein L={0, 1, 2, 3, . . . , X} and X is a natural number). Each of the LBT units shown in FIG. 20 indicates a basic bandwidth. As described above, in the embodiments shown in FIG. 20, two basic bandwidths (1st LBT unit and 3rd LBT unit) are designated as basic bandwidths in which a PDCCH may be transmitted.

FIG. 20-(a) shows a case where a base station transmits a PDSCH through a bandwidth having the size of an integer multiple of a basic bandwidth. Case 1 shows an instance where the base station has successfully accessed a channel in the first basic bandwidth (1st LBT unit), which is a basic bandwidth (primary LBT unit) having the highest priority, and has failed to access a channel in the second basic bandwidth (2nd LBT unit). In case 1, the base station is allowed to transmit a PDSCH through one basic bandwidth (1st LBT unit). Case 2 shows an instance where the base station has succeeded in the first basic bandwidth (primary LBT unit), which is a basic bandwidth having the highest priority, and the second basic bandwidth (2nd LBT unit), and has failed to access a channel in the third basic bandwidth (3rd LBT unit). In case 2, the base station is allowed to transmit a PDSCH through two basic bandwidths (1st LBT unit and 2nd LBT unit). Case 3 shows an instance where the base station has successfully accessed a channel in the first basic bandwidth, which is a basic bandwidth (primary LBT unit) having the highest priority, the second basic bandwidth (secondary LBT unit), and the third bandwidth (thirdly LBT unit), and has failed to access a channel in the N-th basic bandwidth (N-th LBT unit). In case 3, the base station is allowed to transmit a PDSCH through three basic bandwidths (1st LBT unit, 2nd LBT unit, 3rd LBT unit). Case 4 shows an instance where the base station has successfully accessed a channel in all (N number of) basic bandwidths. In case 4, the base station is allowed to transmit a PDSCH through N number of basic bandwidths (1st LBT unit, 2nd LBT unit, 3rd LBT unit, . . . Nth LBT unit). The base station transmits a PDSCH through N number of basic bandwidths (1st LBT unit, 2nd LBT unit, 3rd LBT unit, . . . Nth LBT unit). Case 5 shows an instance where the base station has successfully accessed a channel in the third basic bandwidth (3rd LBT unit), which is a basic bandwidth (secondary LBT unit) having the second highest priority, and has failed to access a channel in the first basic bandwidth (1st LBT unit), which is a basic bandwidth (primary LBT unit) having the highest priority, and the N-th basic bandwidth (N-th LBT unit). In case 5, the base station is allowed to transmit a PDSCH through one basic bandwidth (3rd LBT unit). Case 6 shows an instance where the base station has successfully accessed a channel in the third basic bandwidth (3rd LBT unit), which is a basic bandwidth (secondary LBT unit) having the second highest priority, and all the basic bandwidths from the fourth basic bandwidth to the n-th basic bandwidth, and has failed to access a channel in the first basic bandwidth (1st LBT unit), which is a bandwidth (primary LBT unit) having the highest priority. In case 6, the base station is allowed to transmit a PDSCH through (N−2) number of basic bandwidths (3rd LBT unit, . . . Nth LBT unit). Case 7 shows an instance where the base station has failed to access a channel in basic bandwidths having the first and second highest priorities when the n-th basic bandwidth is configured as a basic bandwidth having the third highest priority. In case 7, the base station is allowed to transmit a PDSCH through one basic bandwidth (Nth LBT unit).

FIG. 20-(b) shows a case where a base station transmits a PDSCH through a bandwidth having a size obtained by multiplying a basic bandwidth by a power of 2. Case 1 shows an instance where the base station has successfully accessed a channel in the first basic bandwidth (1st LBT unit), which is a basic bandwidth (primary LBT unit) having the highest priority, and has failed to access a channel in the second basic bandwidth (2nd LBT unit). In case 1, the base station is allowed to transmit a PDSCH through one basic bandwidth (1st LBT unit). Case 2 shows an instance where the base station has successfully accessed a channel in the first basic bandwidth (1st LBT unit), which is a basic bandwidth (primary LBT unit) having the highest priority, and the second basic bandwidth (2nd LBT unit), and has failed to access a channel in at least one of the third basic bandwidth (3rd LBT unit) and the fourth basic bandwidth (4th LBT unit). In case 2, the base station is allowed to transmit a PDSCH through two basic bandwidths (1st LBT unit and 2nd LBT unit). Case 3 shows an instance where the base station has successfully accessed a channel in all (N number of) basic bandwidths. In case 3, the base station is allowed to transmit a PDSCH through N number of basic bandwidths. Case 4 shows an instance where the base station has successfully accessed a channel in the third basic bandwidth (3rd LBT unit), which is a basic bandwidth (secondary LBT unit) having the second highest priority, and has failed to access a channel in the first basic bandwidth (1st LBT unit), which is a basic bandwidth (primary LBT unit) having the highest priority, and the fourth basic bandwidth (4th LBT unit). In case 4, the base station is allowed to transmit a PDSCH through one basic bandwidth (3rd LBT unit). Case 5 shows an instance where the base station has successfully accessed a channel in the third basic bandwidth (3rd LBT unit), which is a basic bandwidth (secondary LBT unit) having the second highest priority, and all the basic bandwidths after the third basic bandwidth (3rd LBT unit), and has failed to access a channel in the first basic bandwidth (1st LBT unit), which is a basic bandwidth (primary LBT unit) having the highest priority. In case 5, the base station is allowed to transmit a PDSCH through (N−2) number of basic bandwidths (3rd LBT unit, . . . Nth LBT unit). Number (N−2) is equal to a power of 2. Case 6 shows an instance where the base station has failed to access a channel in a basic bandwidth having the first highest priority and a basic bandwidth having the second highest priority when the N-th basic bandwidth is configured as a basic bandwidth having the third highest priority. In case 6, the base station is allowed to transmit a PDSCH through one basic bandwidth (N-th LBT unit).

Figure 21:
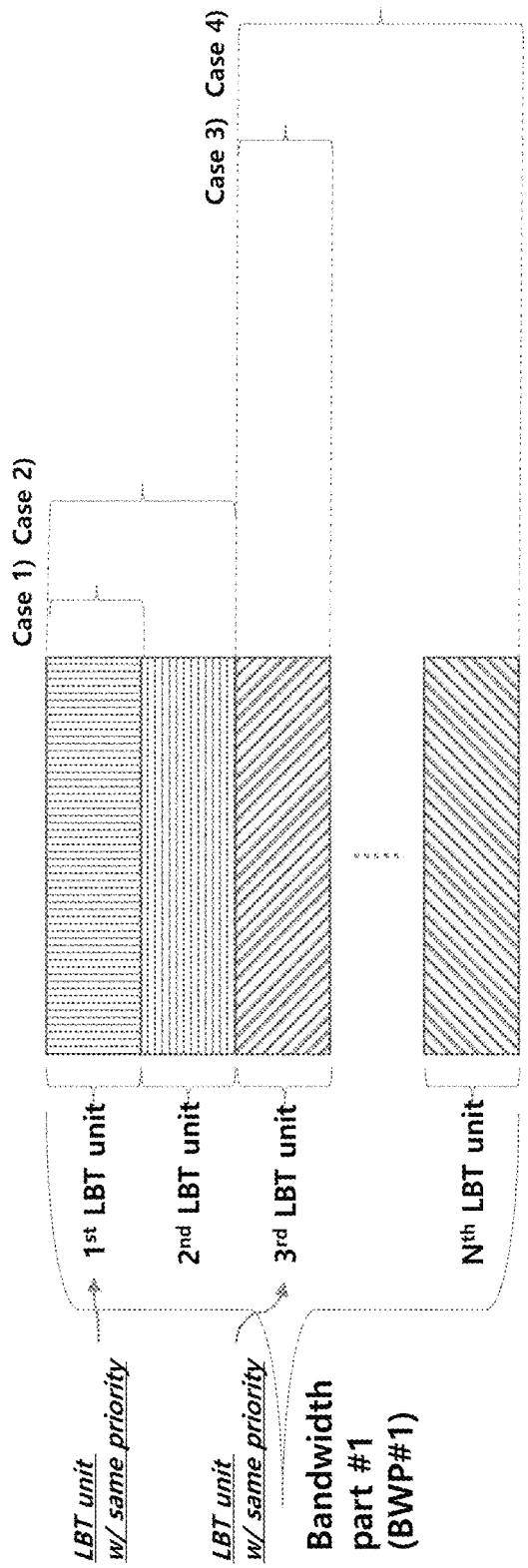
FIG. 21 shows an operation in which, when a BWP is configured to include one or more basic bandwidths according to an embodiment of the present disclosure, one or more basic bandwidths in which a base station can transmit a PDCCH are designated, and the base station transmits a PDCCH in a CORESET configured in each of the designated basic bandwidths, according to the designated basic bandwidths, and transmits a PDSCH in the BWP.

FIG. 21 shows an operation in which, when a BWP is configured to include one or more basic bandwidths according to an embodiment of the present disclosure, one or more basic bandwidths in which a base station may transmit a PDCCH are designated, and the base station transmits a PDCCH in a CORESET configured in each of the designated basic bandwidths, according to the designated basic bandwidths, and transmits a PDSCH in the BWP.

One or more basic bandwidths in which the base station may transmit a PDCCH may be designated within a BWP. The base station may transmit a PDCCH to the terminal on the basis of a result of channel access in the designated basic bandwidths. The base station may configure a CORESET in each of the designated basic bandwidths. In another detailed embodiment, the base station may designate one or more basic bandwidths, in which a PDCCH may be transmitted, among basic bandwidths in which CORESETs are configured. In addition, as described above, the bandwidths of the CORESETs may be configured within basic bandwidths, respectively. Moreover, all the priorities of designated basic bandwidths for PDCCH transmission may be same. Specifically, the base station may transmit a PDCCH in one of basic bandwidths which are designated basic bandwidths and in which channel access has been successful. The base station may determine a basic bandwidth in which a PDCCH is to be transmitted, in consideration of a scheduling algorithm, etc. Moreover, basic bandwidths in which a PDSCH may be scheduled through a PDCCH of a designated basic bandwidth may not be adjacent to each other and may be disjointed from each other. In the embodiment shown in FIG. 21, the first basic bandwidth (1st LBT unit) and the third basic bandwidth (3rd LBT unit) are designated as basic bandwidths in which a PDCCH may be transmitted. In the embodiment shown in FIG. 21, when the base station has successfully accessed a channel in the first basic bandwidth (1st LBT unit) and the third basic bandwidth (3rd LBT unit), the base station may transmit a PDCCH in one of the first basic bandwidth (1st LBT unit) and the third basic bandwidth (3rd LBT unit).

The terminal may monitor a PDCCH in all designated basic bandwidths. When the terminal has successfully received a PDCCH in one designated basic bandwidth, monitoring a PDCCH in the remaining designated basic bandwidths may be omitted. Specifically, when the terminal receives a PDCCH scheduling a PDCSH in one basic bandwidth, monitoring of a PDCCH scheduling a PDSCH may be omitted in the remaining designated basic bandwidths.

In addition, a PDCCH may schedule a PDCSH transmitted in a designated basic bandwidth in which the base station has succeeded in channel access. A PDCCH may schedule a PDCSH transmitted in basic bandwidths other than a designated basic bandwidth, as well as a PDCSH transmitted in the designated basic bandwidth. The terminal may receive a PDSCH on the basis of PDSCH scheduling information included in a received PDCCH.

In addition, the base station may determine a basic bandwidth in which a PDSCH is to be transmitted, by combining a result of channel access in the designated basic bandwidths, and a result of channel access in other basic bandwidths of a corresponding BWP. In a detailed embodiment, when the base station has also successfully accessed a channel in a basic bandwidth adjacent to a designated basic bandwidth, the base station may transmit a PDSCH on the basis of the designated basic bandwidth, and the basic bandwidth, in which the base station has succeeded in channel access and which is adjacent to the designated basic bandwidth. The base station may transmit a PDSCH through a bandwidth having a size obtained by multiplying a basic bandwidth by a power of 2 (e.g., 20 MHz*$2^L$, wherein L={0, 1, 2, 3, ..., X} and X is a natural number). Each of the LBT units shown in FIG. 21 indicates a basic bandwidth. As described above, in the embodiment shown in FIG. 21, two basic bandwidths (1st LBT unit and 3rd LBT unit) are designated as basic bandwidths in which a PDCCH may be transmitted. In addition, in the embodiment shown in FIG. 21, the base station transmits a PDSCH through a bandwidth having a size obtained by multiplying a basic bandwidth by a power of 2. Case 1 shows an instance where the base station has successfully accessed a channel in the first basic bandwidth (1st LBT unit), which is a designated basic bandwidth, and has failed to access a channel in the second basic bandwidth (2nd LBT unit). In case 1, the base station is allowed to transmit a PDSCH through one basic bandwidth (1st LBT unit). Case 2 shows an instance where the base station has successfully accessed a channel in the first basic bandwidth (1st LBT unit), which is a designated basic bandwidth, and the second basic bandwidth (2nd LBT unit), and has failed to access a channel in at least one of the third basic bandwidth (3rd LBT unit) and the fourth basic bandwidth (4th LBT unit). In case 2, the base station is allowed to transmit a PDSCH through two basic bandwidths (1st LBT unit and 2nd LBT unit). Case 3 shows an instance where the base station has successfully accessed a channel in the third basic bandwidth (3rd LBT unit), which is a designated basic bandwidth, and has failed to access a channel in the first basic bandwidth (1st LBT unit), which is a designated basic bandwidth, and the fourth basic bandwidth (4th LBT unit). In case 3, the base station is allowed to transmit a PDSCH through one basic bandwidth (3rd LBT unit). Case 4 shows an instance where the base station has successfully accessed a channel in the third basic bandwidth (3rd LBT unit), which is a designated basic bandwidth, and all the basic bandwidths after the third basic bandwidth (3rd LBT unit), and has failed to access a channel in the first basic bandwidth (1st LBT unit), which is a designated basic bandwidth. In case 4, the base station is allowed to transmit a PDSCH through (N−2) number of basic bandwidths (3rd LBT unit, . . . Nth LBT unit). Number (N−2) is equal to a power of 2.

The base station may configure scheduling information of a PDCSH on the basis of an active BWP. The terminal may determine that an RA field, which is a resource allocation (RA) field of DCI of a PDCCH scheduling a PDSCH, assigns a resource on the basis of an active BWP. The terminal may receive a PDSCH on the basis of the above determination. The base station may determine a combination of basic bandwidths transmitting a PDSCH, according to whether there is a channel success in each of multiple basic bandwidths included in a BWP, as in the embodiments described above. Accordingly, the base station is required to make a final decision on an RA field value of DCI after performing a channel access. In addition, the base station is required to make a final decision on the size of a resource in which a PDSCH is to be transmitted, after performing a channel access. Accordingly, the complexity of an operation in which a base station schedules a PDSCH transmission and configures a PDCCH may be increased. Therefore, a method for indicating a resource used for a PDSCH transmission in a PDCCH is required.

The base station may configure an RA field of DCI, to be divided into a first field indicating a basic bandwidth including a resource assigned for PDSCH transmission, and a second field indicating the resource assigned for PDSCH transmission within the basic bandwidth indicated by the first field. Specifically, the first field may indicate a basic bandwidth index or a combination of basic bandwidth indexes, which identifies a basic bandwidth(s) including a resource assigned for PDSCH transmission. In addition, the base station may configure a value of a RA field of DCI such that the RA field indicates a basic bandwidth index or a combination of basic bandwidth indexes as well as a resource assigned for PDSCH transmission within a basic bandwidth(s). Specifically, the terminal may determine a resource assigned for PDSCH transmission on the basis of the position of a basic bandwidth in which a PDSCH is transmitted, and a value of an RA field, which are included in a PDCCH. For example, according to the embodiments shown in FIGS. 19-(*a*), 20-(*a*), and 21, when a PDCCH is transmitted in a unit bandwidth (primary LBT unit) having the highest priority, the RA field may indicate a frequency resource (e.g., case 1, case 2, case 3, and case 4) including a unit bandwidth (primary LBT unit) having the highest priority. When a PDCCH is transmitted in a unit bandwidth (secondary LBT unit) having the second highest priority, the RA field may indicate a frequency resource (e.g., case 5, case 6, and case 7) including a unit bandwidth (secondary LBT unit) having the second highest priority.

The base station may transmit a PDCCH in one BWP, and schedule a PDSCH transmitted in a BWP differing from the BWP in which the PDCCH is transmitted, by using the PDCCH. This scheduling is called BWP switching. In a case where BWP switching occurs as described above, the terminal may require a time for retuning into a BWP in which a PDSCH is transmitted from the base station, in order to receive the PDSCH according to BWP switching. Specifically, BWP switching may include cases where the center frequency of a BWP is changed, the frequency band of a BWP is changed, and the bandwidth of a BWP is changed. According to the specific situations, the terminal may require a time gap of several hundred μs. In a case where a PDSCH is transmitted in a licensed band, the base station may schedule a PDSCH transmission securing a time gap described above. However, considering that an apparatus using an unlicensed band like a Wi-Fi apparatus performs CCA in a unit of intervals, each of which is 9 μs, there is a possibility that another wireless communication apparatus uses a frequency resource corresponding to a switched BWP during a time gap occurring at the time of BWP switching in a case where a PDSCH is transmitted in an unlicensed band. Therefore, at the time of BWP switching, the base station may transmit a reservation signal in a changed BWP. Specifically, at the time of BWP switching, the base station may transmit a reservation signal to a frequency resource in which a PDSCH is to be transmitted, in a changed BWP. In a detailed embodiment, the base station may transmit a reservation signal to a frequency resource in which a PDSCH is to be transmitted, in a changed BWP during a time gap for BWP changing on the basis of a time domain resource allocation (TDRA) of the PDSCH, which is scheduled in the changed BWP at the time of BWP switching. The BWP changing may include at least one of changing the center frequency of a BWP, changing the frequency band of a BWP, and changing the bandwidth of a BWP. The base station may generate a reservation signal by extending the CP of an OFDM symbol for a PDSCH which the base station is to transmit.

Hereinafter, the present specification provides a downlink control channel and data channel reception method and an uplink control channel and data channel transmission method, which allow a bandwidth part (BWP)-based operation in one carrier for NR-U. The present specification provides a downlink control channel and data channel reception method and an uplink control channel and data channel transmission method, which are performed in a BWP configured by one or more listen-before-talk (LBT) bandwidths existing in one carrier. An example of a method proposed in the present specification relates to a method for, when a base station performs downlink channel transmission to a terminal in a BWP configured by two or more LBT bandwidths (or LBT subbands) existing in one carrier, allocating a resource for transmission of a downlink control channel and a resource for transmission of a downlink data channel according to a configuration of an in-carrier guard band, and indicating information relating to the resource allocations. In addition, the method relates to a method by which a terminal receives a downlink control channel and a downlink data channel on a resource assigned from a base station. In addition, a method proposed in the present specification relates to a method for, when a terminal performs uplink channel transmission to a base station, allocating a resource for transmission of an uplink control channel and an uplink data channel according to a configuration of an in-carrier guard band and indicating information relating to the resource allocation. In addition, the method relates to a method by which a terminal transmits an uplink control channel and an uplink data channel in a resource scheduled (allocated) from a base station.

Figure 22:
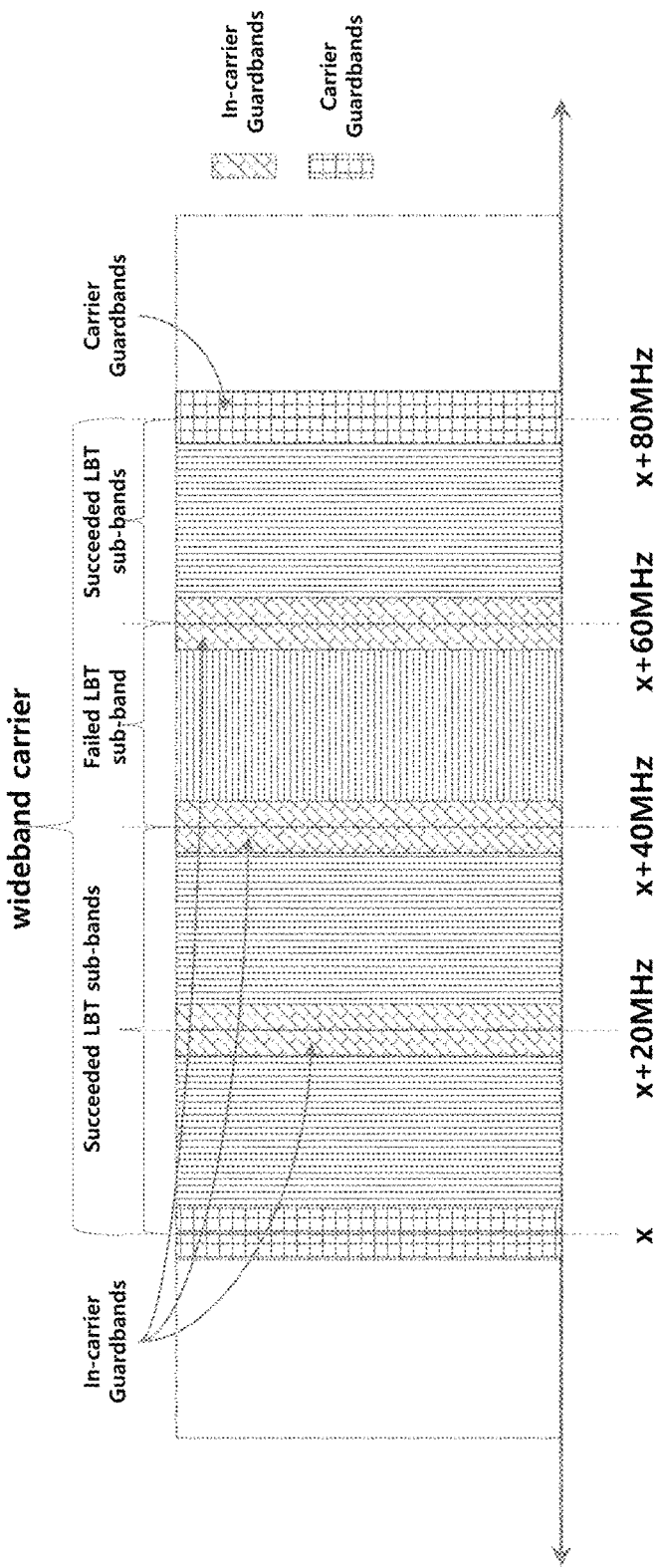
FIG. 22 is a diagram illustrating in-carrier guard bands and carrier guard bands in a BWP configured by one or more LBT subbands in a wideband carrier.

FIG. 22 is a diagram illustrating in-carrier guard bands and carrier guard bands in a BWP configured by one or more LBT subbands in a wideband carrier according to an embodiment of the present specification.

An in-carrier guard band and a carrier guard band according to an embodiment of the present specification will be described with reference to FIG. 22. An in-carrier guard band may be a guard band positioned between predetermined bandwidths according to a pre-configured criteria in one BWP positioned in one carrier. For example, an in-carrier guard band may indicate a guard band positioned at 20 MHz intervals in one BWP in one carrier having a bandwidth of 80 MHz. A carrier guard band may indicate a guard band positioned at both ends of a wideband carrier. A carrier guard band may be configured to be unable to be allocated as a resource for channel transmission. Meanwhile, an in-carrier guard band may be configured to be allocated as a resource for channel transmission. If a base station allocates an in-carrier guard band as a resource for channel transmission, the base station is required to notify a terminal that the resource is available for channel transmission. A channel described in the present specification may have a meaning including a control channel and a data channel, and a channel transmission may have the same meaning as that of a data transmission.

Figure 23:
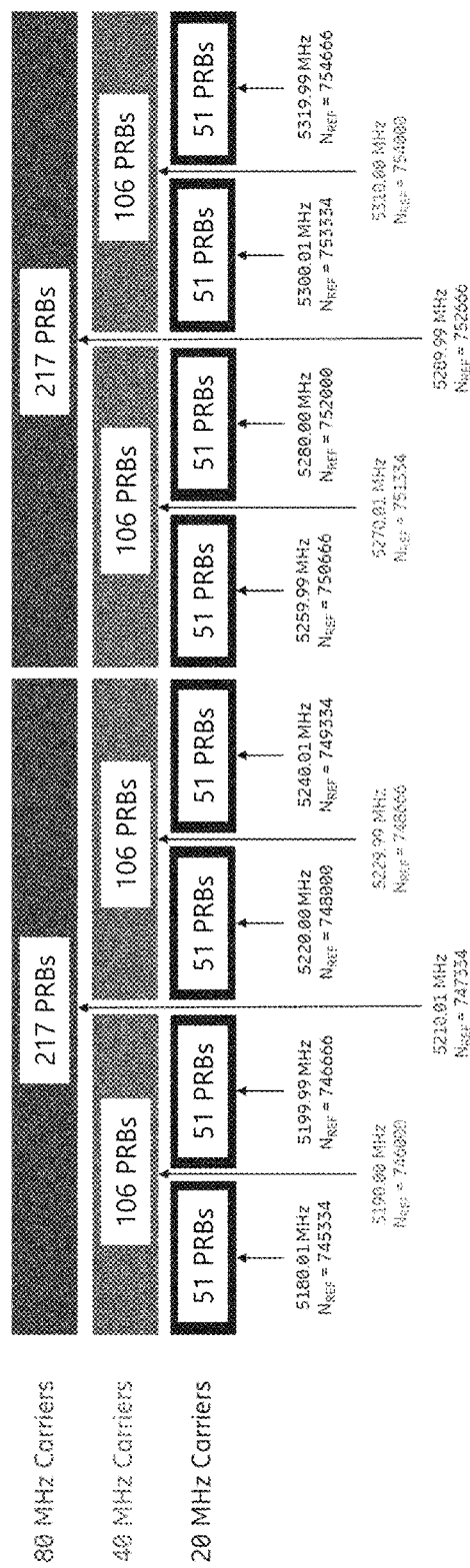
FIG. 23 illustrates one embodiment of the number of physical resource blocks (RBs) which can be continuously used when a BWP having a bandwidth of 20 MHz, 40 MHz, or 80 MHz is used.

FIG. 23 is a diagram illustrating the number of physical resource blocks (PRBs) which may be continuously used in a BWP having a bandwidth of 20 MHz, 40 MHz, or 80 MHz according to an embodiment of the present specification.

Figure 24:
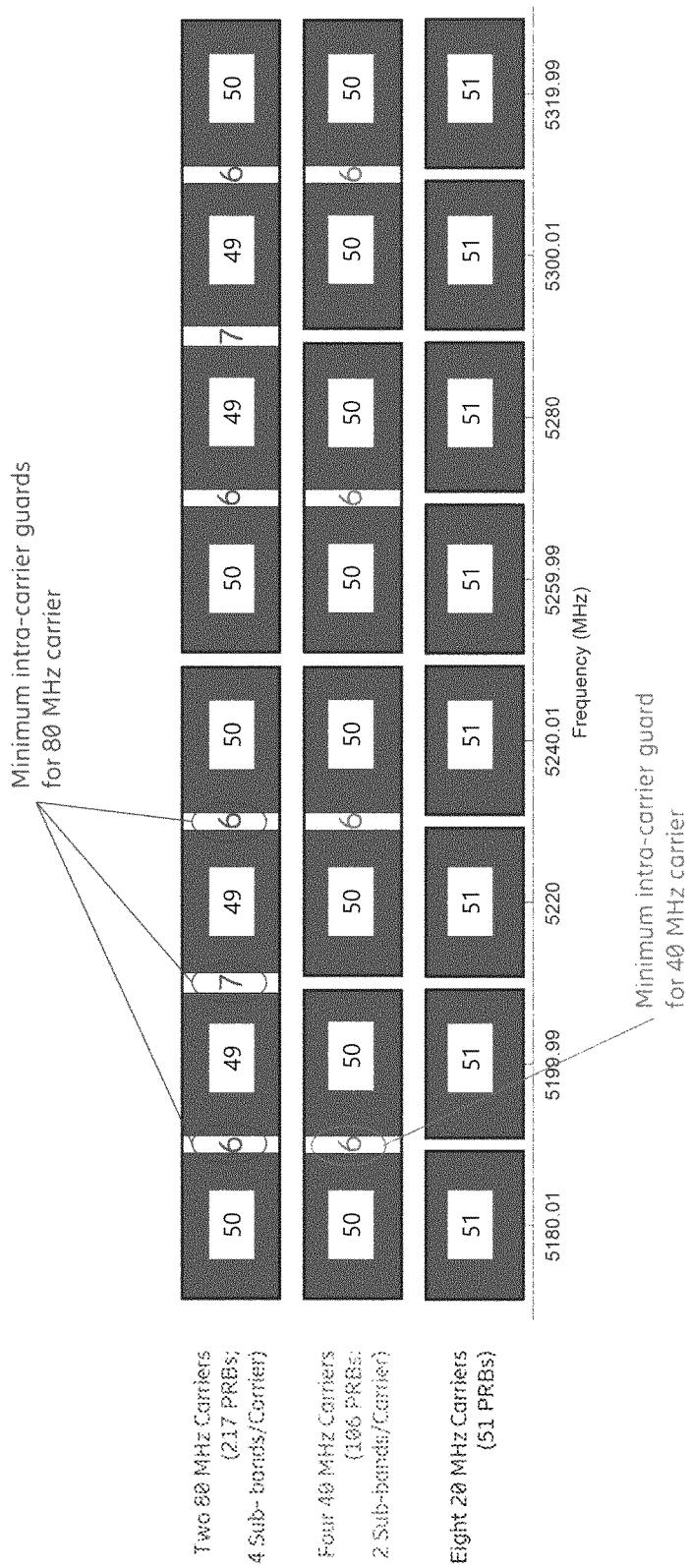
FIG. 24 illustrates one embodiment of the number of physical resource RBs which can be continuously used as an in-carrier guard band when a BWP having a bandwidth of 20 MHz, 40 MHz, or 80 MHz is used, and illustrates one embodiment of the number of physical resource RBs which can be used for each LBT subband according to a BWP having a bandwidth of 20 MHz, 40 MHz, or 80 MHz.

FIG. 24 is a diagram illustrating the number of physical RBs which may be used as an in-carrier guard band in a BWP having a bandwidth of 20 MHz, 40 MHz, or 80 MHz according to an embodiment of the present specification.

Referring to FIG. 24, in a BWP having a bandwidth of 20 MHz, one subband may be configured by 51 PRBs. In a BWP having a bandwidth of 40 MHz, one subband may be configured by 50 PRBs, and an in-carrier guard band between two adjacent subbands may be configured by six PRBs. In a BWP having a bandwidth of 80 MHz, one subband may be configured by 49 or 50 PRBs, and an in-carrier guard band between two adjacent subbands may be configured by six or seven PRBs.

Referring to FIG. 23, the number of subbands that are consecutively usable in a BWP having a bandwidth of 20 MHz is one, and 51 PRBs may be used as the subband. The number of subbands that are consecutively usable in a BWP having a bandwidth of 40 MHz is two, and 106 (50+6+50, see FIG. 24) PRBs may be used as each of the subbands. The number of subbands that are consecutively usable in a BWP having a bandwidth of 80 MHz is four, and 217 (50+6+49+7+49+6+50, see FIG. 24) PRBs may be used as each of the subbands.

In addition, FIG. 24 is a diagram illustrating the number of physical RBs which may be used for each LBT subband in a BWP having a bandwidth of 20 MHz, 40 MHz, or 80 MHz according to an embodiment of the present specification. An intra-carrier guard illustrated in FIG. 24 may have the same meaning as that an in-carrier guard band described above.

When a downlink control channel is received, a terminal may be unable to recognize whether an in-carrier guard band has been allocated as a resource for transmission of the control channel from a base station. Meanwhile, the terminal may receive, by using a bitmap, an indication of an LBT (available LBT) subband which is available for channel transmission, through a group-common (GC)-PDCCH from the base station. However, the terminal is unable to determine whether an in-carrier guard band has been allocated as a resource for transmission of a control channel and a data channel, before the terminal receives an indication of an available LBT subband through a GC-PDCCH from the base station. Therefore, in a case where the base station is to transmit a downlink control channel, that is, a PDCCH to the terminal, the base station may allow the terminal to configure a control resource set (CORESET) in a resource except for an in-carrier guard band. The base station may transmit a PDCCH to the terminal on the CORESET resource. That is, a CORESET may be assigned in an available LBT subband, and in addition, may be assigned to a frequency resource except for an in-carrier guard band in the available LBT subband. The base station may configure the terminal to monitor a PDCCH on a CORESET configured by a resource except for an in-carrier guard band. The terminal may monitor a PDCCH on a CORESET resource configured by a resource except for an in-carrier guard band, configured by the base station, and may perform blind detection of a PDCCH.

Meanwhile, the base station may indicate, to the terminal, an available LBT subband through a GC-PDCCH at a time point rather than a DL burst starting time point by using a bitmap. If the terminal receives a GC-PDCCH, there may be no ambiguity between the terminal and the base station, relating to whether an in-carrier guard band is allocated as a resource for channel transmission. However, in a case where, although the base station indicates the availability of consecutive LBT subbands for channel transmission through a GC-PDCCH, the terminal has failed the detection of the GC-PDCCH, the terminal is unable to know whether an in-carrier guard band is available as a resource for channel transmission. Therefore, even if the base station configures an in-carrier guard band to be available as a resource for channel transmission through a GC-PDCCH, the terminal may fail to recognize the configuration. Therefore, there may be ambiguity between the terminal and the base station, relating to a resource allocation for an in-carrier guard band (whether the in-carrier guard band is used for channel transmission).

In other words, the base station may consider whether an in-carrier guard band may be used for channel transmission, and allocate a resource (e.g. a CORESET) for channel transmission, which allows the terminal to monitor a PDCCH. That is, when an in-carrier guard band is not allowed to be used for channel transmission, a resource for channel transmission may be configured on a subband within a BWP, which is identified by an in-carrier guard band. Then, the base station may instruct the terminal to perform PDCCH monitoring for receiving a PDCCH, in the resource for channel transmission. Then, the base station may transmit a PDCCH through the resource for channel transmission. Thereafter, the terminal may perform blind detection of a PDCCH in the resource for channel transmission. The base station may transmit, to the terminal, information relating to whether an in-carrier guard band has been allocated as a resource for channel transmission by considering an in-carrier guard band to be available as a resource for channel transmission. Then, the base station may indicate whether each of subbands in a BWP, which are identified by an in-carrier guard band, is used for downlink channel transmission. The information relating to whether an in-carrier guard band has been allocated as a resource for channel transmission by considering an in-carrier guard band to be available as a resource for channel transmission, and whether each of subbands is used for downlink channel transmission may be indicated by a bitmap type.

Therefore, the present specification proposes a method for indicating, by a base station, whether an in-carrier guard band is available as a resource for channel transmission. Specifically, the present specification proposes a method for indicating through downlink control information (DCI) signaling, which is a dynamic scheduling method.

In a case of downlink transmission, a base station may perform a channel access in units of LBT bandwidths in a BWP configured by two or more LBT bandwidths (or LBT subbands). According to whether an in-carrier guard band is available as a resource for channel transmission, whether consecutive LBT subbands in a BWP are available for channel transmission may be determined. Therefore, when the base station succeeds in a channel access, the base station is required to indicate, to a terminal, whether a resource allocation has been performed by considering an in-carrier guard band to be available as a resource for channel transmission, or a resource allocation has been performed by considering an in-carrier guard band to be unavailable as a resource for channel transmission.

The terminal may receive frequency domain resource allocation (FDRA) information through DCI from the base station. However, the terminal is unable to know a result of a channel access performed by the base station in a downlink BWP configured by two or more LBT bandwidths (or LBT subbands), which is configured by the base station for the terminal. Therefore, when consecutive LBT subbands in a BWP are available for channel transmission, the terminal is unable to know whether the base station has performed a downlink resource allocation by considering an in-carrier guard band to be available as a resource for channel transmission, or has performed a resource allocation for downlink transmission on the basis of a resource except for an in-carrier guard band. Therefore, the base station may transmit, to the terminal, signaling indicating whether a resource allocation for downlink transmission has been performed by considering an in-carrier guard band to be available as a resource for channel transmission. When the signaling is received by the terminal, there may be no ambiguity relating to whether an in-carrier guard band is allocated as a resource for channel transmission, when a frequency resource is allocated for a downlink transmission between the terminal and the base station. The terminal may receive a PDSCH, from the base station, on the basis of frequency domain resource allocation information for downlink transmission, which is transmitted through DCI.

When the base station performs a resource allocation to the terminal for a downlink channel transmission, the base station is required to indicate whether the resource allocation has been performed by considering an in-carrier guard band to be available as a resource for channel transmission, or the resource allocation has been performed by considering an in-carrier guard band to be unavailable as a resource for channel transmission. The indication method may be as follows.

(Method 1)

Method 1 is a method for performing, by a base station to a terminal and through an RRC configuration, signaling relating to whether an in-carrier guard band is able to be allocated as a resource for channel transmission.

An in-carrier guard band may be configured to be unallocable as a resource for data channel transmission, through an RRC configuration. The base station may allocate a frequency resource except for an in-carrier guard band as a resource for a data channel. The terminal may assume that a frequency resource except for an in-carrier guard band is allocated for data channel transmission. The terminal may receive a data channel by interpreting pieces of frequency domain resource allocation information for the data channel.

On the contrary, an in-carrier guard band may be configured to be allocable as a resource for channel transmission, through an RRC configuration. The base station may determine whether an in-carrier guard band is available as a resource for channel transmission. Specifically, the base station may determine whether to use, as a resource for channel transmission, an RB in which an actual in-carrier guard band is positioned, according to a result of a channel access to consecutive LBT subbands. Therefore, a method of indicating, by the base station through DCI, whether an RB in which an actual in-carrier guard band is positioned is used as a resource for channel transmission may be considered. That is, the terminal may assume that a frequency resource including an in-carrier guard band is allocable for channel transmission. Whether an RB in which an actual in-carrier guard band is positioned is used as a resource for channel transmission may be indicated to the terminal from DCI. The terminal may receive a data channel by interpreting pieces of frequency domain resource allocation information for the data channel through the indicated information.

The above RRC configuration may be commonly applied to both downlink channel transmission and uplink channel transmission. Specifically, whether an in-carrier guard band is allocable as a resource for channel transmission may be configured through an RRC configuration identically for both downlink channel transmission and uplink channel transmission.

On the other hand, a configuration may be applied through independent RRC configurations for downlink channel transmission and uplink channel transmission. Alternatively, a configuration through an RRC configuration may be applied to only downlink channel transmission.

In a case of uplink channel transmission, a resource scheduled for the terminal is a resource allocated to consecutive LBT subbands, and all the consecutive LBT subbands may succeed in a channel access. The terminal may perform uplink channel transmission in the scheduled resource allocated to consecutive LBT subbands. If the base station schedules the resource allocated to consecutive LBT subbands, there is no need to indicate, to the terminal, whether an in-carrier guard band is allocable as a resource for channel transmission. This is because the base station may perform a resource allocation for DCI to the terminal by considering whether an in-carrier guard band is used for channel transmission. Therefore, in a case where the terminal succeeds in a channel access in consecutive LBT subbands, the terminal is expected to transmit an uplink channel to the base station through the scheduled resource of the consecutive LBT subbands including an in-carrier guard band, therefore, there is no ambiguity between the terminal and the base station, relating to an in-carrier guard band. Therefore, in a case of uplink transmission, there may be no required RRC configuration that configures whether an in-carrier guard band is allocable as a resource for channel transmission.

However, in a case of downlink transmission, even if not all consecutive LBT subbands succeed in a channel access, a downlink transmission is possible through a part of the LBT subbands, which has succeeded in the channel access. Therefore, an RRC configuration indicating whether an in-carrier guard band is allocable as a resource for downlink channel transmission may be required. Similarly to a case of downlink transmission, also in a case of uplink channel transmission, if a scheduled resource is a resource allocated to consecutive LBT subbands, and not all the consecutive LBT subbands succeed in a channel access, an uplink channel may be possible in a part of the LBT subbands, which has succeeded. In this case, even in a case of uplink channel transmission, an RRC configuration indicating whether an in-carrier guard band is allocable as a resource for uplink transmission may be required.

(Method 2)

Method 2 is a method employing dynamic signaling and, particularly, is a method for signaling, by a base station through DCI, whether an in-carrier guard band is allocable as a resource for channel transmission.

a) as an explicit signaling method, the base station may indicate whether an in-carrier guard band is included in a resource for receiving a PDSCH, through a field having one bit included in DCI scheduling a PDSCH. Specifically, the base station may indicate information relating to that all RBs in which an in-carrier guard band is positioned are included in a resource scheduling a PDSCH, through DCI indicating scheduling of the PDSCH. A terminal may receive the DCI, interpret frequency domain resource allocation (FDRA) information indicated from the DCI, and finally identify frequency domain resource allocation information by which a PDSCH is transmitted.

b) as an implicit signaling method, the base station may notify the terminal of frequency domain resource allocation information assigned for PDSCH transmission according to a result of a channel access performed by the base station. Specifically, the base station may separately indicate an LBT subband allocated for PDSCH transmission to the terminal. Alternatively, the base station may transmit frequency domain resource allocation information jointly coded with DCI including information of an LBT subband. When the base station transmits frequency domain resource allocation information to the terminal, the terminal may determine that the allocation is a resource allocation for consecutive LBT subbands, by using the information. The terminal may determine that the base station has performed a resource allocation for PDSCH transmission by considering that an in-carrier guard band is available for channel transmission. Meanwhile, when the base station transmits frequency domain resource allocation information to the terminal, the terminal may determine that the allocation is not a resource allocation for consecutive LBT subbands, by using the information. When the terminal receives the frequency domain resource allocation information through DCI, the terminal may determine that the base station has performed a resource allocation for PDSCH transmission by considering that an in-carrier guard band is not available as a resource for channel transmission.

(Method 3)

A base station may indicate whether an in-carrier guard band is allocable as a resource for channel transmission, through an RRC configuration. If an in-carrier guard band is indicated to be allocable as a resource for channel transmission, the base station may include RBs used for an in-carrier guard band on the basis of a BWP configured for a terminal when the base station allocates a resource for downlink transmission. Whether RBs used for an in-carrier guard band are used for a frequency resource allocation for actual downlink transmission may be determined by an FDRA value of DCI. RB indexing is required for allocating a frequency resource for downlink transmission, which may be indicated by an FDRA value of DCI. An RB indexing method may be a method for indexing RBs used for an in-carrier guard band lastly, rather than a method for consecutively indexing RBs including RBs used for an in-carrier guard band. The reason of use of the RB indexing method is that an FDRA value of DCI may allow the base station to indicate whether an actual in-carrier guard band is available for channel transmission to the terminal, and may allow the terminal to determine whether an in-carrier guard band is used when actual resource allocation scheduling is performed. In other words, if the base station fails to successfully access a channel in consecutive LBT subbands even after indicating, to the terminal through RRC signaling, that an in-carrier guard band is allocable as a resource for channel transmission, an in-carrier guard band is not allowed to be allocated to the terminal. Since the terminal is unable to know whether the base station has succeeded in channel access, the terminal is unable to be allocated an in-carrier guard band in order to prevent the terminal from interpreting FDRA in different ways according to whether the base station has succeeded in channel access. For example, as illustrated in two LBT subbands of a 40 MHz carrier in FIG. 24, the first LBT subband may be configured by 50 RBs, the second LBT subband may be configured by 50 RBs, and an in-carrier guard band may be configured by six RBs. The 50 RBs included in the first LBT subband and the 50 RBs included in the second LBT subband may be indexed from index number 0 to 99, and the six RBs included in the in-carrier guard band may be indexed from index number 100 to 105. As a method for allocating a resource for downlink transmission by the base station, there are two methods including a method for transmitting, to a terminal, the starting position of an RB and the length of the RB by using a resource indication value (RIV) field of DCI, and allocating a resource for PDSCH transmission, and a method for binding one or more RBs to configure RB groups (RBGs) and informing of the position of an allocated resource by using a bitmap. In the methods, regardless of whether the base station has succeeded in a channel access, the base station may separately transmit, to the terminal, information (FDRA information) relating to that RBs included in an in-carrier guard band have been allocated as a resource for PDSCH transmission. The terminal may receive a PDSCH by commonly interpreting the FDRA information regardless of whether the base station has succeeded in a channel access, by using the indexing method described above.

Figure 25:
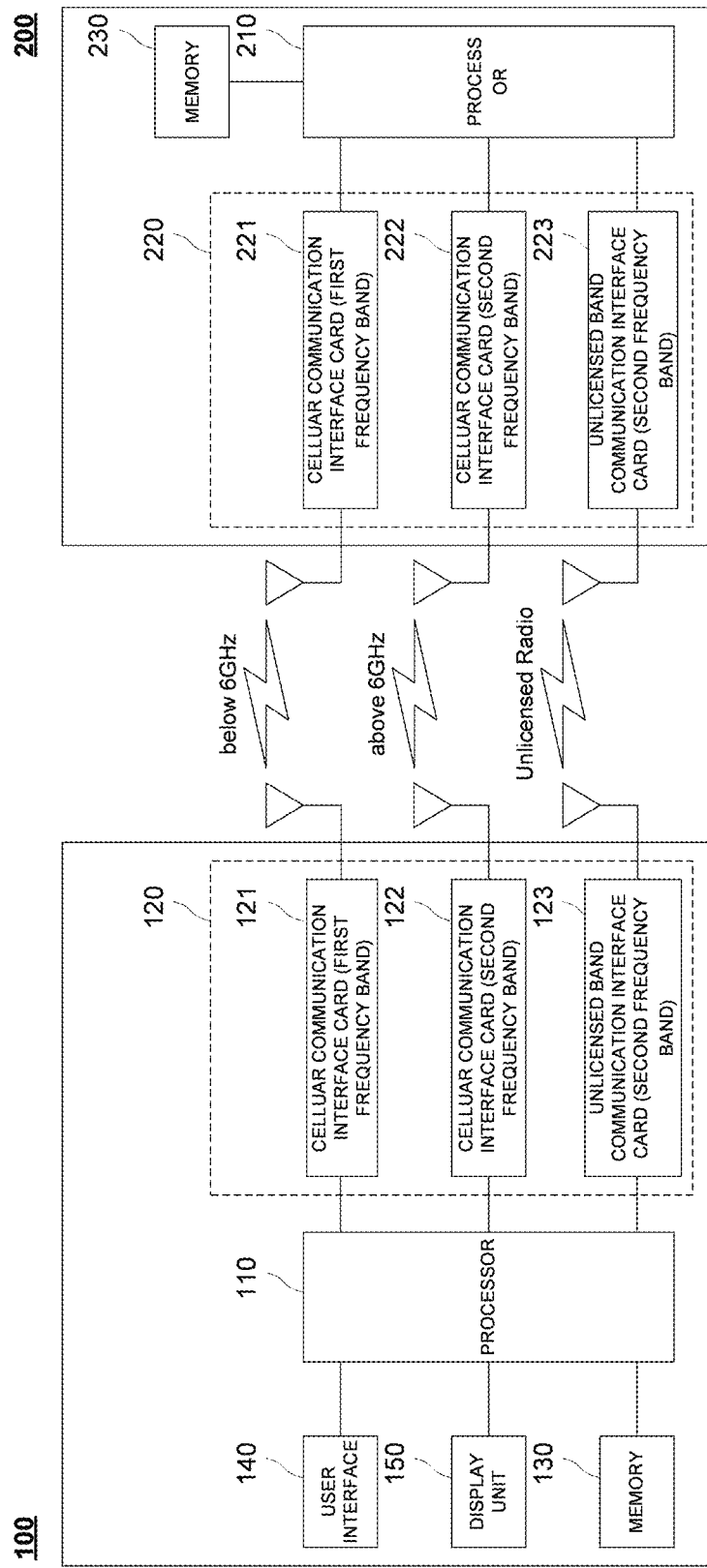
FIG. 25 illustrates a block diagram illustrating a configuration of a terminal and a base station according to an embodiment of the present disclosure.

FIG. 25 is a block diagram showing the configurations of a UE and a base station according to an embodiment of the present invention. In an embodiment of the present invention, the UE may be implemented with various types of wireless communication devices or computing devices that are guaranteed to be portable and mobile. The UE may be referred to as a User Equipment (UE), a Station (STA), a Mobile Subscriber (MS), or the like. In addition, in an embodiment of the present invention, the base station controls and manages a cell (e.g., a macro cell, a femto cell, a pico cell, etc.) corresponding to a service area, and performs functions of a signal transmission, a channel designation, a channel monitoring, a self diagnosis, a relay, or the like. The base station may be referred to as next Generation NodeB (gNB) or Access Point (AP).

As shown in the drawing, a UE 100 according to an embodiment of the present disclosure may include a processor 110, a communication module 120, a memory 130, a user interface 140, and a display unit 150.

First, the processor 110 may execute various instructions or programs and process data within the UE 100. In addition, the processor 110 may control the entire operation including each unit of the UE 100, and may control the transmission/reception of data between the units. Here, the processor 110 may be configured to perform an operation according to the embodiments described in the present invention. For example, the processor 110 may receive slot configuration information, determine a slot configuration based on the slot configuration information, and perform communication according to the determined slot configuration.

Next, the communication module 120 may be an integrated module that performs wireless communication using a wireless communication network and a wireless LAN access using a wireless LAN. For this, the communication module 120 may include a plurality of network interface cards (NICs) such as cellular communication interface cards 121 and 122 and an unlicensed band communication interface card 123 in an internal or external form. In the drawing, the communication module 120 is shown as an integral integration module, but unlike the drawing, each network interface card may be independently arranged according to a circuit configuration or usage.

The cellular communication interface card 121 may transmit or receive a radio signal with at least one of the base station 200, an external device, and a server by using a mobile communication network and provide a cellular communication service in a first frequency band based on the instructions from the processor 110. According to an embodiment, the cellular communication interface card 121 may include at least one NIC module using a frequency band of less than 6 GHz. At least one NIC module of the cellular communication interface card 121 may independently perform cellular communication with at least one of the base station 200, an external device, and a server in accordance with cellular communication standards or protocols in the frequency bands below 6 GHz supported by the corresponding NIC module.

The cellular communication interface card 122 may transmit or receive a radio signal with at least one of the base station 200, an external device, and a server by using a mobile communication network and provide a cellular communication service in a second frequency band based on the instructions from the processor 110. According to an embodiment, the cellular communication interface card 122 may include at least one NIC module using a frequency band of more than 6 GHz. At least one NIC module of the cellular communication interface card 122 may independently perform cellular communication with at least one of the base station 200, an external device, and a server in accordance with cellular communication standards or protocols in the frequency bands of 6 GHz or more supported by the corresponding NIC module.

The unlicensed band communication interface card 123 transmits or receives a radio signal with at least one of the base station 200, an external device, and a server by using a third frequency band which is an unlicensed band, and provides an unlicensed band communication service based on the instructions from the processor 110. The unlicensed band communication interface card 123 may include at least one NIC module using an unlicensed band. For example, the unlicensed band may be a band of 2.4 GHz or 5 GHz. At least one NIC module of the unlicensed band communication interface card 123 may independently or dependently perform wireless communication with at least one of the base station 200, an external device, and a server according to the unlicensed band communication standard or protocol of the frequency band supported by the corresponding NIC module.

The memory 130 stores a control program used in the UE 100 and various kinds of data therefor. Such a control program may include a prescribed program required for performing wireless communication with at least one among the base station 200, an external device, and a server.

Next, the user interface 140 includes various kinds of input/output means provided in the UE 100. In other words, the user interface 140 may receive a user input using various input means, and the processor 110 may control the UE 100 based on the received user input. In addition, the user interface 140 may perform an output based on instructions from the processor 110 using various kinds of output means.

Next, the display unit 150 outputs various images on a display screen. The display unit 150 may output various display objects such as content executed by the processor 110 or a user interface based on control instructions from the processor 110.

In addition, the base station 200 according to an embodiment of the present invention may include a processor 210, a communication module 220, and a memory 230.

First, the processor 210 may execute various instructions or programs, and process internal data of the base station 200. In addition, the processor 210 may control the entire operations of units in the base station 200, and control data transmission and reception between the units. Here, the processor 210 may be configured to perform operations according to embodiments described in the present invention. For example, the processor 210 may signal slot configuration and perform communication according to the signaled slot configuration.

Next, the communication module 220 may be an integrated module that performs wireless communication using a wireless communication network and a wireless LAN access using a wireless LAN. For this, the communication module 220 may include a plurality of network interface cards such as cellular communication interface cards 221 and 222 and an unlicensed band communication interface card 223 in an internal or external form. In the drawing, the communication module 220 is shown as an integral integration module, but unlike the drawing, each network interface card can be independently arranged according to a circuit configuration or usage.

The cellular communication interface card 221 may transmit or receive a radio signal with at least one of the UE 100, an external device, and a server by using a mobile communication network and provide a cellular communication service in the first frequency band based on the instructions from the processor 210. According to an embodiment, the cellular communication interface card 221 may include at least one NIC module using a frequency band of less than 6 GHz. The at least one NIC module of the cellular communication interface card 221 may independently perform cellular communication with at least one of the UE 100, an external device, and a server in accordance with the cellular communication standards or protocols in the frequency bands less than 6 GHz supported by the corresponding NIC module.

The cellular communication interface card 222 may transmit or receive a radio signal with at least one of the UE 100, an external device, and a server by using a mobile communication network and provide a cellular communication service in the second frequency band based on the instructions from the processor 210. According to an embodiment, the cellular communication interface card 222 may include at least one NIC module using a frequency band of 6 GHz or more. The at least one NIC module of the cellular communication interface card 222 may independently perform cellular communication with at least one of the UE 100, an external device, and a server in accordance with the cellular communication standards or protocols in the frequency bands 6 GHz or more supported by the corresponding NIC module.

The unlicensed band communication interface card 223 transmits or receives a radio signal with at least one of the UE 100, an external device, and a server by using the third frequency band which is an unlicensed band, and provides an unlicensed band communication service based on the instructions from the processor 210. The unlicensed band communication interface card 223 may include at least one NIC module using an unlicensed band. For example, the unlicensed band may be a band of 2.4 GHz or 5 GHz. At least one NIC module of the unlicensed band communication interface card 223 may independently or dependently perform wireless communication with at least one of the UE 100, an external device, and a server according to the unlicensed band communication standards or protocols of the frequency band supported by the corresponding NIC module.

FIG. 25 is a block diagram illustrating the UE 100 and the base station 200 according to an embodiment of the present invention, and blocks separately shown are logically divided elements of a device. Accordingly, the aforementioned elements of the device may be mounted in a single chip or a plurality of chips according to the design of the device. In addition, a part of the configuration of the UE 100, for example, a user interface 140, a display unit 150 and the like may be selectively provided in the UE 100. In addition, the user interface 140, the display unit 150 and the like may be additionally provided in the base station 200, if necessary.

The above embodiments of the present disclosure may be implemented through various means. For example, embodiments of the present disclosure may be implemented by hardware, firmware, software, or a combination thereof.

In a case of an implementation by hardware, a method according to embodiments of the present disclosure may be implemented by one or more of application specific integrated circuits (ASICs), digital signal processors (DSPs), digital signal processing devices (DSPDs), programmable logic devices (PLDs), field programmable gate arrays (FPGAs), a processor, a controller, a micro controller, and a micro processor.

In a case of an implementation by firmware or software, a method according to embodiments of the present disclosure may be implemented in a type of a module, a procedure, or a function for performing the functions or operations described above. A software code may be stored in a memory and operated by a processor. The memory may be disposed inside or outside the processor, and may exchange data with the processor by previously known various means.

Figure 26:
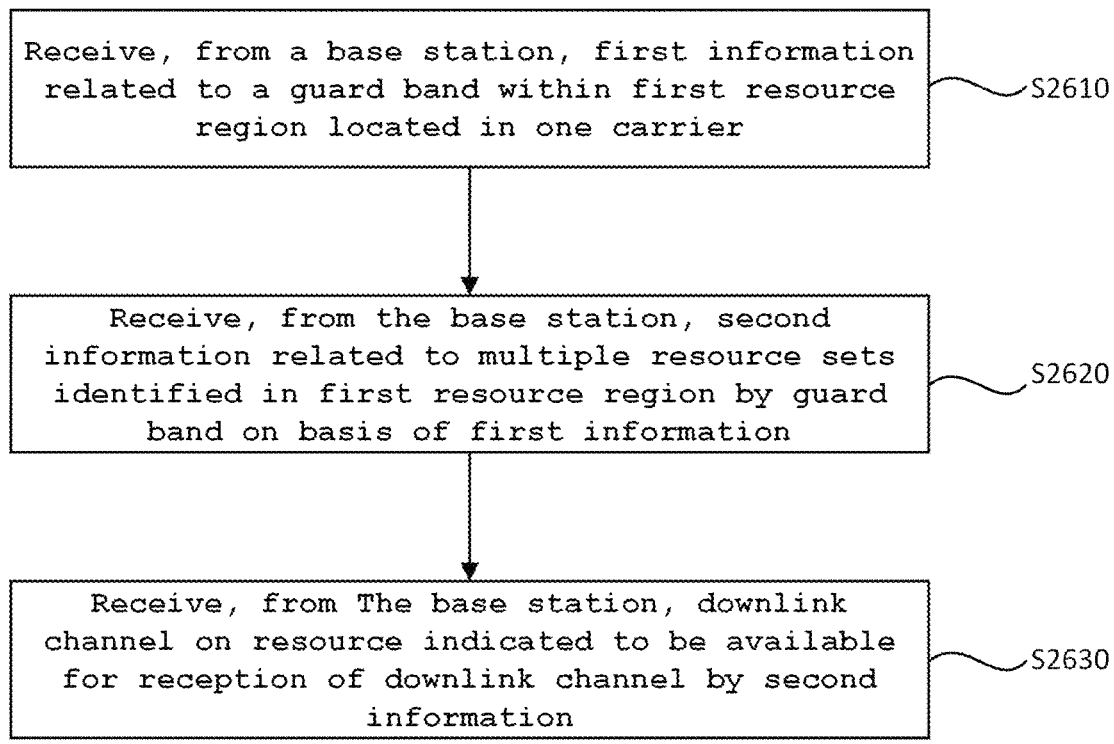
FIG. 26 is a flowchart of a method for receiving a downlink channel by a terminal according to an embodiment of the present disclosure.

FIG. 26 is a flowchart of a method for receiving a downlink channel by a terminal according to an embodiment of the present disclosure.

A method by which a terminal receives a downlink channel transmitted from a base station, as described with reference to FIGS. 1 to 25, will be described with reference to FIG. 26.

A terminal may receive first information related to a guard band within a first resource region located in one carrier from a base station (S2610).

The terminal may receive, from the base station, second information related to multiple resource sets, each of which identified by the guard band in the first resource region on the basis of the first information (S2620).

The terminal may receive, from the base station, a downlink channel on a resource indicated by the second information to be available for the reception of the downlink channel (S2630).

The multiple resource sets may be configured by resources except for a resource allocated for the guard band on the basis of the first information.

The second information may be information indicating whether each of the multiple resource sets is available for the reception of the downlink channel. The first information may be information related to whether the resource allocated for the guard band is available for the reception of the downlink channel. Operation S2620 may be performed when the resource allocated for the guard band is not used for the reception of the downlink channel according to the first information.

After operation S2610, the terminal may receive, from the base station, a physical downlink control channel (PDCCH)

on a part of the multiple resource sets. The second information may be included in downlink control information (DCI) of the PDCCH.

The DCI may be group-common DCI. In other words, the DCI may be format 2_0 DCI.

In addition, after operation S2610, the terminal may receive, from the base station, information relating to a second resource region that the terminal monitors for the PDCCH reception.

The second resource region may correspond to a part of the multiple resource sets, and the second resource region may include a resource on which the PDCCH is received.

The second resource region may include a resource to which a control resource set (CORESET) is allocated.

The second information may indicate whether each of the multiple resource sets is available for the transmission of the downlink channel, in a bitmap type.

The downlink channel of operation S2630 may be at least one of a physical downlink control channel (PDCCH) and a physical downlink shared channel (PD SCH).

The first information and the information relating to the second resource region may be transmitted through higher layer signaling (e.g. an RRC configuration).

The terminal that receives a downlink channel from the base station may be configured by including a transceiver, a processor functionally connected to the transceiver, and a memory which stores instructions for operations executed by the processor and is connected to the processor.

The operations executed by the processor may be the same as those described with reference to FIG. 26.

Some embodiments may also be implemented in the form of a recording medium including instructions executable by a computer, such as a program module executed by a computer. A computer-readable medium may be any available medium that is accessible by a computer, and includes both volatile and nonvolatile media, removable and non-removable media. Further, the computer-readable medium may include both computer storage media and communication media. The computer storage medium includes both volatile and nonvolatile, removable and non-removable media implemented in any method or technology for storage of information such as computer readable instructions, data structures, program modules or other data. The communication media typically include computer readable instructions, data structures, other data in a modulated data signal such as program modules, or other transmission mechanisms, and include any information delivery media.

The description of the present invention described above is only exemplary, and it will be understood by those skilled in the art to which the present invention pertains that various modifications and changes can be made without changing the technical spirit or essential features of the present invention. Therefore, it should be construed that the embodiments described above are illustrative and not restrictive in all respects. For example, each component described as a single type may be implemented in a distributed manner, and similarly, components described as being distributed may also be implemented in a combined form.

The scope of the present invention is indicated by the attached claims rather than the detailed description, and it should be construed that all changes or modifications derived from the meaning and scope of the claims and their equivalents are included in the scope of the present invention.

The invention claimed is:

1. A terminal configured to operate in a wireless communication system, the terminal comprising:
a transceiver;
a processor functionally connected to the transceiver, wherein the processor is configured to:
receive configuration information that is related to a guard-band for an uplink carrier and for a downlink carrier,
receive a first downlink control information (DCI) including a bitmap,
wherein each bit of the bitmap indicates whether each sub-band of a first group comprising one or more sub-bands in the downlink carrier is available for reception of a downlink channel,
receive a second DCI including scheduling information for transmission of the an uplink channel,
receive the downlink channel based on the first DCI,
transmit the uplink channel based on the second DCI,
wherein the downlink channel is received on a first resource,
wherein the first resource includes at least one sub-band of the first group indicated by the bitmap to be available for reception of the downlink channel, and the first resource does not include a resource for a first guard-band allocated based on the configuration information,
wherein the uplink channel is transmitted on a second resource,
wherein when the second resource includes a plurality of sub-bands of a second group of sub-bands in the uplink carrier, the second resource includes a resource for a second guard-band allocated based on the configuration information,
wherein the first guard-band and the second guard-band are each located between adjacent sub-bands in a frequency domain.

2. The terminal as claimed in 1,
wherein when the uplink channel is scheduled to be transmitted only on one sub-band, the second resource does not include the resource for the second guard-band allocated based on the configuration information.

3. The terminal as claimed in 1,
wherein the first DCI is a group-common DCI (GC DCI).

4. The terminal as claimed in 1,
wherein one or more sub-bands of the first group are configured through radio resource control (RRC) signal.

5. The terminal as claimed in 1,
wherein each of sub-band of the first group is a unit for channel access in an unlicensed band.

6. The terminal as claimed in 1,
wherein each sub-band of the second group is a unit for channel access in an unlicensed band.

7. A method for use by a user equipment in a wireless communication system, the method comprising:
receiving configuration information that is related to a guard-band for an uplink carrier and for a downlink carrier;
receiving a first downlink control information (DCI) including a bitmap,
wherein each bit of the bitmap indicates whether each of sub-band a first group comprising one or more sub-bands in the downlink carrier is available for reception of a downlink channel;
receiving a second DCI including scheduling information for transmission of the an uplink channel;
receiving the downlink channel based on the first DCI;
transmitting the uplink channel based on the second DCI,
wherein the downlink channel is received on a first resource, wherein the first resource includes at least one sub-band of the first group by the bitmap to be available for reception of the downlink channel, and the first resource does not include a resource for a first guard-band allocated based on the configuration information, wherein the uplink channel is transmitted on a second resource, wherein when the second resource includes a plurality of sub-bands of a second group of sub-bands in the uplink carrier, the second resource includes a resource for a second guard-band allocated based on the configuration information, wherein the first guard-band and the second guard-band are each located between adjacent sub-bands in a frequency domain.

8. The method as claimed in 7,
wherein when the uplink channel is scheduled to be transmitted only on one sub-band, the second resource does not include the resource for the second guard-band allocated based on the configuration information related.

9. The method as claimed in 7,
wherein the first DCI is a group-common DCI (GC DCI).

10. The method as claimed in 7,
wherein one or more sub-bands of the first group are configured through radio resource control (RRC) signal.

11. The method as claimed in 7,
wherein each sub-band of the first group is a unit for channel access in an unlicensed band.

12. The method as claimed in 7,
wherein each sub-band of the second group is a unit for channel access in an unlicensed band.

13. A method performed by a base station in a wireless communication system, the method comprising:
transmitting configuration information that is related to a guard-band for an uplink carrier and for a downlink carrier,
transmitting a first downlink control information (DCI) including a bitmap,
wherein each bit of the bitmap indicates whether each sub-band of a first group comprising one or more sub-bands in the downlink carrier is available for transmission of a downlink channel;
transmitting a second DCI including scheduling information for reception of the an uplink channel;
transmitting the downlink channel based on the first DCI;
receiving the uplink channel based on the second DCI,
wherein the downlink channel is transmitted on a first resource,
wherein the first resource includes at least one sub-band of a first group indicated by bitmap to be available for transmission of the downlink channel, and the first resource does not include a resource for a first guard-band allocated based on the configuration information,
wherein the uplink channel is received on a second resource,
wherein when the second resource includes a plurality of sub-bands of a second group of sub-bands in the uplink carrier, the second resource includes a resource for a second guard-band allocated based on the configuration information,
wherein the first guard-band and the second guard-band are each located between adjacent sub-bands in a frequency domain.

14. The method as claimed in 13,
wherein when the uplink channel is scheduled to be received only on one sub-band, the second resource does not include the resource for the second guard-band allocated based on the configuration information.

15. The method as claimed in 13,
wherein the first DCI is a group-common DCI (GC DCI).

16. The method as claimed in 13,
wherein one or more sub-bands of the first group are configured through radio resource control (RRC) signal.

17. The method as claimed in 13,
wherein each sub-band of the first group is a unit for channel access in an unlicensed band.

18. The method as claimed in 13,
wherein each sub-band of the second group is a unit for channel access in an unlicensed band.

* * * * *